US012523358B2

(12) United States Patent
Marshall et al.

(10) Patent No.: US 12,523,358 B2
(45) Date of Patent: Jan. 13, 2026

(54) MODULAR LED WALL APPARATUS, SYSTEMS AND METHODS

(71) Applicant: NantStudios, LLC, El Segundo, CA (US)

(72) Inventors: Gary Robert Marshall, Los Angeles, CA (US); Keaton Arthur Heinrichs, Culver City, CA (US); Christopher Paul Williams, Hermosa Beach, CA (US); Patrick Soon-Shiong, Los Angeles, CA (US)

(73) Assignee: NantStudios, LLC, El Segundo, CA (US)

( * ) Notice: Subject to any disclaimer, the term of this patent is extended or adjusted under 35 U.S.C. 154(b) by 0 days.

(21) Appl. No.: 18/904,508

(22) Filed: Oct. 2, 2024

(65) Prior Publication Data
US 2025/0109839 A1   Apr. 3, 2025

Related U.S. Application Data

(60) Provisional application No. 63/649,871, filed on May 20, 2024, provisional application No. 63/587,633, filed on Oct. 3, 2023.

(51) Int. Cl.
F21V 19/00 (2006.01)
F21W 107/10 (2018.01)
H10H 29/30 (2025.01)

(52) U.S. Cl.
CPC .......... *F21V 19/003* (2013.01); *H10H 29/30* (2025.01); *F21W 2107/10* (2018.01)

(58) Field of Classification Search
CPC .. F21V 19/003; H10H 29/30; F21W 2107/10; G06F 1/1613; G06F 1/1615;
(Continued)

(56) References Cited

U.S. PATENT DOCUMENTS 4,923,597 A * 5/1990 Anderson ................ B07B 1/46
254/423
4,995,772 A * 2/1991 Biggio ..................... B60P 3/40
414/458

(Continued)

FOREIGN PATENT DOCUMENTS

| CN | 203673777 U | * | 6/2014 |
| CN | 112806787 A |   | 5/2021 |

(Continued)

OTHER PUBLICATIONS

CN 203673777 U (Year: 2014).*

(Continued)

*Primary Examiner* — Eugene L Kim
*Assistant Examiner* — Amir A Klayman
(74) *Attorney, Agent, or Firm* — STETINA GARRED BRUCKER & NEWBOLES

(57) ABSTRACT

A wall module of a modular LED wall includes an array of LED panels and a truck for supporting the array of LED panels and providing mobility thereto relative to a stage surface. The truck may include a support assembly including a first support base fixed to the array of LED panels, a second support base engageable with the first, and a plurality of ball bearings arranged between the first and second support bases to allow relative movement of the first and second support bases in a plane parallel to the stage surface, a plurality of omnidirectional wheels arranged to enable omnidirectional movement of the second support base along the stage surface, and one or more actuators operable to adjust a height of the support assembly at a plurality of positions on the support assembly to enable leveling of the support assembly relative to the stage surface.

12 Claims, 46 Drawing Sheets

(58) Field of Classification Search
CPC .... G06F 1/1633; G06F 1/1637; G06F 1/1647; G06F 1/165; G06F 3/14; G06F 3/1423; G06F 3/1446; G06F 2200/161; G06F 2200/1613; G06F 2200/163; G06F 2200/01; G06F 2200/1634; G09G 2350/00; G09G 2352/00; G09G 2356/00; G09G 2380/06; G09G 2300/02; F16M 11/02; F16M 11/04; F16M 11/06; F16M 11/08; F16M 11/20; F16M 11/2078; F16M 11/38; F16M 11/42; G09F 9/302

See application file for complete search history.

(56) References Cited

U.S. PATENT DOCUMENTS

| | | | | |
|---|---|---|---|---|
| 5,900,850 | A * | 5/1999 | Bailey | G09F 9/3026 345/31 |
| 6,175,342 | B1 * | 1/2001 | Nicholson | G09F 9/3026 345/1.3 |
| 6,550,521 | B1 * | 4/2003 | McNabb | H05K 5/0204 359/457 |
| 6,926,375 | B2 * | 8/2005 | Nagamine | G09F 9/33 40/550 |
| 9,053,645 | B2 * | 6/2015 | Hellenthal | G09F 9/30 |
| 9,097,384 | B1 * | 8/2015 | Simon | F16M 11/24 |
| 9,863,586 | B2 * | 1/2018 | Yang | F21K 9/20 |
| 10,706,770 | B2 * | 7/2020 | Hall | G06F 3/1446 |
| 10,795,632 | B2 * | 10/2020 | Cope | F21K 9/20 |
| 10,963,207 | B2 * | 3/2021 | Wickstrum | G06F 3/1446 |
| 11,292,704 | B2 * | 4/2022 | Chapman | F16M 11/28 |
| 11,443,663 | B2 * | 9/2022 | Dewaele | G09F 9/3026 |
| 11,924,561 | B2 | 3/2024 | Beziaeva et al. | |
| 12,086,498 | B2 * | 9/2024 | Cope | G06F 3/1446 |
| 2010/0224745 | A1 * | 9/2010 | Orlov | F16M 11/18 248/188.2 |
| 2011/0164870 | A1 * | 7/2011 | Manson | F16M 11/18 396/428 |
| 2013/0271940 | A1 * | 10/2013 | Cope | H04N 5/64 361/809 |
| 2014/0137384 | A1 * | 5/2014 | Patterson | F21V 21/088 29/428 |
| 2014/0153241 | A1 * | 6/2014 | Templeton | G09F 27/008 362/249.02 |
| 2014/0196761 | A1 * | 7/2014 | Tilley | F24S 50/20 136/246 |
| 2016/0059915 | A1 * | 3/2016 | Etherington | B62D 63/061 280/415.1 |
| 2016/0330862 | A1 | 11/2016 | Pace et al. | |
| 2017/0118817 | A1 * | 4/2017 | Rodriguez | F21S 2/005 |
| 2020/0057594 | A1 * | 2/2020 | Nakano | G09F 9/3026 |
| 2021/0019105 | A1 | 1/2021 | Cope et al. | |
| 2022/0022330 | A1 * | 1/2022 | Dewaele | G06F 3/147 |
| 2024/0020851 | A1 | 1/2024 | Beziaeva et al. | |
| 2024/0022830 | A1 | 1/2024 | Beziaeva et al. | |

FOREIGN PATENT DOCUMENTS

| | | | |
|---|---|---|---|
| EP | 3091270 A1 * | 11/2016 | ............ A47B 97/00 |
| JP | 2011221428 A | 11/2011 | |
| WO | 2023106149 | 6/2023 | |

OTHER PUBLICATIONS

Authorized officer: Yang, Jeong Rok, "PCT Search Report and Written Opinion", PCT/US2024/049748, Jan. 15, 2025, 11 pages, Daejeon, Republic of Korea.

* cited by examiner

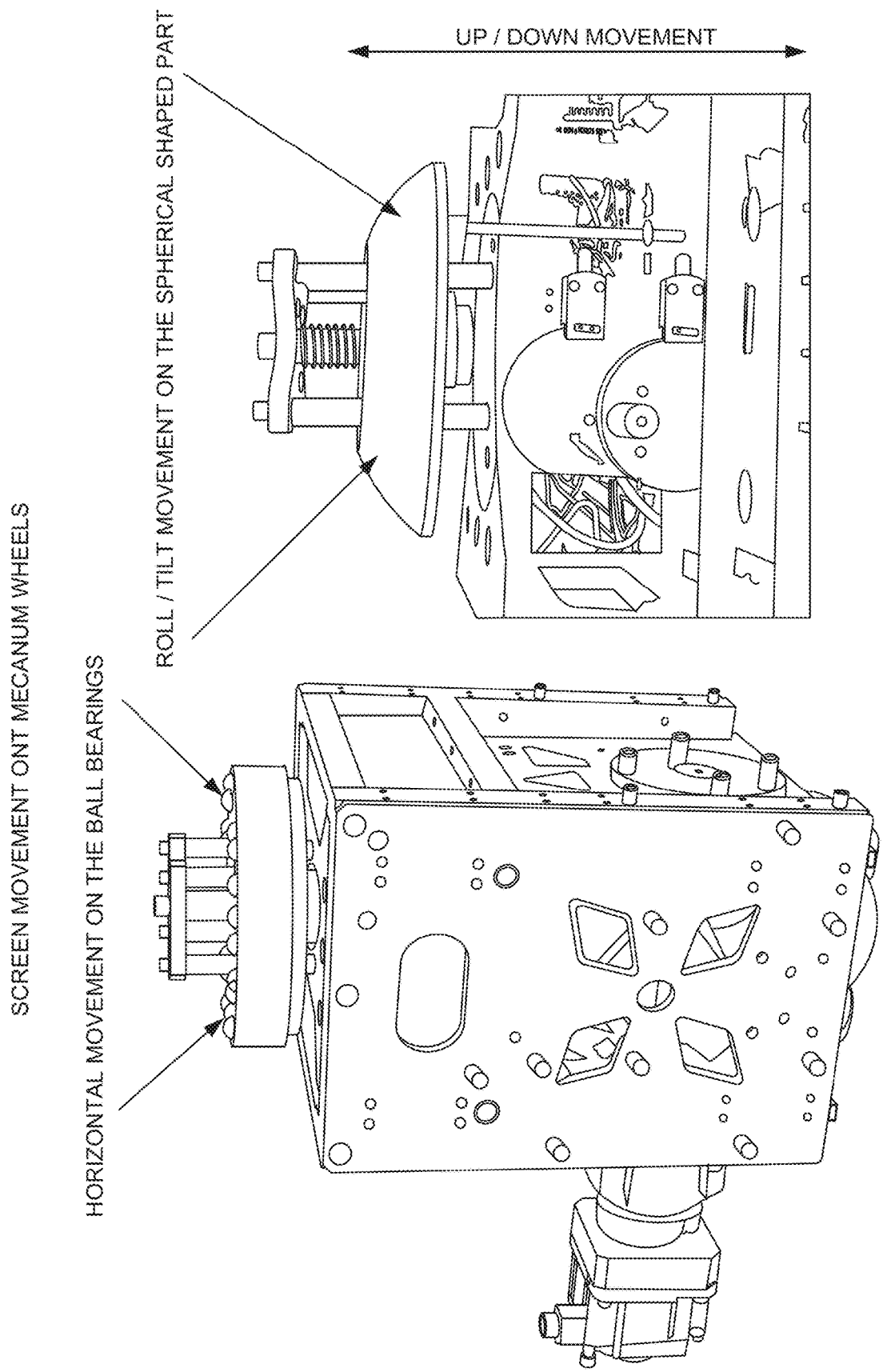

MODULAR LED WALL APPARATUS, SYSTEMS AND METHODS

CROSS-REFERENCE TO RELATED APPLICATIONS

The present application claims the benefit of U.S. Provisional Application No. 63/649,871 filed May 20, 2024, and U.S. Provisional Application No. 63/587,633 filed Oct. 3, 2023, the contents of each of which are expressly incorporated herein by reference in their entireties.

STATEMENT RE: FEDERALLY SPONSORED RESEARCH/DEVELOPMENT

Not Applicable

BACKGROUND

When arranging LED screens as a wall to display a backdrop or environment for filming, the arrangement of the screens may depend on the specific scene to be filmed. As a result, the time-consuming installation process must frequently be repeated, making the already costly hardware even more expensive to use. The problem is exacerbated by the bulkiness of the hardware, which makes the mobility of such installations very limited. Even if a typical wheeled dolly might make it possible to adjust the position of an installation over a short distance on the same stage floor, for example, the limited availability of the studio space or technical considerations may require movements over a greater distance or even a change to a different studio space entirely during a single project. Moreover, due to very minute variations in the stage floor, even small movements of an arrangement of screens may necessitate realigning and releveling the screens in order to create an uninterrupted display (and thus the desired appearance of the backdrop or environment) at the new position.

BRIEF SUMMARY

The present disclosure contemplates various systems and methods for overcoming the above drawbacks accompanying known related art. One aspect of the embodiments of the present disclosure is a wall module of a modular LED wall. The wall module may comprise an array of LED panels and a truck for supporting the array of LED panels and providing mobility to the array of LED panels relative to a stage surface, floor, or other surface. The truck may comprise a support assembly including a first support base fixed to the array of LED panels, a second support base engageable with the first support base, and a plurality of ball bearings arranged between the first and second support bases to allow relative movement of the first and second support bases in a plane parallel to the stage surface. The truck may further comprise a plurality of omnidirectional wheels (e.g., mecanum wheels, etc.) arranged to enable omnidirectional movement of the second support base along the stage surface and one or more first actuators operable to adjust a height of the support assembly at a plurality of positions on the support assembly to enable leveling of the support assembly relative to the stage surface or other surface.

The one or more first actuators may comprise a plurality of first actuators respectively disposed at the plurality of positions on the support assembly. Each of the first actuators may comprise a bladder configured to lift the support assembly upon expanding. The second support base may include a main body and one or more sub-assemblies on which the plurality of ball bearings are provided. The bladder of each of the first actuators may be positioned between the main body and a respective sub-assembly from among the one or more sub-assemblies so as to increase a distance between the main body and the sub-assembly upon expanding. The wall module may comprise a plurality of adjustable feet corresponding to the bladders. Each of the adjustable feet may extend between the first support base and the main body of the second support base and may be adjustable to maintain the distance between the first support base and the main body of the second support base upon deflation of the corresponding bladder. The plurality of adjustable feet may be configured to inhibit the relative movement of the first and second support bases on the plurality of ball bearings. The one or more first actuators may be controllable with a precision that enables leveling of the support assembly relative to the stage surface by a distance of a single pixel of the LED panels.

The wall module may comprise a plurality of second actuators. Each of the second actuators may be operable to adjust a distance between a respective one of the plurality of omnidirectional wheels and the second support base in a direction normal to the stage surface. Each of the second actuators may comprise a bladder configured to increase the distance between the respective one of the plurality of omnidirectional wheels and the second support base upon expanding.

Another aspect of the embodiments of the present disclosure is a truck for supporting an array of LED panels and providing mobility to the array of LED panels relative to a stage surface. The truck may comprise a support assembly including a first support base fixed to the array of LED panels, a second support base engageable with the first support base, and a plurality of ball bearings arranged between the first and second support bases to allow relative movement of the first and second support bases in a plane parallel to the stage surface. The truck may further comprise a plurality of omnidirectional wheels arranged to enable omnidirectional movement of the second support base along the stage surface and one or more first actuators operable to adjust a height of the support assembly at a plurality of positions on the support assembly to enable leveling of the support assembly relative to the stage surface.

Another aspect of the embodiments of the present disclosure is a modular LED wall. The modular LED wall may comprise a first wall module and a second wall module connectable to the first wall module. Each of the first and second wall modules may include an array of LED panels and a truck for supporting the array of LED panels and providing mobility to the array of LED panels relative to a stage surface.

Each of the first and second wall modules may include a plurality of alignment surfaces. The plurality of alignment surfaces of the first wall module may be configured to mate with the plurality of alignment surfaces of the second wall module when the respective arrays of LED panels are aligned. The first wall module may include a plurality of clamps operable to connect the first wall module to the second wall module when the respective arrays of LED panels are aligned. For each of the first and second wall modules, the truck comprise a support assembly including a first support base fixed to the array of LED panels, a second support base engageable with the first support base, and a plurality of ball bearings arranged between the first and second support bases to allow relative movement of the first and second support bases in a plane parallel to the stage surface. For each of the first and second wall modules, the truck may comprise a plurality of omnidirectional wheels arranged to enable omnidirectional movement of the second support base along the stage surface and one or more first actuators operable to adjust a height of the support assembly at a plurality of positions on the support assembly to enable leveling of the support assembly relative to the stage surface. The ball bearings may allow the relative movement of the first and second support bases during operation of the plurality of clamps to connect the first wall module to the second wall module

BRIEF DESCRIPTION OF THE DRAWINGS

Features and advantages of the various embodiments disclosed herein will be better understood with respect to the following description and drawings, in which like numbers refer to like parts throughout, and in which:

FIG. 47A is another perspective view of a portion of the lower support base of the truck of FIG. 47;

FIG. 48A is another perspective view of another portion of the lower support base of the truck of FIG. 48.

DETAILED DESCRIPTION

The present disclosure encompasses various embodiments of systems, apparatus, and methods in relation to a modular display wall such as a modular light-emitting diode (LED) wall. The detailed description set forth below in connection with the appended drawings is intended as a description of multiple currently contemplated embodiments and is not intended to represent the only form in which the disclosed subject matter may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
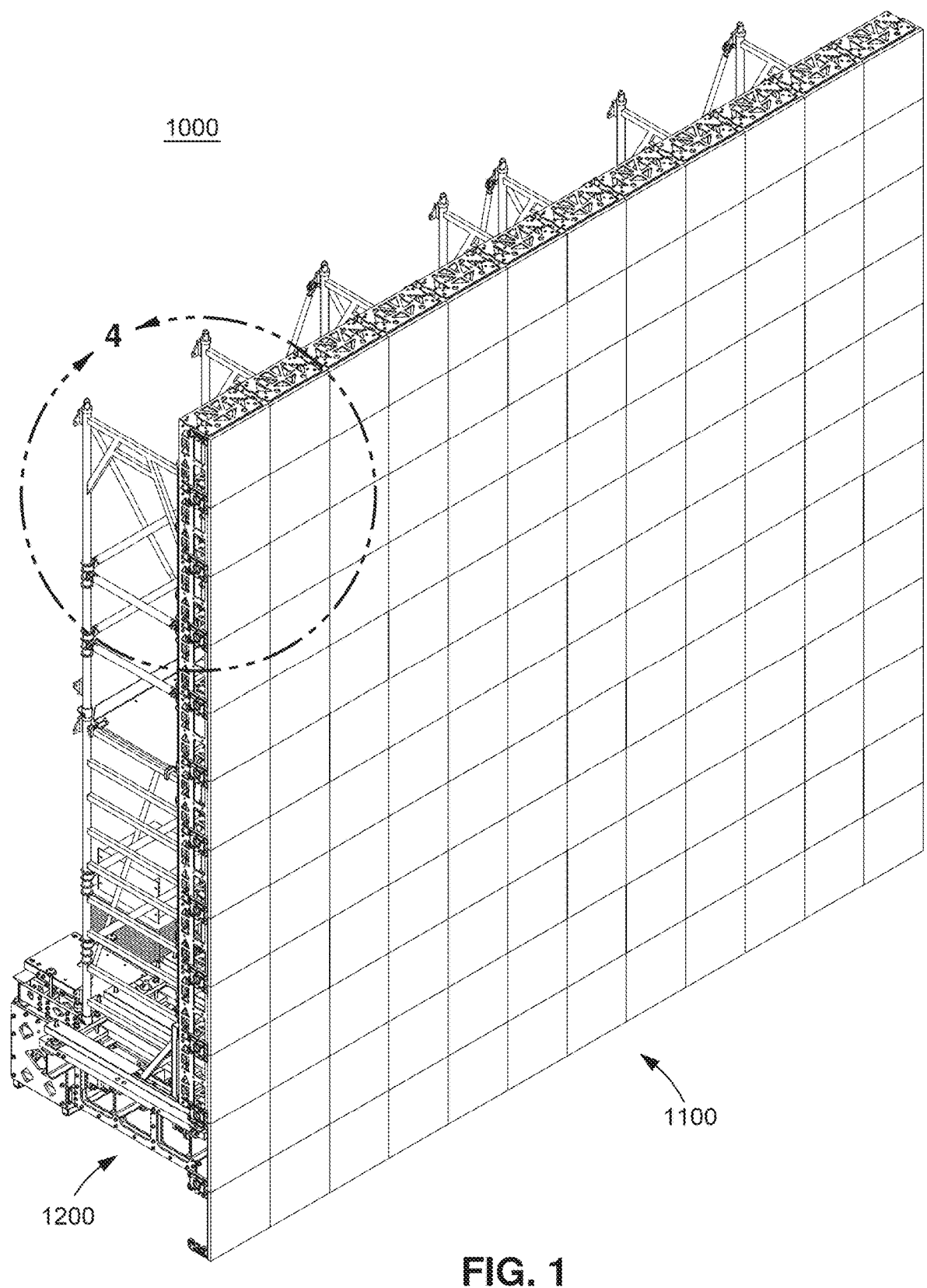
FIG. 1 is a front perspective view of a wall module of a modular light-emitting diode (LED) wall according to an embodiment of the present disclosure.
Figure 2:
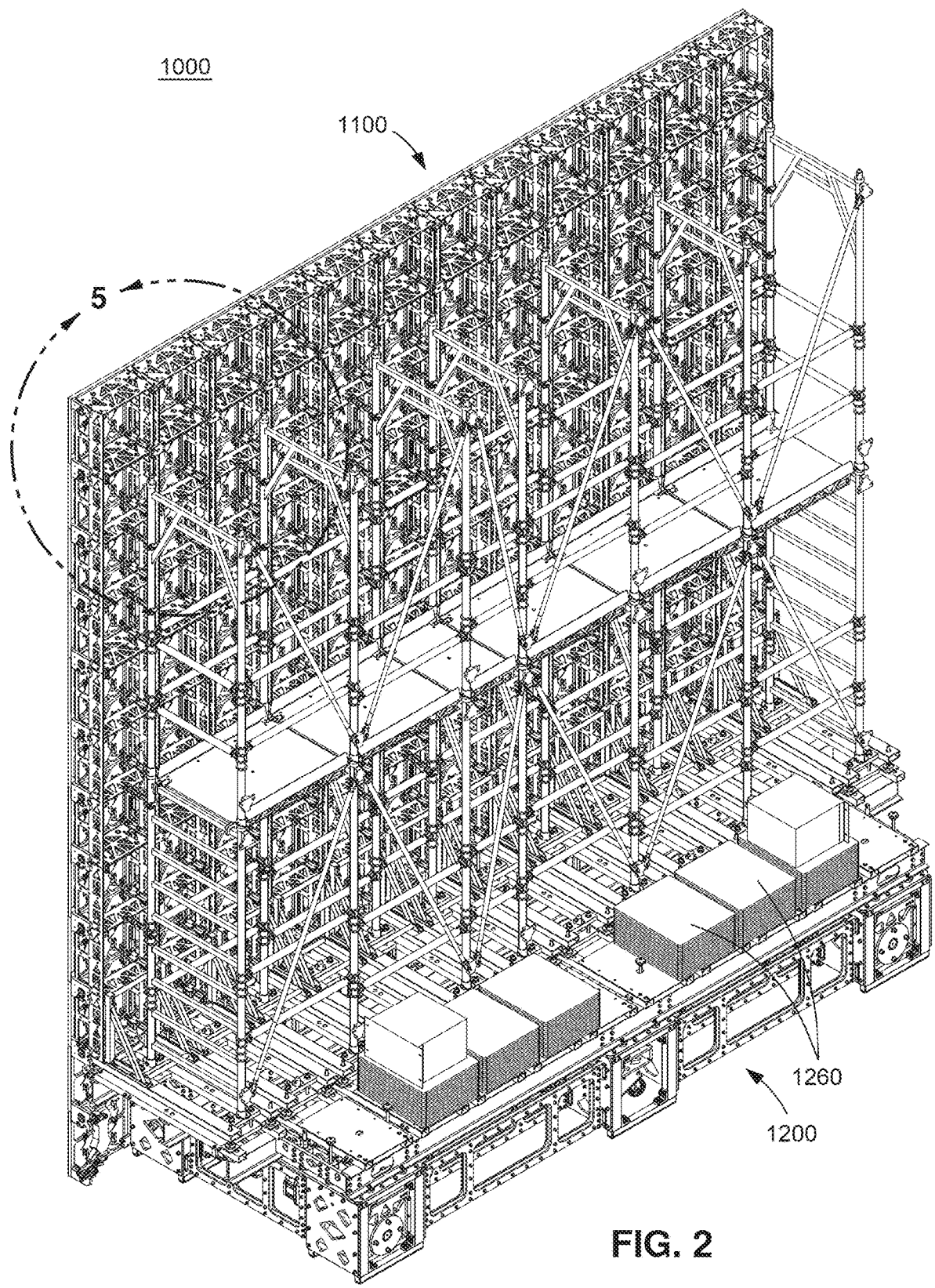
FIG. 2 is a rear perspective view of the wall module.

One aspect of the embodiments of the present disclosure is a wall module 1000 of a modular display wall such as a modular LED wall as illustrated. The wall module 1000 may comprise an array of LED panels 1100 and a truck 1200 for supporting the array of LED panels 1100 and providing mobility to the array of LED panels 1100 relative to a stage surface 10 (see FIGS. 14, 15, 19-21, and 28-33F showing a stage surface 10). One should appreciate the disclosed subject matter is presented with respect to stage surface 10 while the disclosed modular LED walls may be placed on any suitable surfaces (e.g., floors, stages, etc.). Example LED panels that may be used with the disclosed inventive subject matter may include panels offered by Planar® (see URL www.planar.com) having various dimension and various LED pitches (e.g., 0.9 mm, 1.5 mm, 1.8 mm, etc.). As shown most clearly in FIG. 20, the truck 1200 may comprise a support assembly 1210 including a first support base 1212 fixed to the array of LED panels 1100 (see FIGS. 6 and 7), a second support base 1214 engageable with the first support base 1212, and a plurality of ball bearings 1250 arranged between the first and second support bases 1212, 1214 to allow relative movement of the first and second support bases 1212, 1214 in a plane parallel to the stage surface 10. Such movement provides for fine grain adjustments when one wall module 1000 physically couples to another wall module 1000. One or more weights 1260 (see FIGS. 2, 6, and 7) may be provided on the support assembly 1210 to act as a counterweight to the array of LED panels 1100. The weight(s) 1260 may be filled with concrete, sand, water, or other dense materials for example. Alternatively, some or all of the weight(s) 1260 may be batteries (e.g., lead-acid batters, Li ion batteries, Li—S batteries, etc.) or other equipment used by the wall module 1000 (e.g., for power) that may be strategically positioned to function as the weight(s) 1260. The wall module 1000 may be docked at night or otherwise while not in use to recharge the batteries. A charging station for a wall module 1000 may support docking of one or a plurality of wall modules 1000 at the same time. In some cases, the weight(s) 1260 may be smart weight robots capable of adjusting their center of gravity automatically in order to position weight on the truck 1200 where it is needed. The weights 1260 may be conventional weights that apply force in the direction of gravity according to their mass and/or simulated weights that apply force in some other manner, such as through the use of magnets (e.g., electromagnets, permanent magnets, etc.) as used in door locks for example. The truck 1200 may further comprise a plurality of omnidirectional wheels 1220 arranged to enable omnidirectional movement of the second support base 1214 along the stage surface 10. Omnidirectional wheels 1220 provide for moving an entire assembly around a large area such as a studio filming environment. The truck 1200 may further comprise one or more first actuators 1240 operable to adjust a height of the support assembly 1210 at a plurality of positions on the support assembly 1210 to enable leveling of the support assembly 1210 relative to the stage surface 10.

Figure 3:
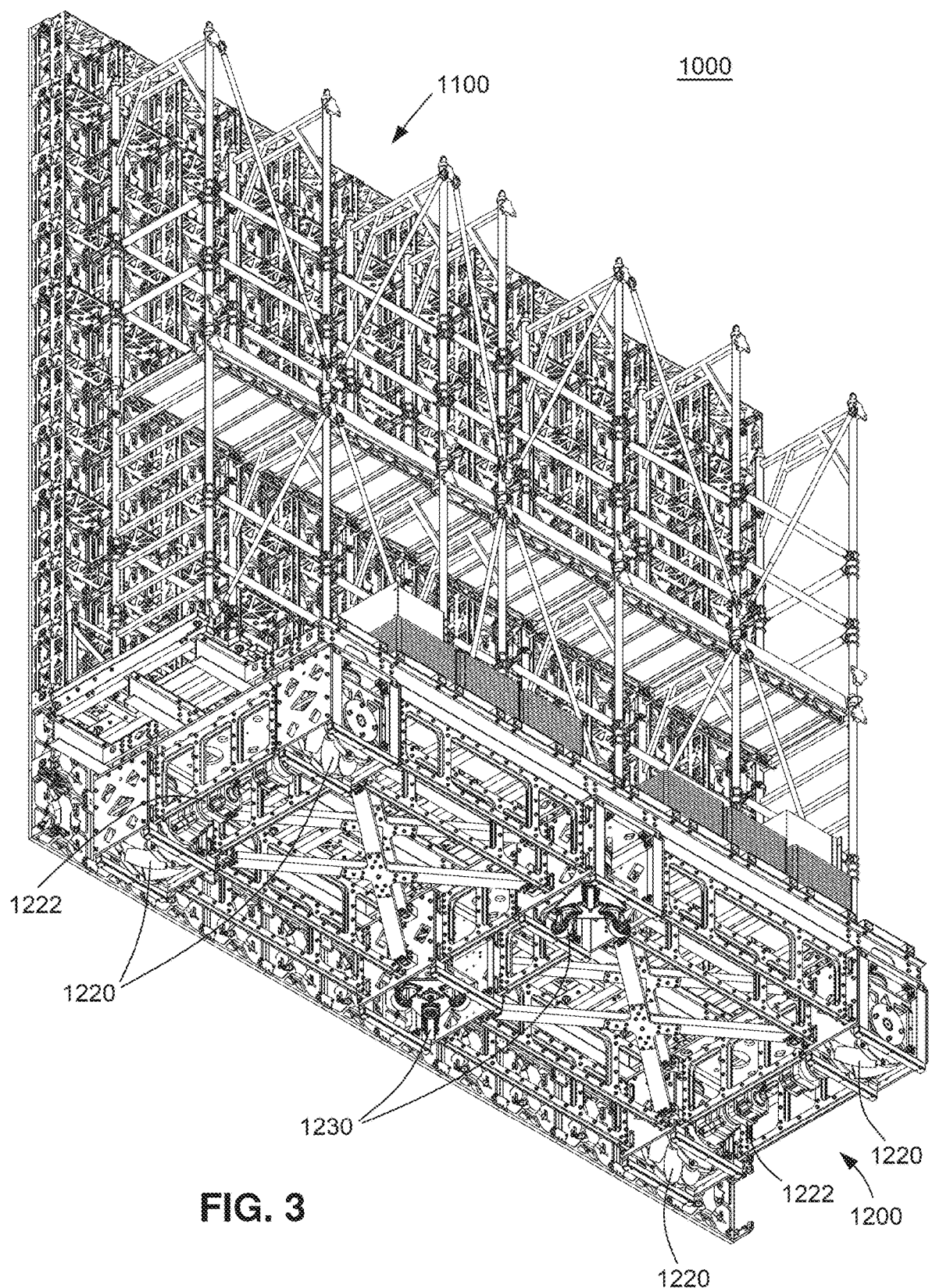
FIG. 3 is a bottom rear perspective view of the wall module.
Figure 9:
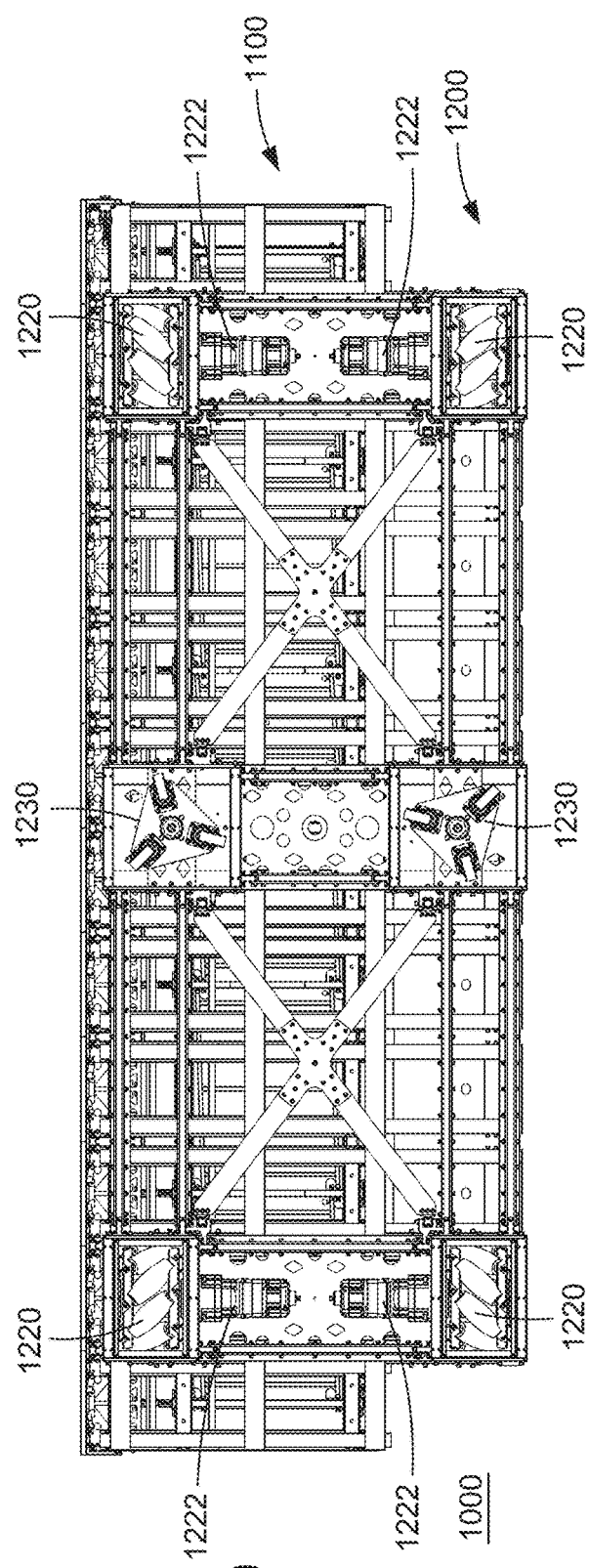
FIG. 9 is a bottom view of the wall module.
Figure 10:
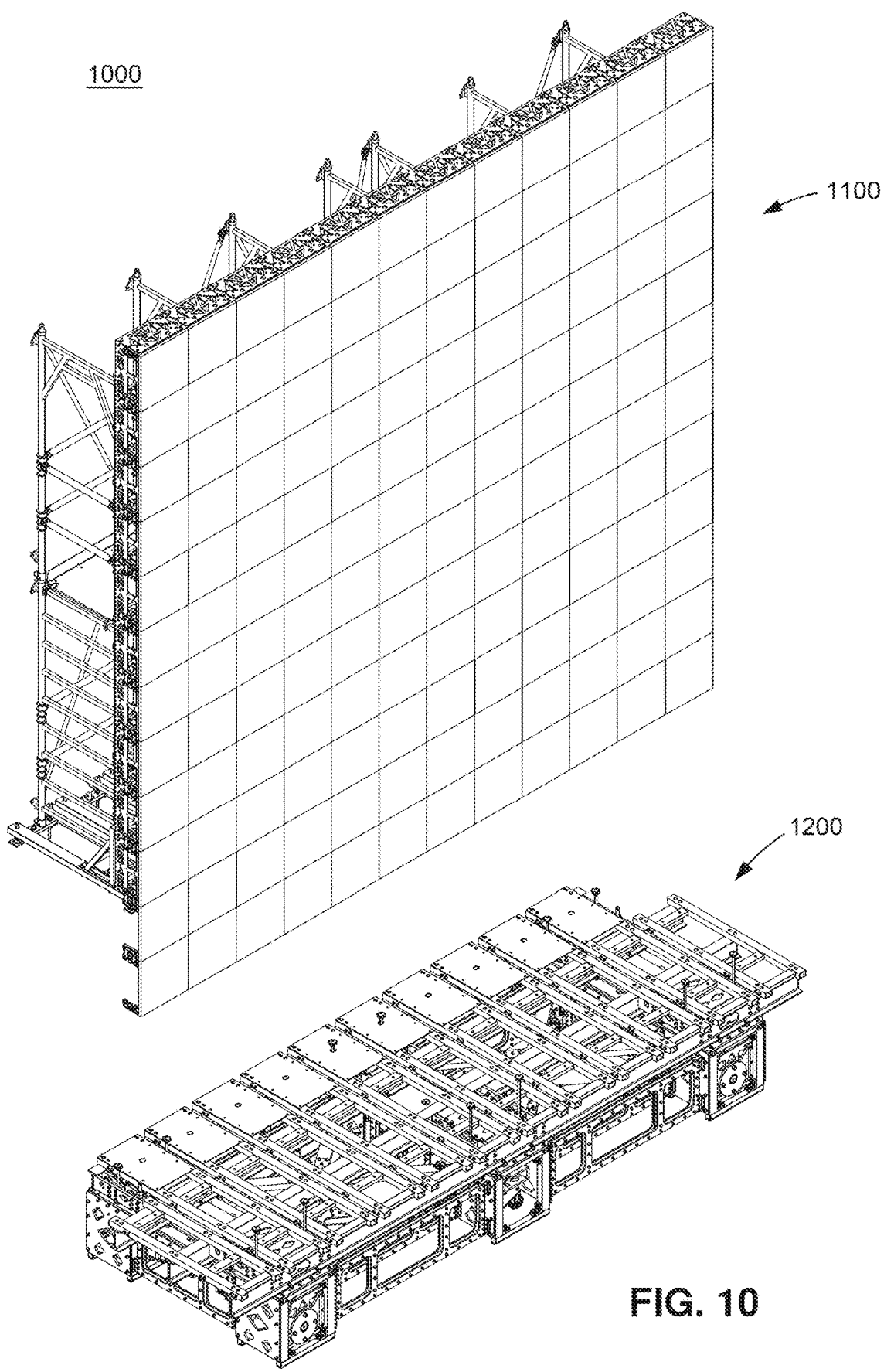
FIG. 10 is an exploded front perspective view of the wall module separately showing an array of LED panels and a truck for supporting the array of LED panels.
Figure 11:
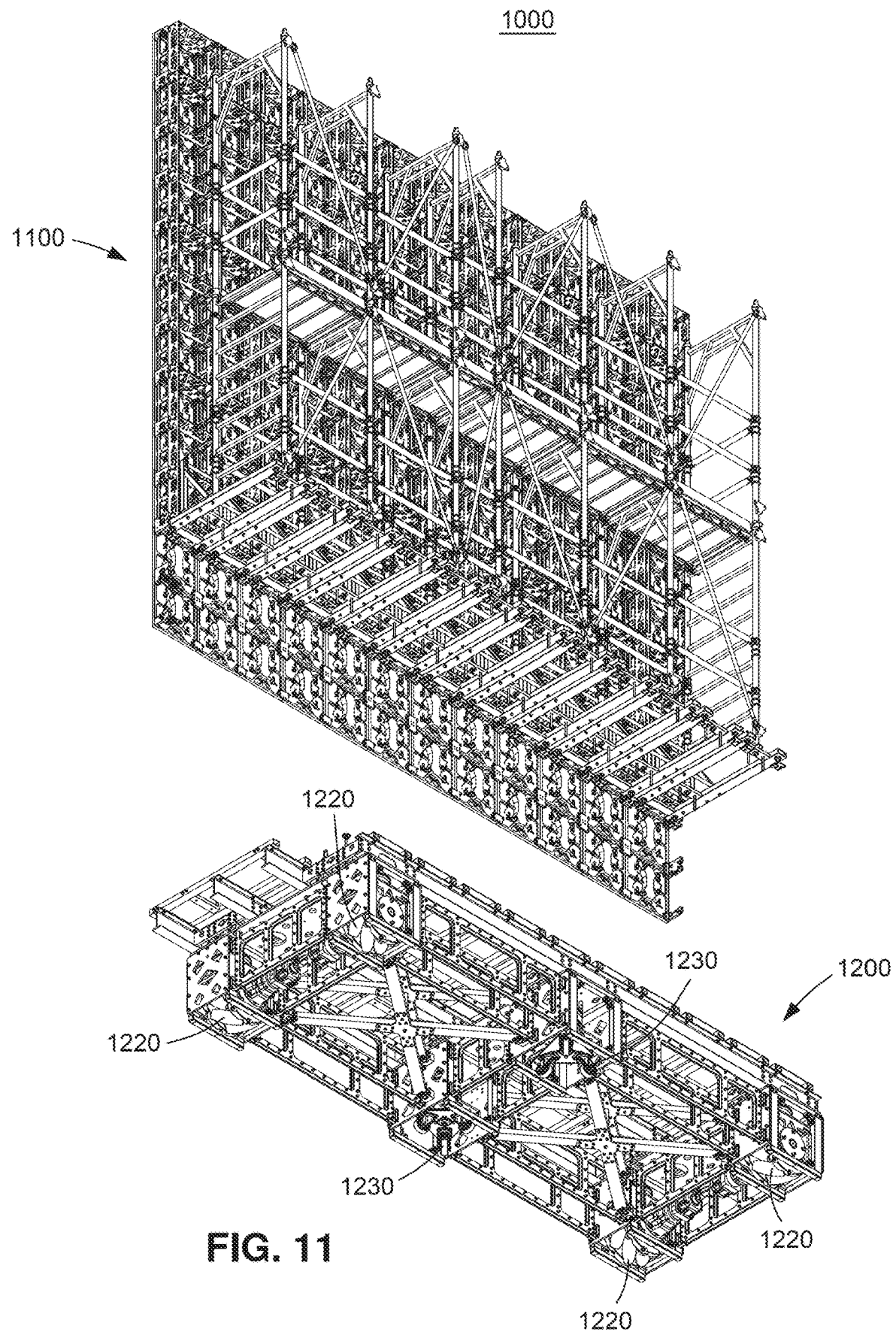
FIG. 11 is an exploded rear perspective view of the wall module.

The omnidirectional wheels 1220 may be mecanum wheel assemblies, for example, and there may be four as shown (see, e.g., FIGS. 3, 9, and 11). There may also be passive wheels 1230 for additional support such as a pair of tricaster wheel assemblies as shown. Each omnidirectional wheel 1220 may have a separate motor 1222 (see, e.g., FIGS. 3 and 9). The omnidirectional wheels 1220 may be large enough to allow for movement over rough, uneven surfaces, making it possible for the wall module 1000 to be moved not only along a single stage surface 10 but between different stage surfaces 10, or possibly outdoor rough terrain. The omnidirectional wheels 1220 may be remotely controlled and/or automated. Instead of or in addition to the omnidirectional wheels 1220, it is contemplated that the truck 1220 may be movable using an air caster system or using a system of retractable and/or rotatable treads or tracks.

The one or more first actuators 1240 may comprise a plurality of first actuators 1240 respectively disposed at the plurality of positions on the support assembly 1210. Each of the first actuators 1240 may comprise a bladder 1240 (e.g., an air bladder, liquid bladder, etc.) configured to lift the support assembly 1210 upon expanding. Other examples of the first actuators 1240 may include pneumatic, hydraulic or electric actuators (e.g., robotic arms, servos, etc.), worm screws, etc. which may advantageously avoid the need for management of compressed air and may be controllable with millimeter or better accuracy. As noted above and shown in FIGS. 19 and 20, for example, a plurality of ball bearings 1250 may be arranged between the first and second support bases 1212, 1214 to allow relative movement of the first and second support bases 1212, 1214 in a plane parallel to the stage surface 10. The ball bearings 1250 may rotate within respective sockets 1252 of the second support base 1214 and may engage with a steel plate 1213 of the first support base 1212 above them to allow for relative movement of the first and second support bases 1212, 1214. It may be said that the first support base 1212 resides on the ball bearings 1250 in the sense that the first support base 1212 may rest entirely on the ball bearings 1250 and may be free to roll on top of the second support base 1214 (except when adjustable feet 1270, 1270' are engaged as described below). As best shown by comparison of FIGS. 19 and 20, the second support base 1214 may include a main body 1216 and one or more sub-assemblies 1217 on which the plurality of ball bearings 1250 are provided (e.g., in the sockets 1252). The bladder 1240 may be positioned between the main body 1216 and a respective sub-assembly 1217 so as to increase a distance between the main body 1216 and the sub-assembly 1217 upon expanding. The first actuators 1240 may allow for y-axis, pan, tilt, or other degrees of freedom control during fine grain adjustments. The one or more first actuators 1240 may be controllable with a precision that enables leveling of the support assembly relative to the stage surface 10 by a distance of a single pixel of the LED panels (e.g., allowing the wall module 1000 to be moved vertically for perfect pixel alignment). In some embodiments, the pixel pitch can be about $\frac{1}{10}^{th}$ of an inch or less, such as a 2.5 mm pixel pitch, a 2.2 mm pixel pitch, a 1.5 mm pixel pitch, 0.9 mm pixel pitch, or other pixel pitch. Once the wall module 1000 has been moved in place (e.g., to within a quarter inch of an adjacent wall module 1000) using the omnidirectional wheels 1220 and leveled using the first actuators 1240, x-z fine control may be performed in a small working area using the plurality of ball bearings 1250 (or aircraft loading rollers).

The wall module 1000 may comprise a plurality of second actuators 1224. As best shown by comparison of FIGS. 14 and 19, each of the second actuators 1224 may be operable to adjust a distance between a respective one of the plurality of omnidirectional wheels 1220 and the second support base 1214 in a direction normal to the stage surface 10. Each of the second actuators 1224 may comprise a bladder 1224 configured to increase the distance between the respective one of the plurality of omnidirectional wheels 1220 and the second support base 1214 upon expanding. While the disclosed subject matter references use of bladders, one should appreciate that other forms of actuators are also contemplated as referenced previously (e.g., pneumatic actuators, hydraulic actuators, electrical actuators, servos, mechanical actuators, etc.). The second actuators 1224 may be used during movement of the wall module 1000. When the wall module 1000 is in position, the pressure to the omnidirectional wheels 1220 may be removed using the second actuators 1224 allowing the wall module 1000 to rest in place (e.g., on feet 1226). In addition to a bladder 1224 (e.g., an air bladder, liquid bladder, etc.) as illustrated, other examples of the second actuators 1224 may include hydraulic or electric actuators (e.g., robotic arms), worm screws, etc. which may advantageously avoid the need for management of compressed air and may be controllable with millimeter accuracy.

Among the contemplated first actuators 1240 and second actuators 1224 are mechanical actuators, which advantageously may not require the storage and management of a compressed fluid to operate. For example, each of the first actuators 1240 may comprise one or more motorized columns (e.g., corkscrew motorized columns) to level and lift the support assembly 1210. For example, like the bladders described above, the motorized columns may be operated to increase or decrease the distance between the main body 1216 and the sub-assembly 1217. The motorized columns of either the first actuators 1240 or the second actuators 1224 may be controlled individually or by a central controller (provided on the wall module 1000 or remotely) in response to sensor feedback that may include leveling and positioning data as described herein. An example of a truck of a wall module equipped with corkscrew motorized columns or spindles is shown in FIGS. 44, 45, 46, 47, and 48 (see also FIGS. 44A, 45A, 46A, 47A, and 48A). The illustrated design may allow for increased control for roll/tilt/lift with more exact movements than in the case of a compressed fluid, allowing for the exact position to be known without any need for external encoders or compressors.

Another aspect of the embodiments of the present disclosure is a truck 1200 for supporting an array of LED panels 1100 and providing mobility to the array of LED panels 1100 relative to a stage surface 10. The truck 1200 may comprise a support assembly 1210 including a first support base 1212 fixed to the array of LED panels 1100, a second support base 1214 engageable with the first support base 1212, and a plurality of ball bearings 1250 arranged between the first and second support bases 1212, 1214 to allow relative movement of the first and second support bases 1212, 1214 in a plane parallel to the stage surface 10. The truck 1200 may further comprise a plurality of omnidirectional wheels 1220 arranged to enable omnidirectional movement of the second support base 1214 along the stage surface 10. The truck 1200 may further comprise one or more first actuators 1240 operable to adjust a height of the support assembly 1210 at a plurality of positions on the support assembly 1210 to enable leveling of the support assembly 1210 relative to the stage surface 10.

Another aspect of the embodiments of the present disclosure is a modular LED wall (see FIGS. 22-33F). The modular LED wall may comprise a first wall module 1000*a* and a second wall module 1000*b* connectable to the first wall module 1000*a*. Each of the first and second wall modules 1000*a*, 1000*b* (collectively, wall modules 1000) may include an array of LED panels 1100 and a truck 1200 for supporting the array of LED panels 1100 and providing mobility to the array of LED panels 1100 relative to a stage surface 10 as described above.

Figure 27:
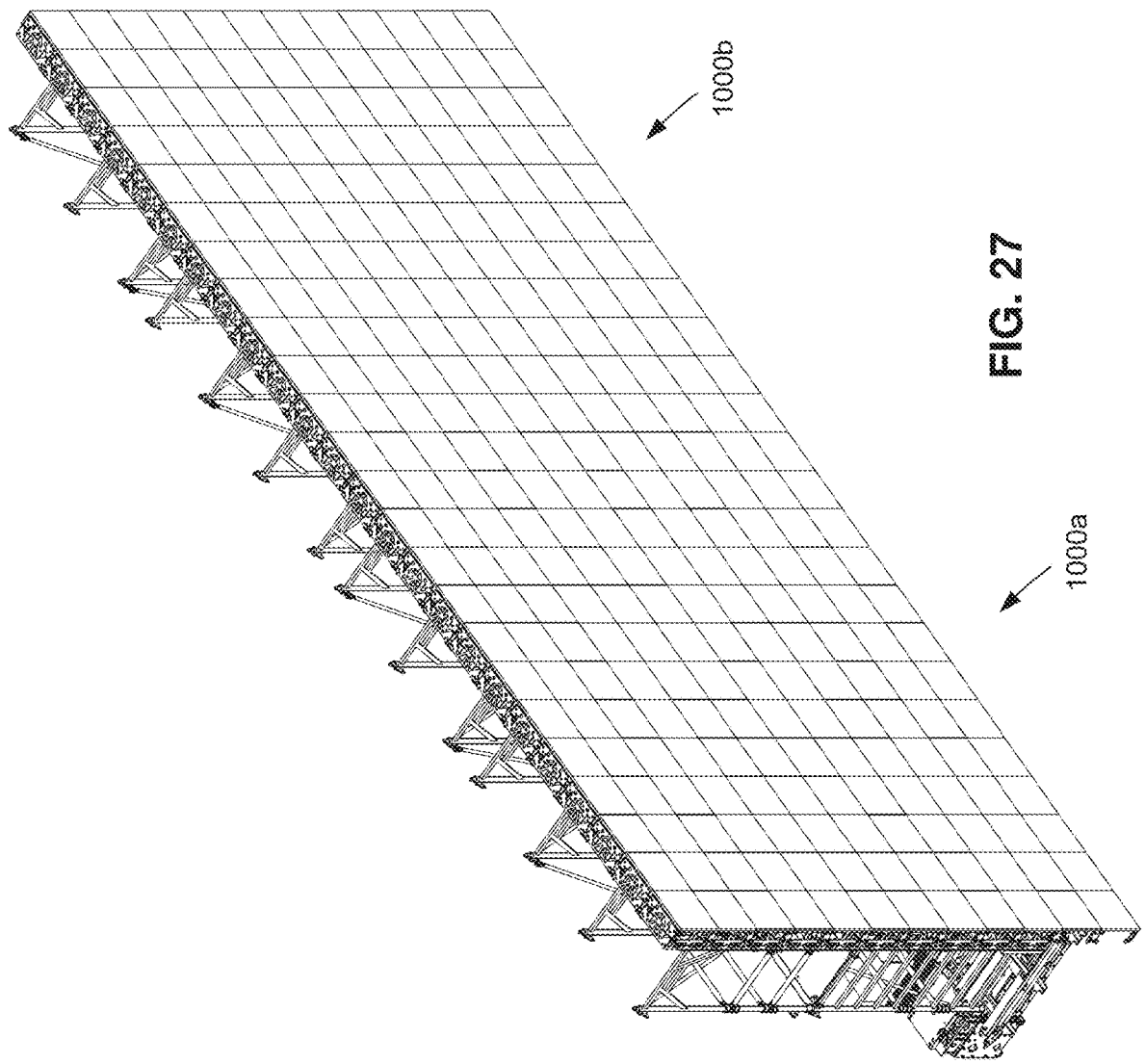
FIG. 27 is a front perspective view of the two wall modules connected together.
Figure 28:
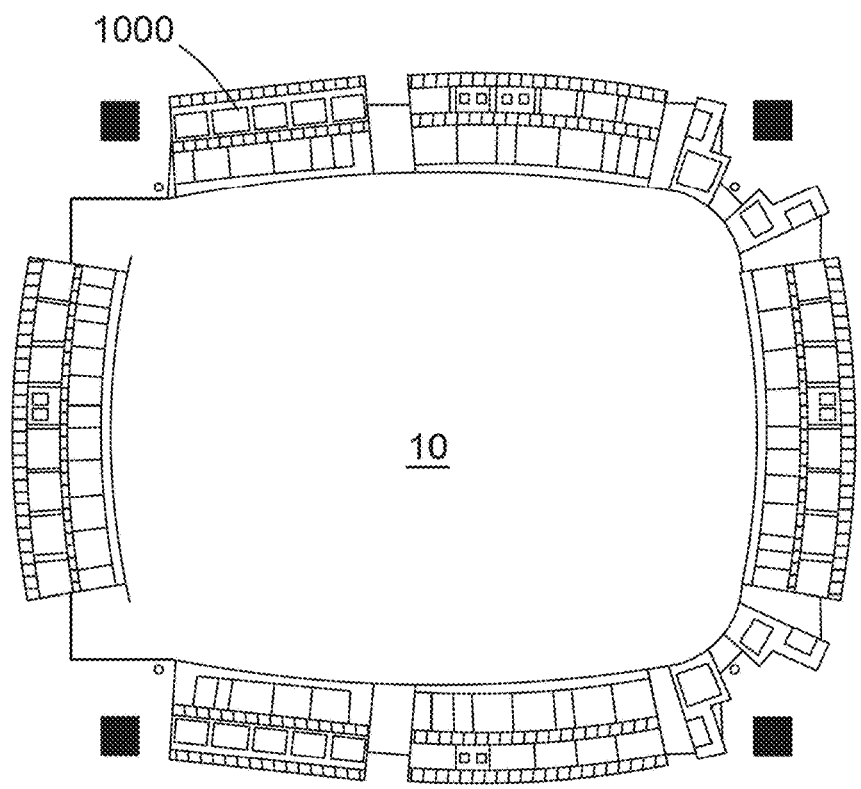
FIG. 28 is a top view of a modular LED wall including the wall module.
Figure 29:
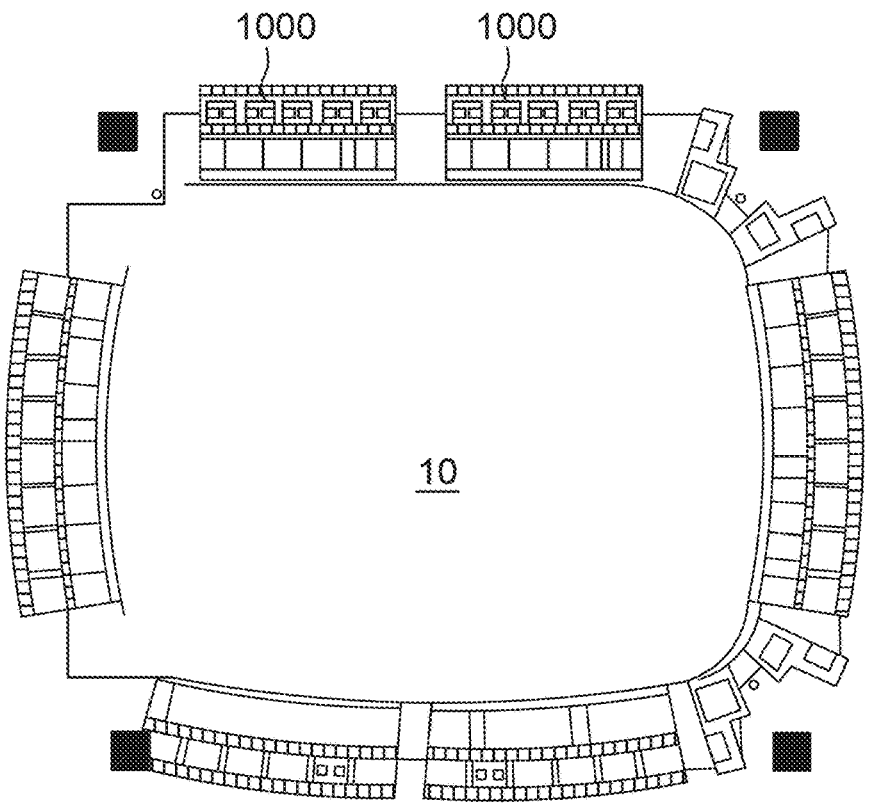
FIG. 29 is a top view of the modular LED wall in another assembly configuration.
Figure 30:
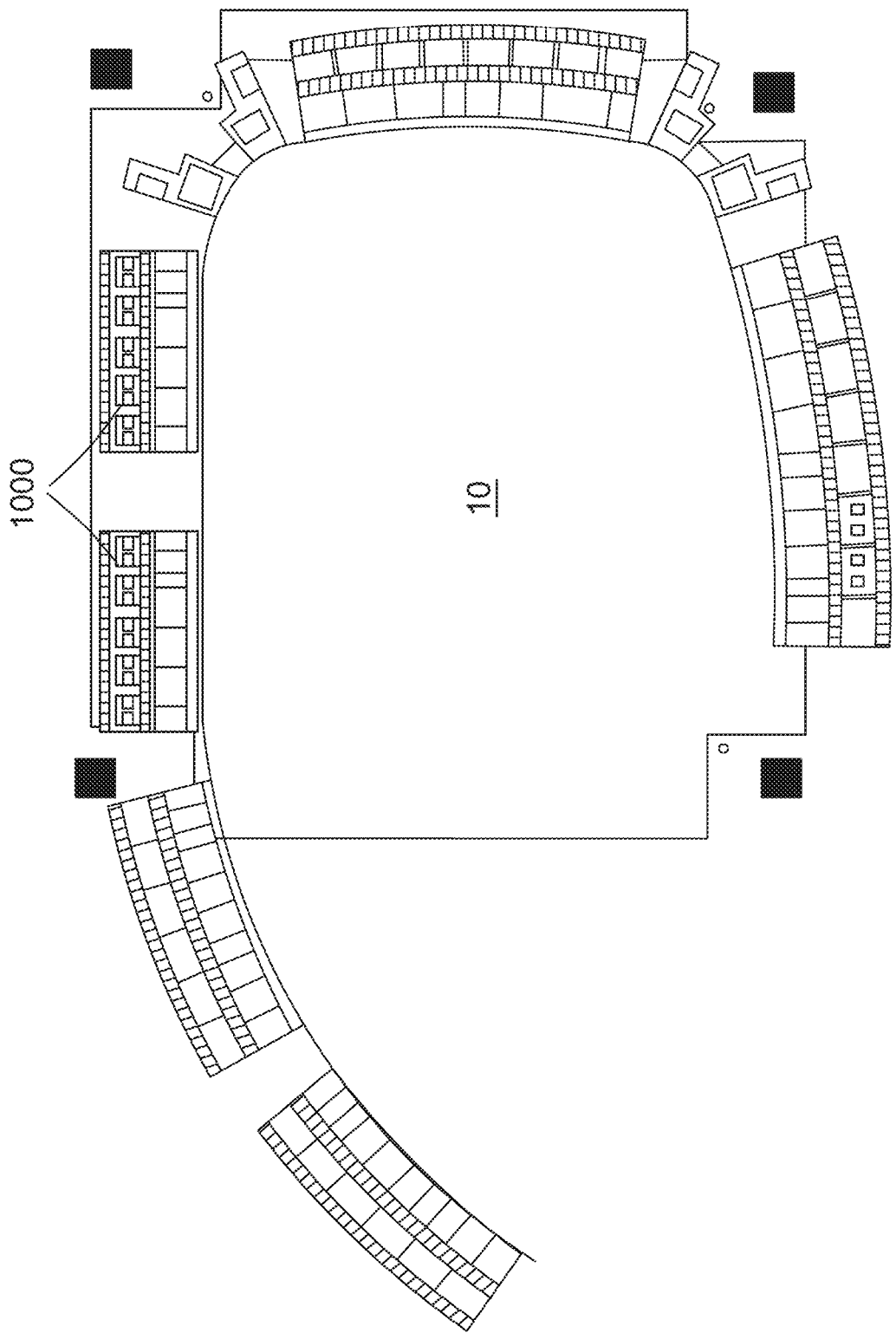
FIG. 30 is a top view of the modular LED wall in another assembly configuration.
Figure 31:
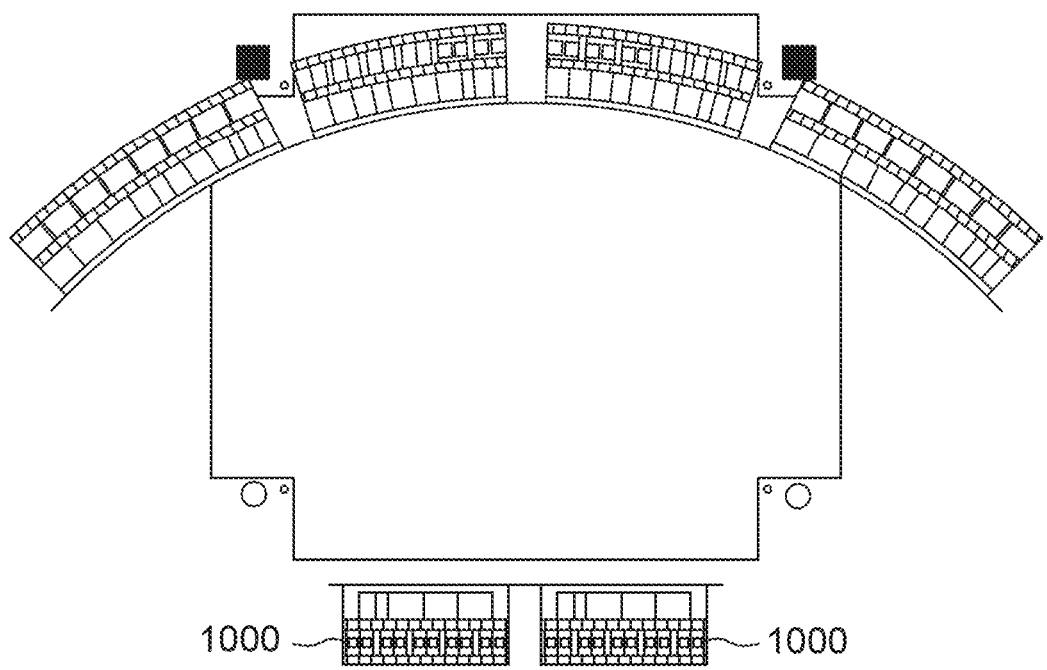
FIG. 31 is a top view of the modular LED wall in another assembly configuration.
Figure 32:
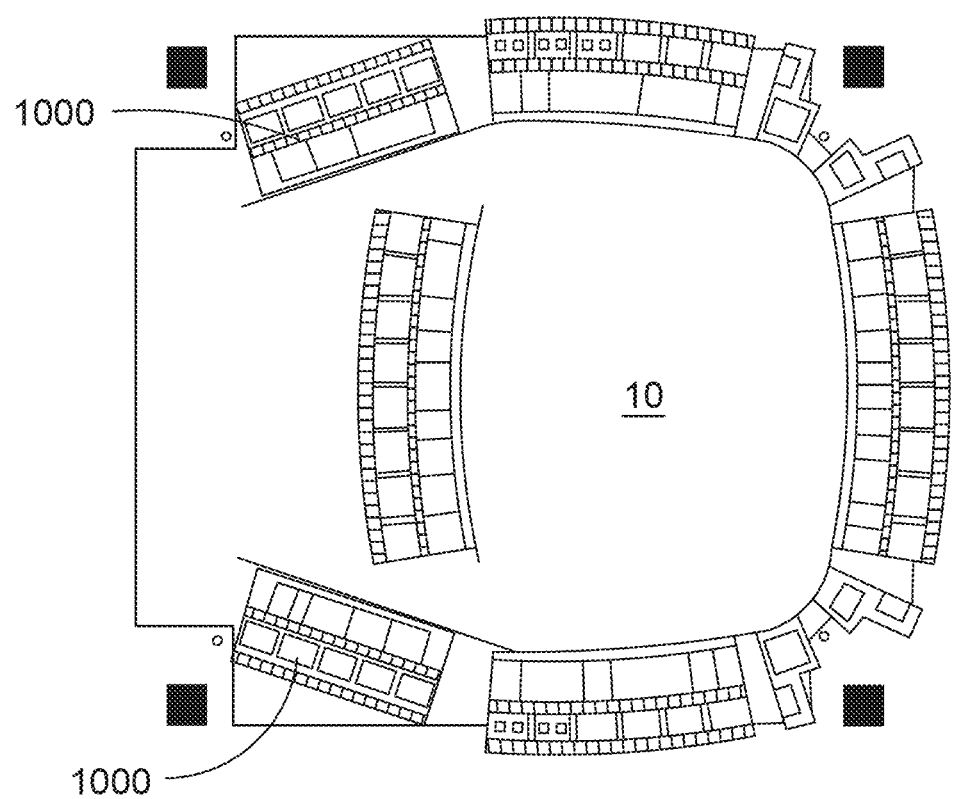
FIG. 32 is a top view of the modular LED wall in another assembly configuration.
Figure 33A:
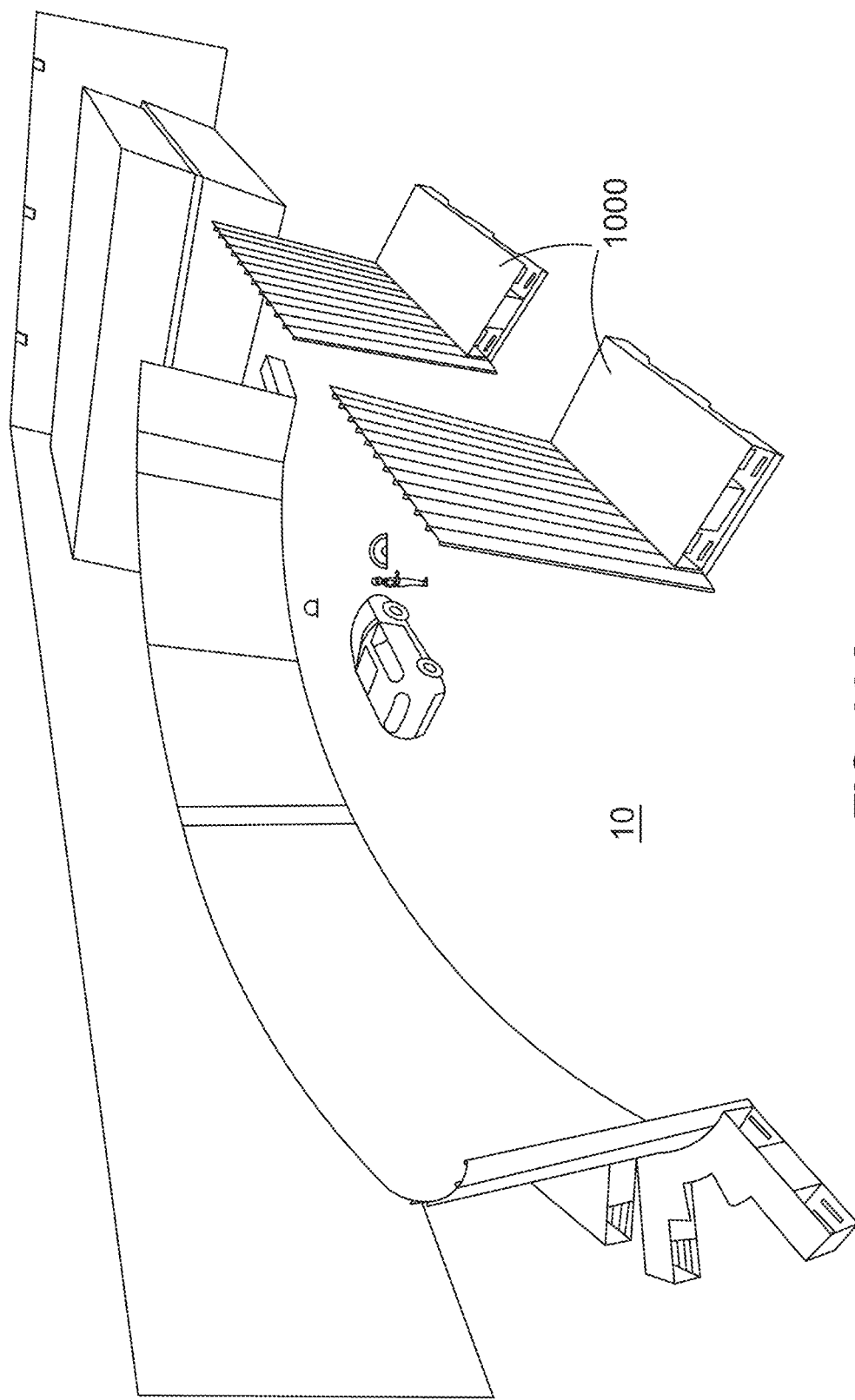
FIGS. 33A, 33B, 33C, 33D, 33E and 33F are top perspective views of the modular LED wall in various assembly configurations.
Figure 33B:
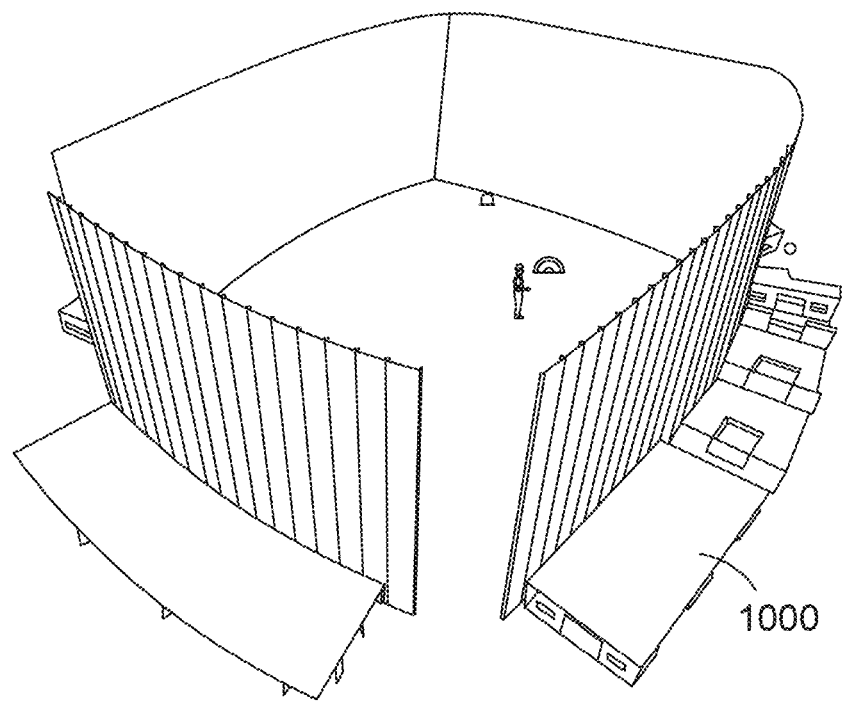
Figure 33C:
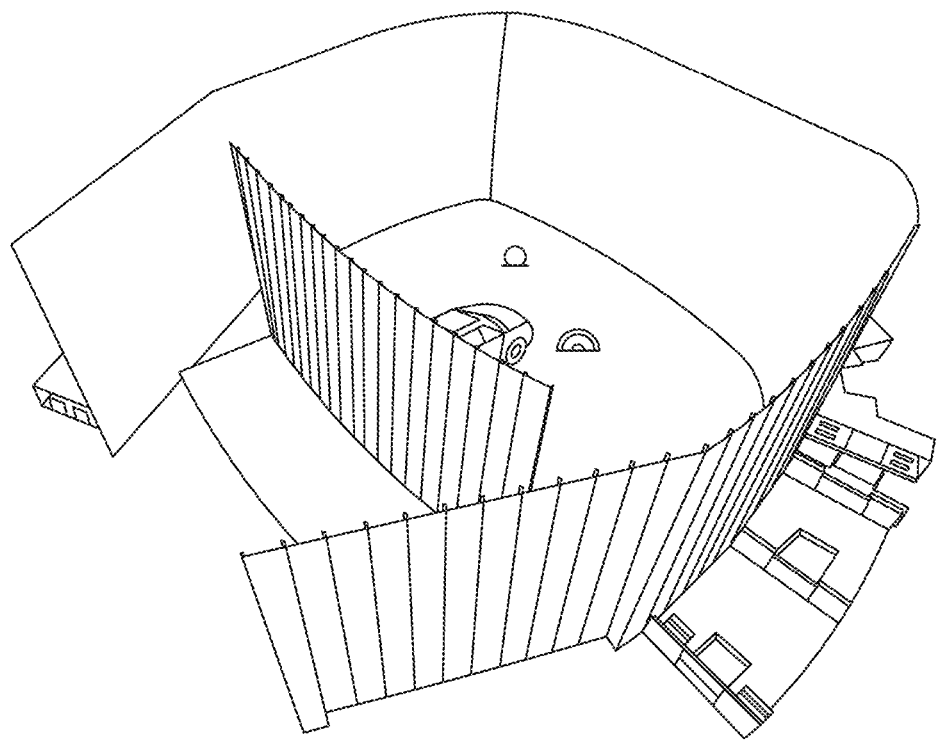
Figure 33D:
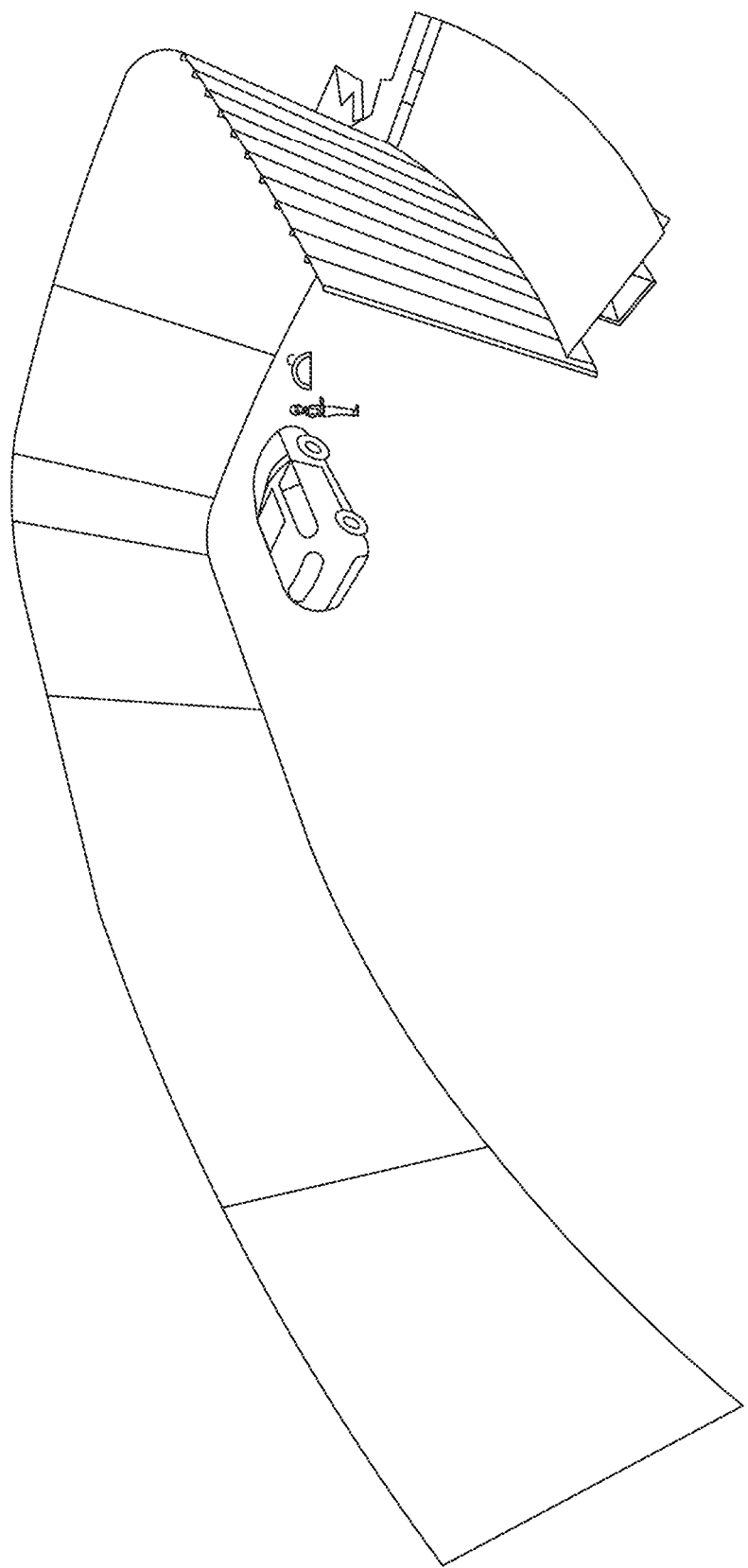
Figure 33E:
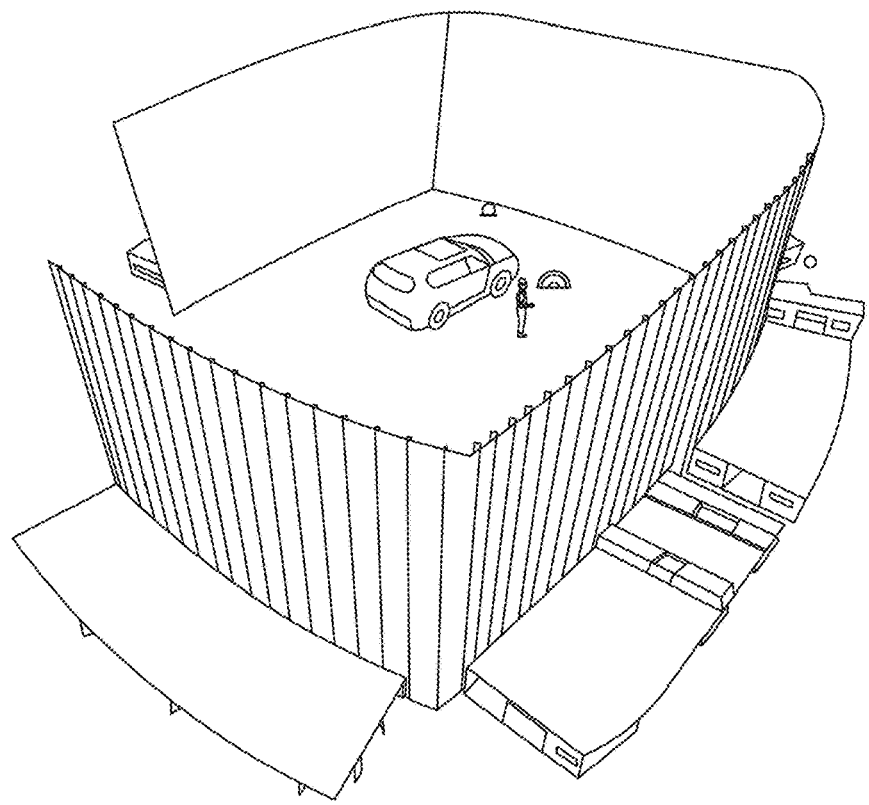
Figure 33F:
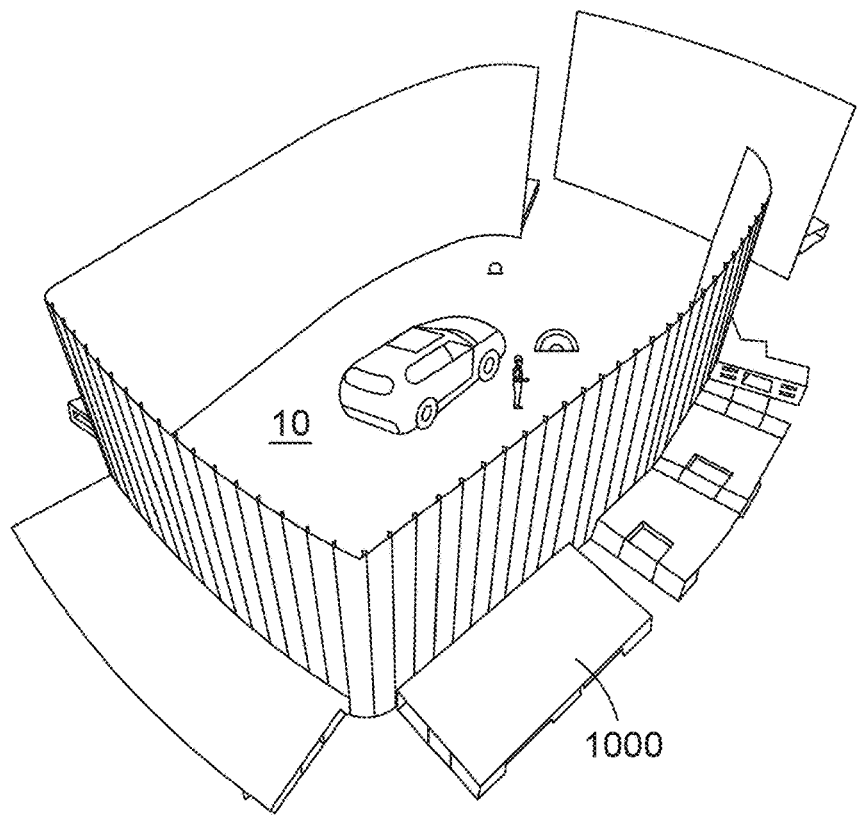
Figure 34:
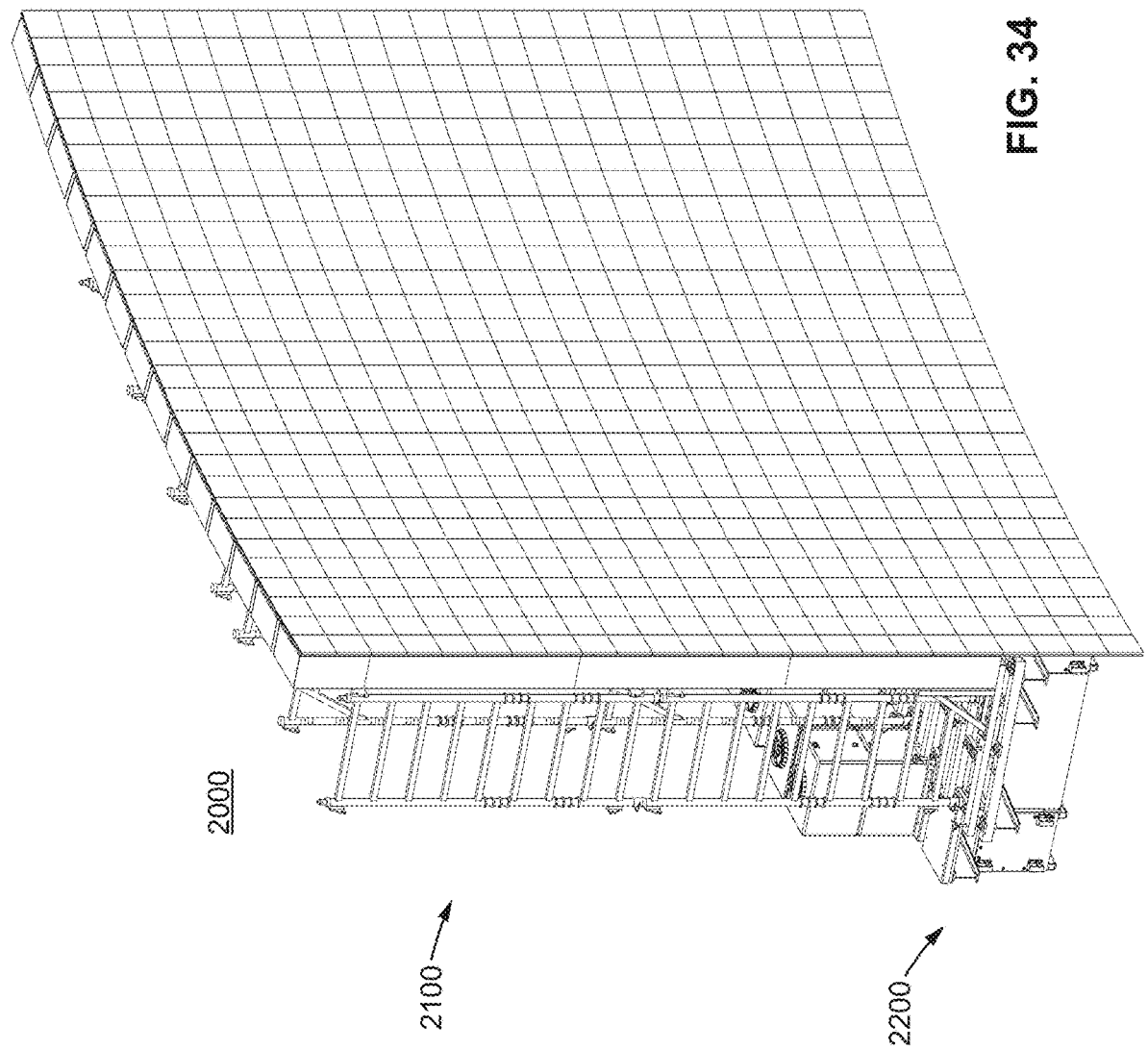
FIG. 34 is a front perspective view of another wall module according to an embodiment of the present disclosure.
Figure 35:
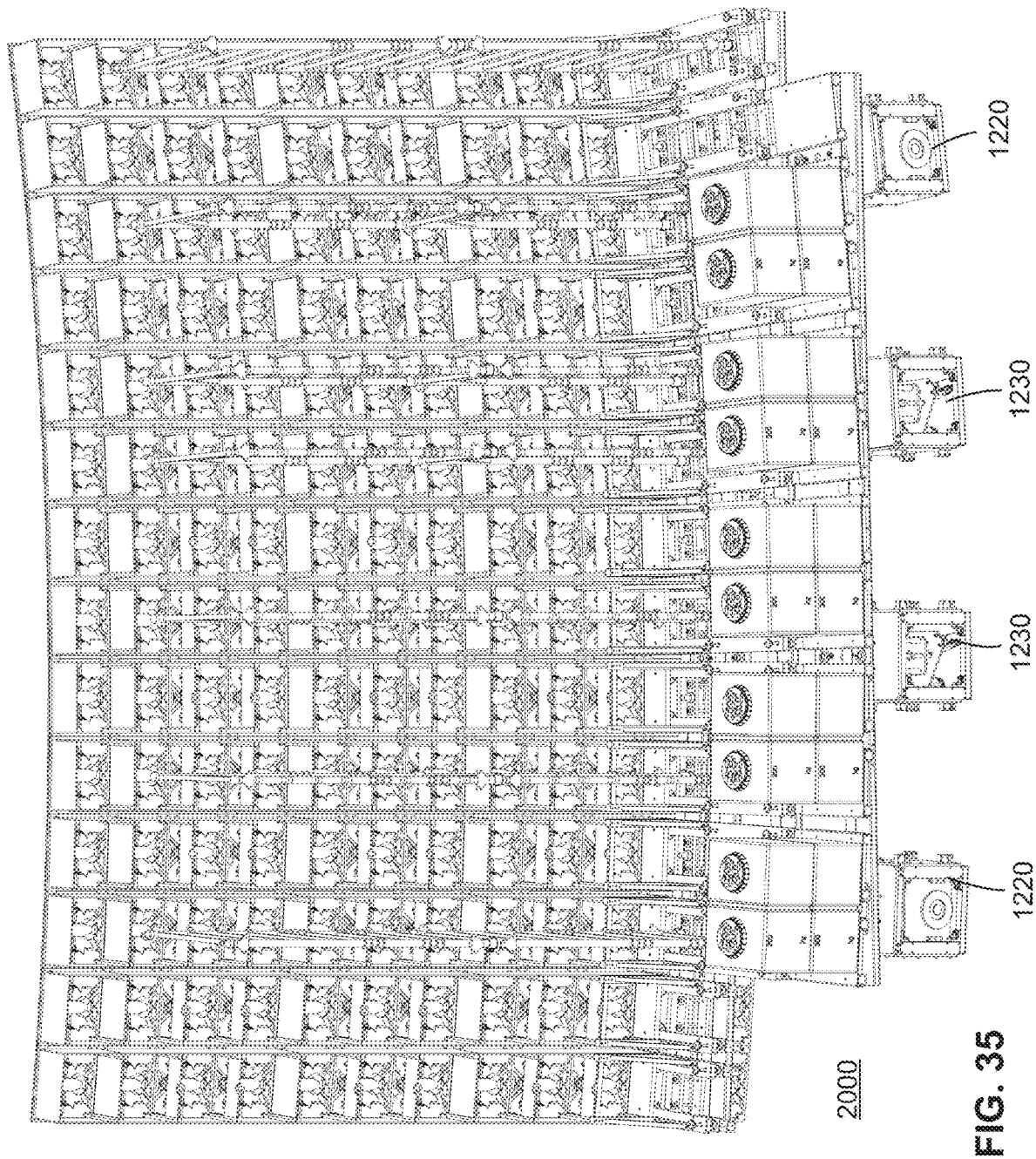
FIG. 35 is a rear perspective view of the wall module.
Figure 36:
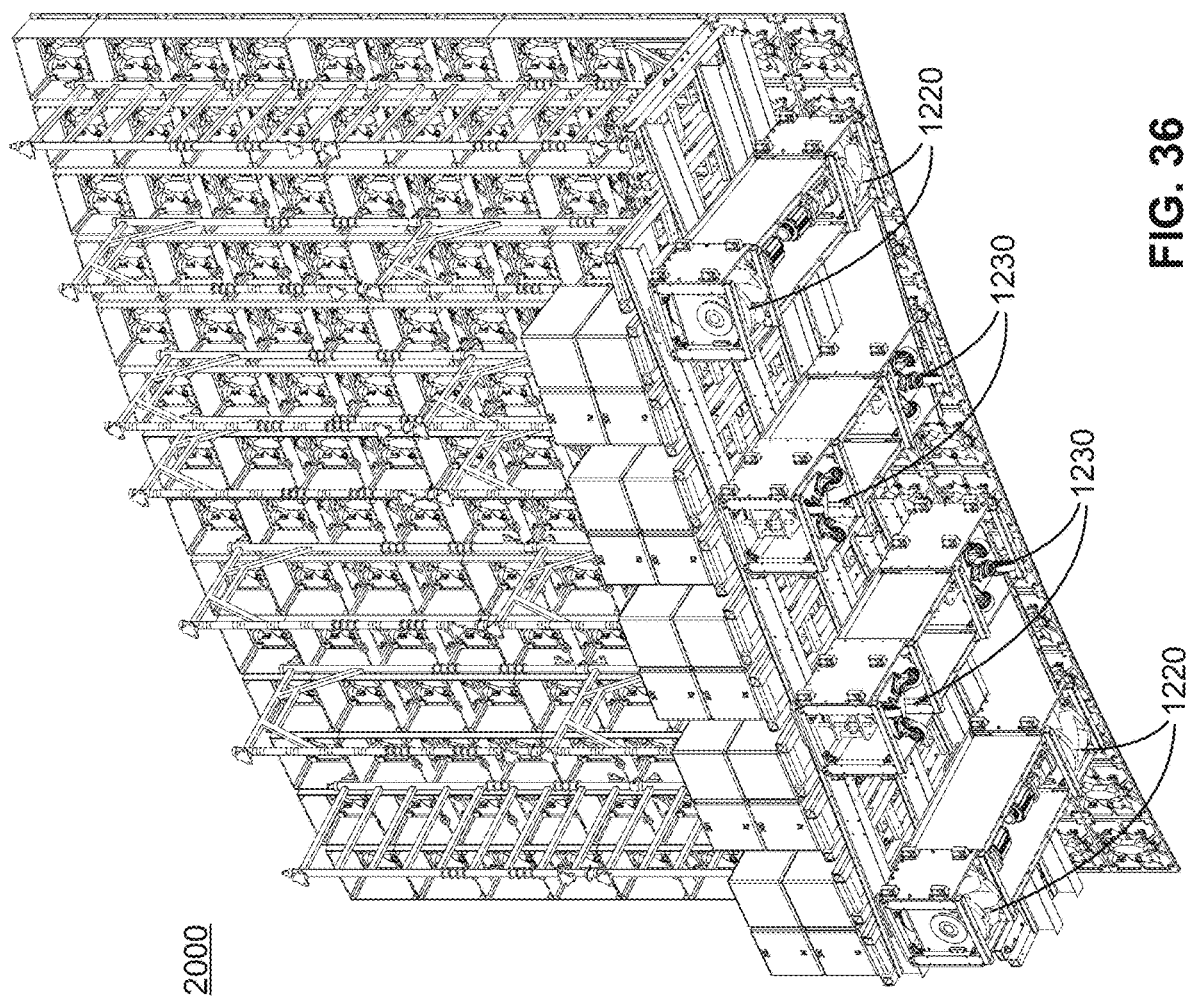
FIG. 36 is a bottom rear perspective view of the wall module.
Figure 37:
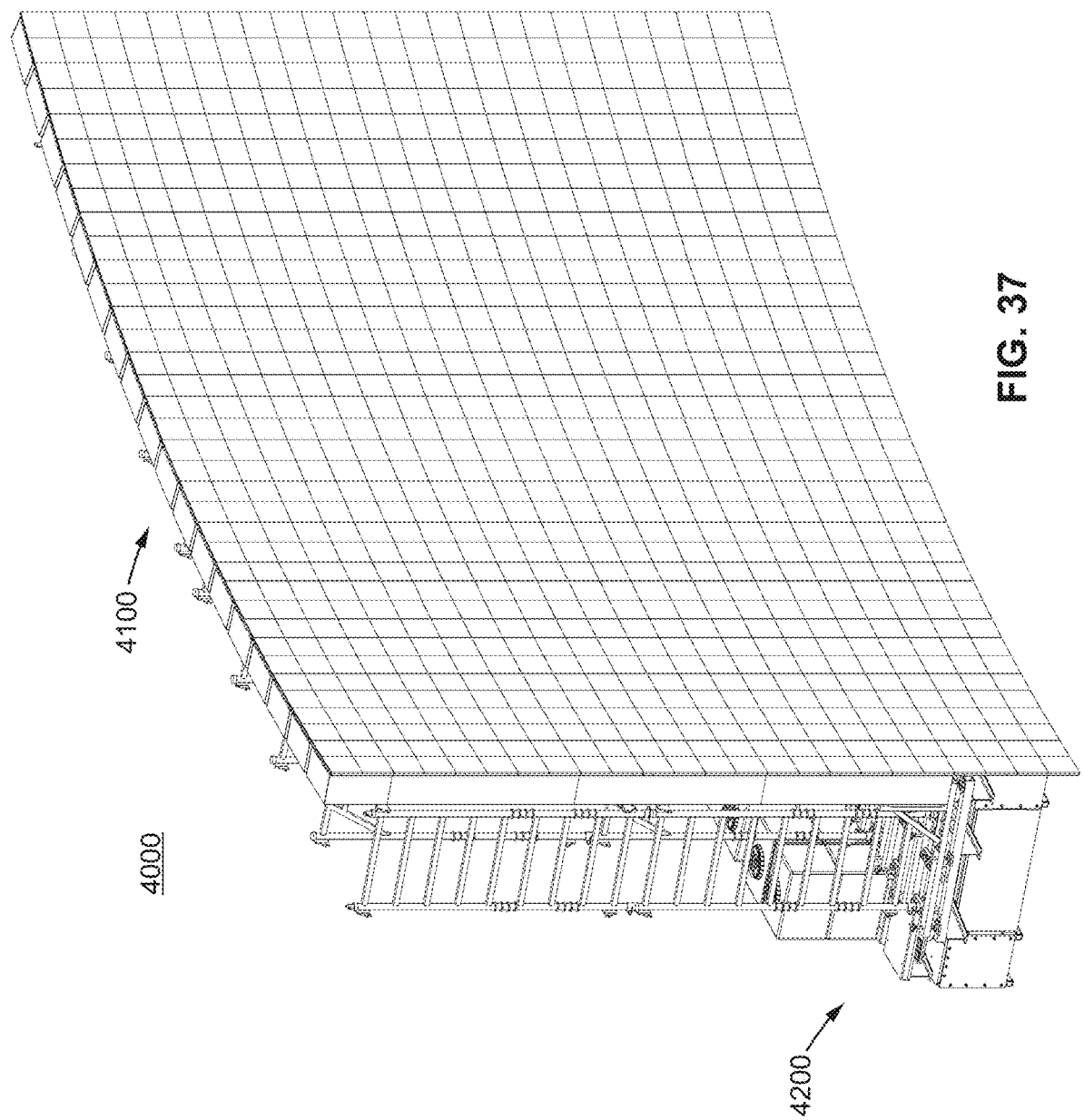
FIG. 37 is a front perspective view of another wall module according to an embodiment of the present disclosure.
Figure 38:
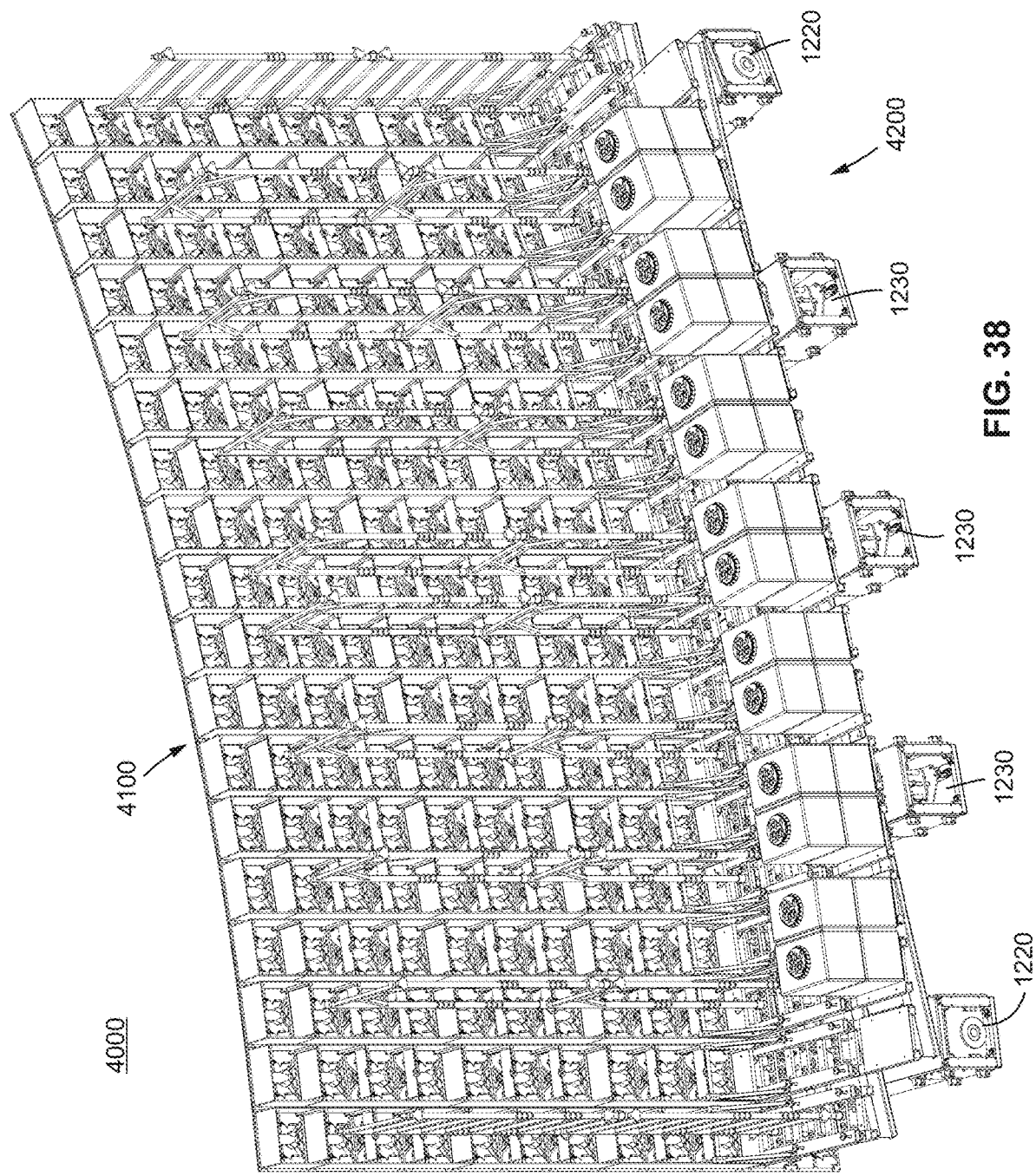
FIG. 38 is a rear perspective view of the wall module.
Figure 39:
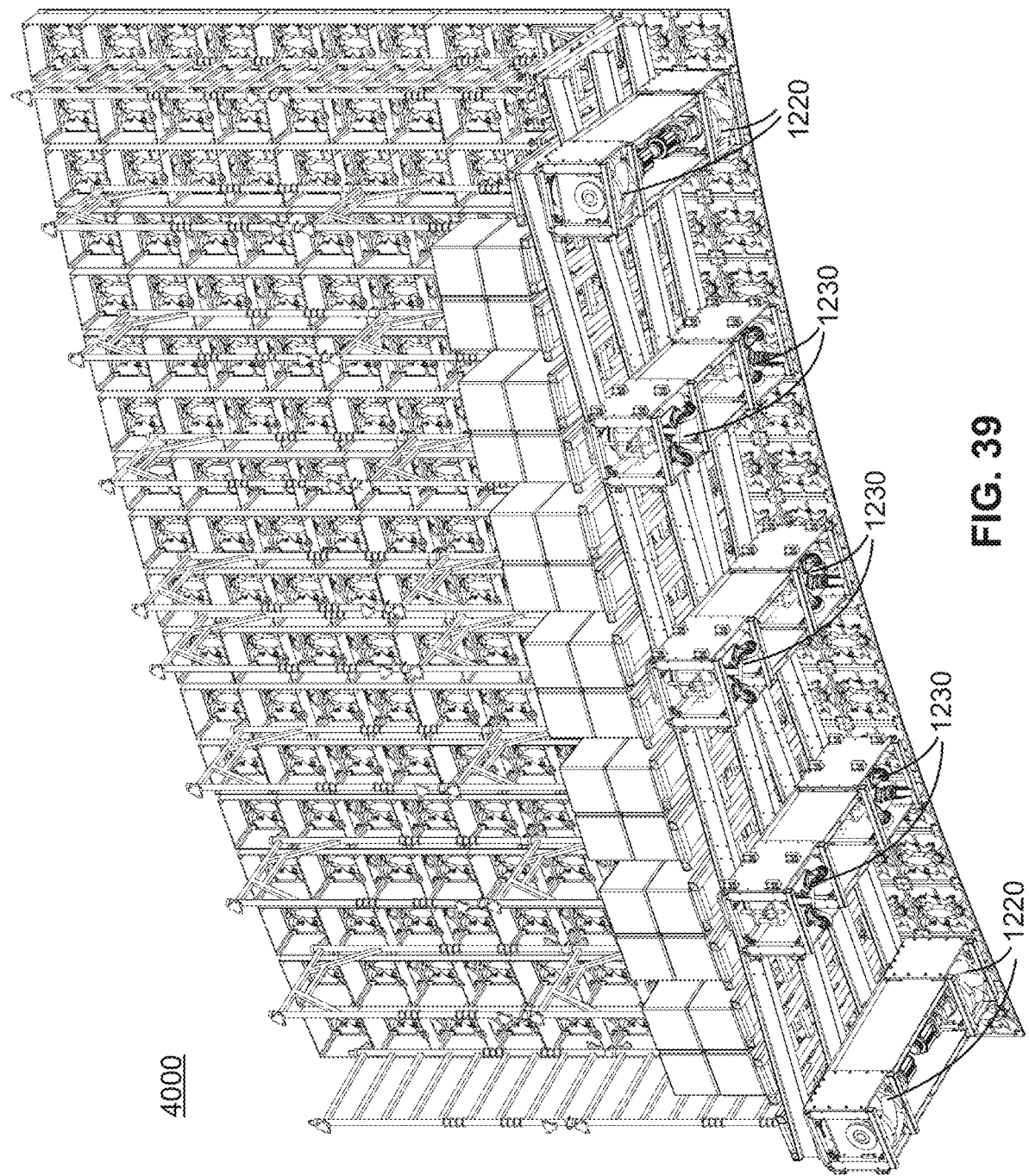
FIG. 39 is a bottom rear perspective view of the wall module.
Figure 40:
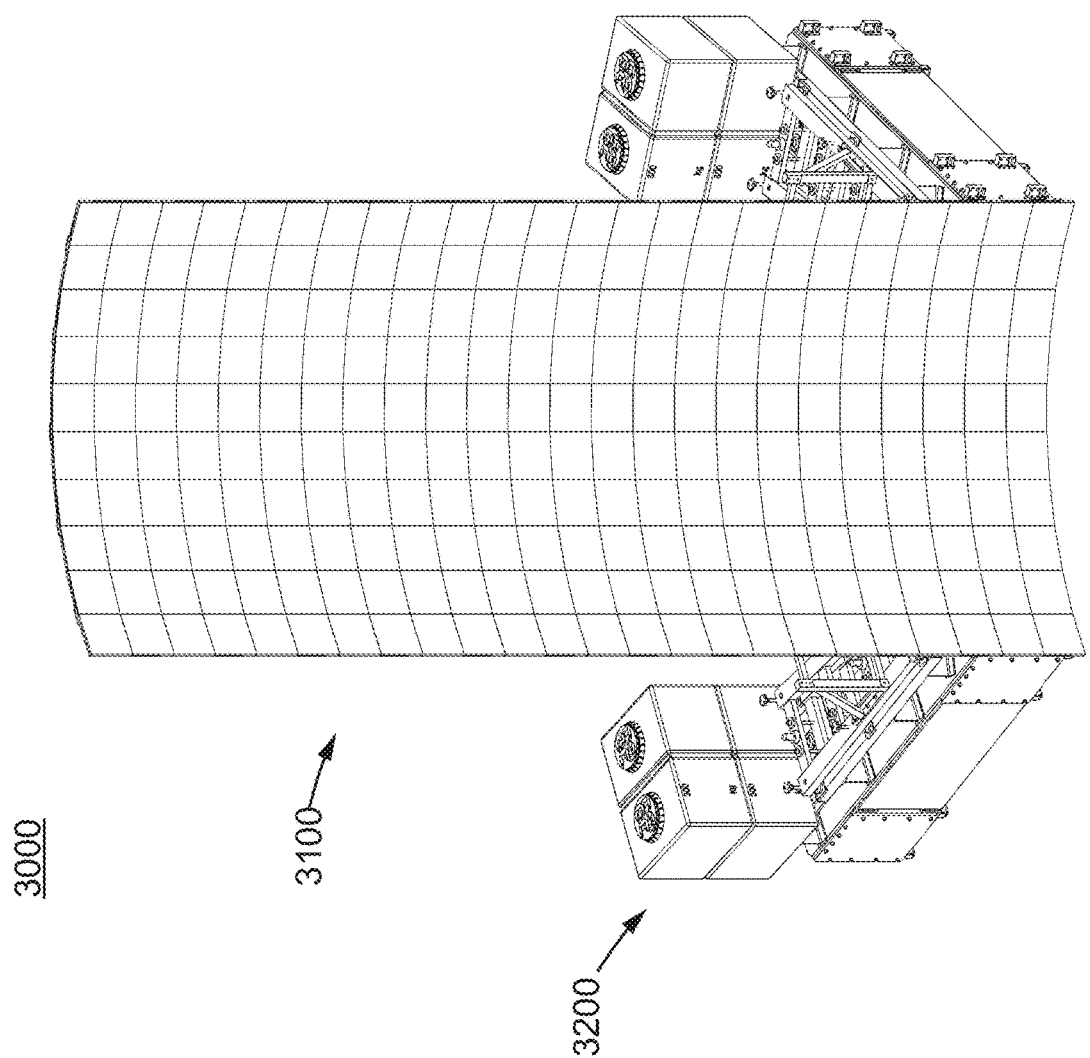
FIG. 40 is a front perspective view of another wall module according to an embodiment of the present disclosure.
Figure 41:
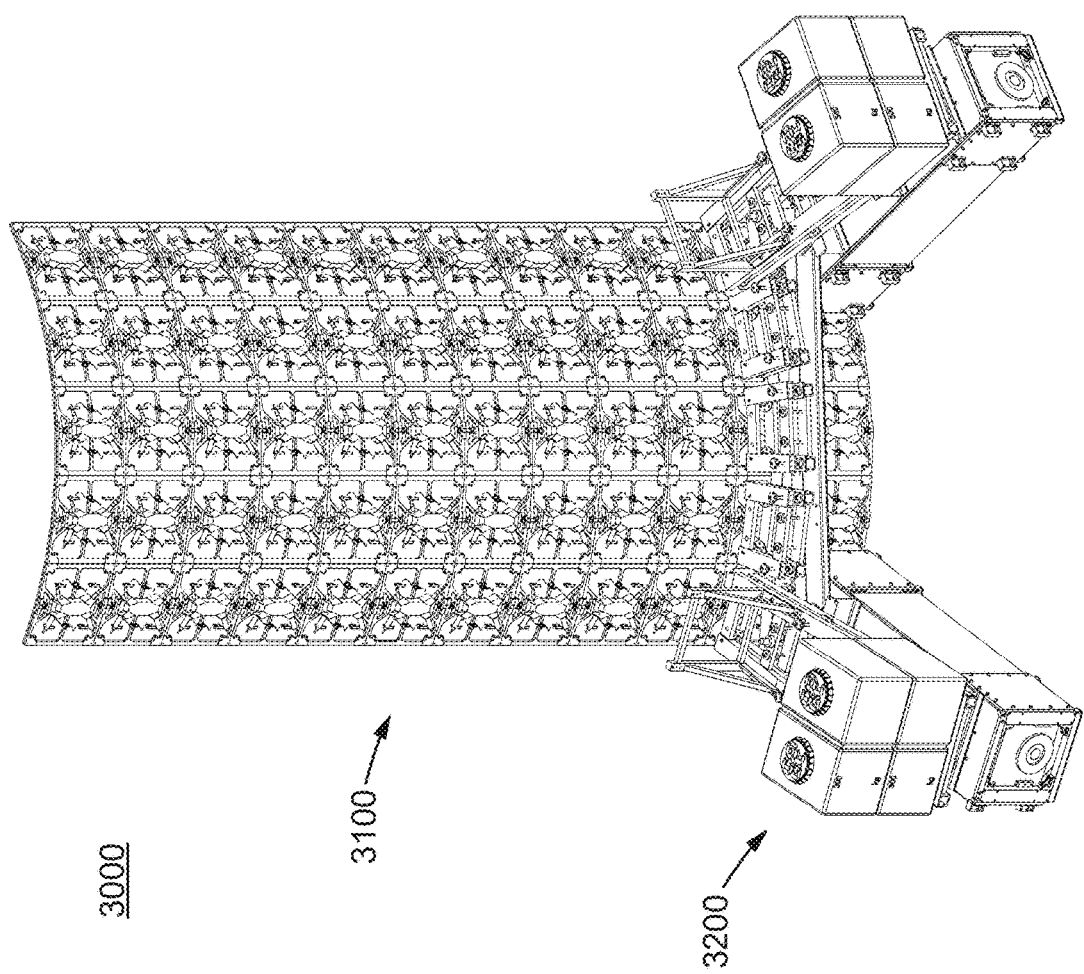
FIG. 41 is a rear perspective view of the wall module.
Figure 42:
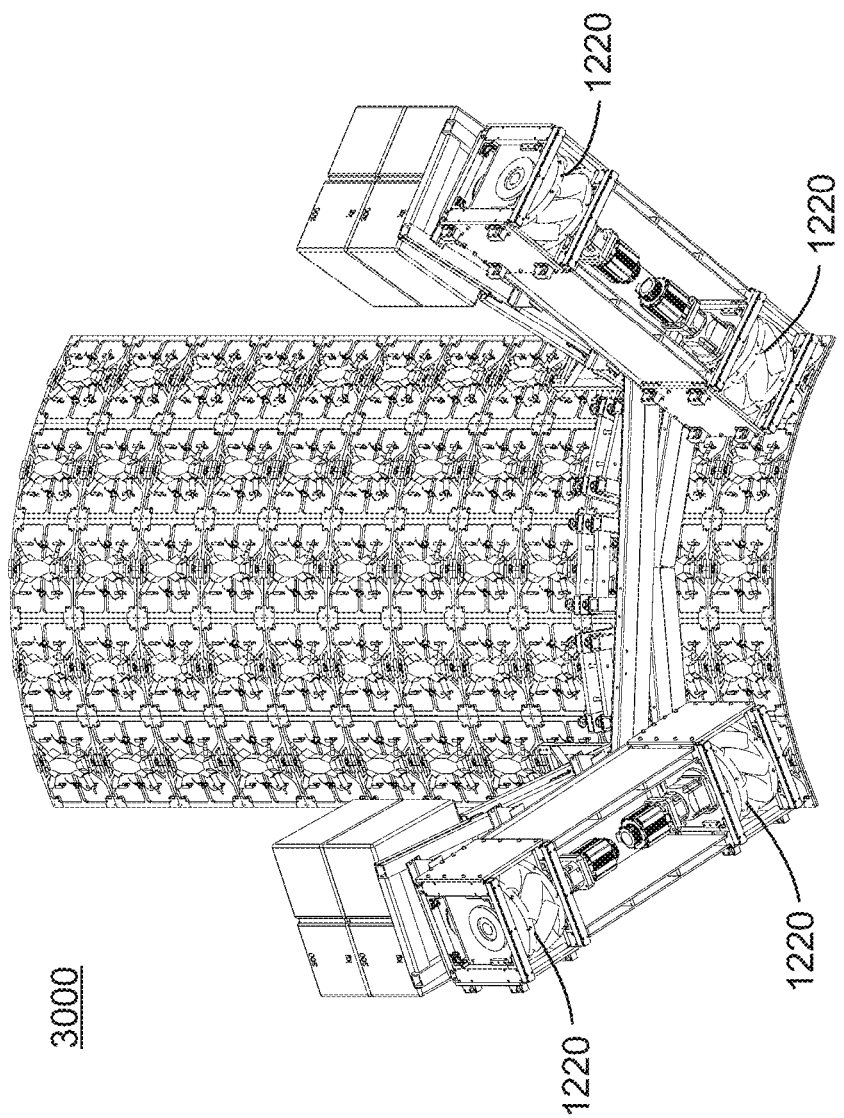
FIG. 42 is a bottom rear perspective view of the wall module.

Each of the first and second wall modules 1000 may include a plurality of alignment surfaces 1280, 1281 (see FIGS. 23-26). The plurality of alignment surfaces 1281 of the first wall module 1000*a* may be configured to mate with the plurality of alignment surfaces 1280 of the second wall module 1000*b* when the respective arrays of LED panels 1100 are aligned (e.g., by a groove or indentation on one and a corresponding protrusion on the other). One or both of the wall modules 1000 may include a plurality of clamps 1282 (e.g., over-center clamps) operable to connect the wall modules 1000 together when the respective arrays of LED panels 1100 are aligned. The alignment surfaces 1280, 1281 may be side plates that interconnect the first and second wall modules 1000, with the angle between each wall module 1000 being determined by the angle of the plates (which may be adjustable for different configurations). For each of the first and second wall modules 1000, the truck 1200 may comprise a support assembly 1210 including a first support base 1212 fixed to the array of LED panels 1100, a second support base 1214 engageable with the first support base 1212, and a plurality of ball bearings 1250 arranged between the first and second support bases 1212, 1214 to allow relative movement of the first and second support bases 1212, 1214 in a plane parallel to the stage surface 10. The truck 1200 may further comprise a plurality of omnidirectional wheels 1220 arranged to enable omnidirectional movement of the second support base 1214 along the stage surface 10. The truck 1200 may further comprise one or more first actuators 1240 operable to adjust a height of the support assembly at a plurality of positions on the support assembly 1210 to enable leveling of the support assembly 1210 relative to the stage surface 10. The ball bearings 1250 may allow the relative movement of the first and second support bases 1212, 1214 during operation of the plurality of clamps 1282 to connect the first wall module 1000*a* to the second wall module 1000*b*, resulting in a visually seamless modular wall as shown in FIG. 27. In this way, manual operation of the clamps 1282 may effectively complete the alignment of the first and second wall modules 1000. It is also contemplated that alignment may be performed automatically by the first and second wall modules 1000 based on sensor data collected from sensors 1300 (e.g., magnetic sensors, RFIDs and RFID readers, cameras, etc., see FIG. 25). For example, a camera or other optical sensor on one assembly may visually determine alignment by recognizing a marker (e.g., fiducial marker, QR code, etc.) on another assembly. This can be achieved using computer vision techniques such as those provided by OpenCV (see URL opencv.org).

Figure 4:
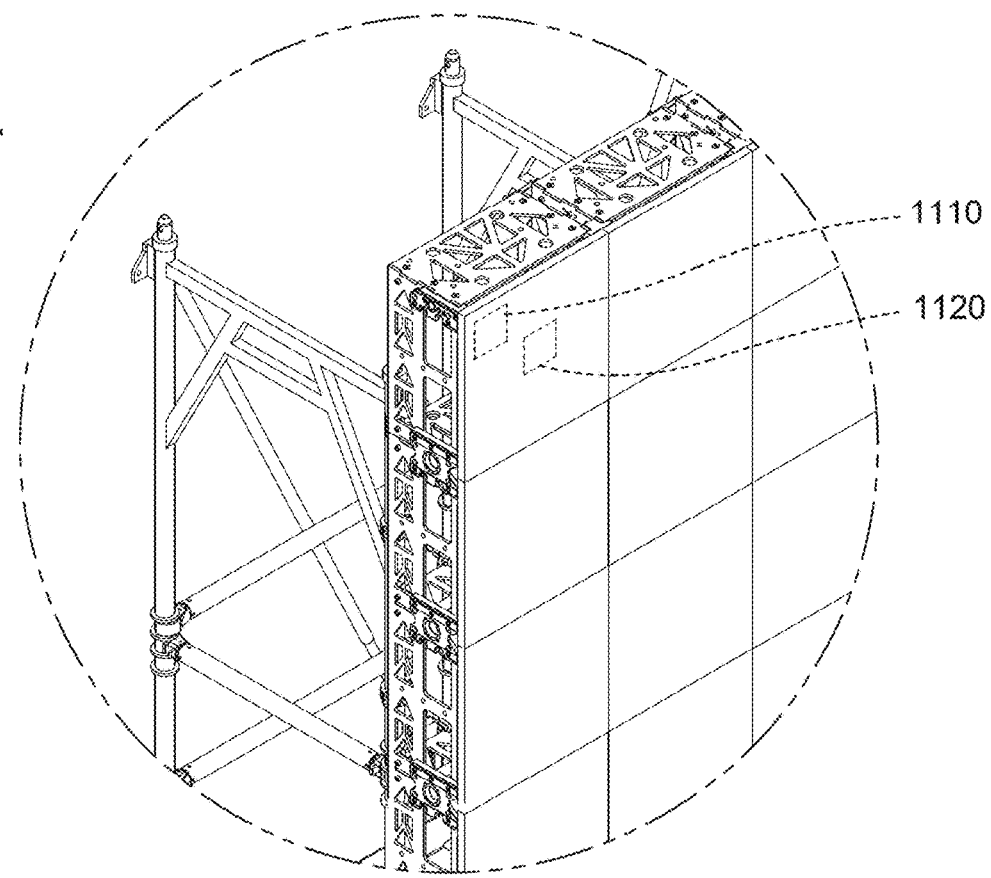
FIG. 4 is an enlarged view of a portion of FIG. 1.
Figure 5:
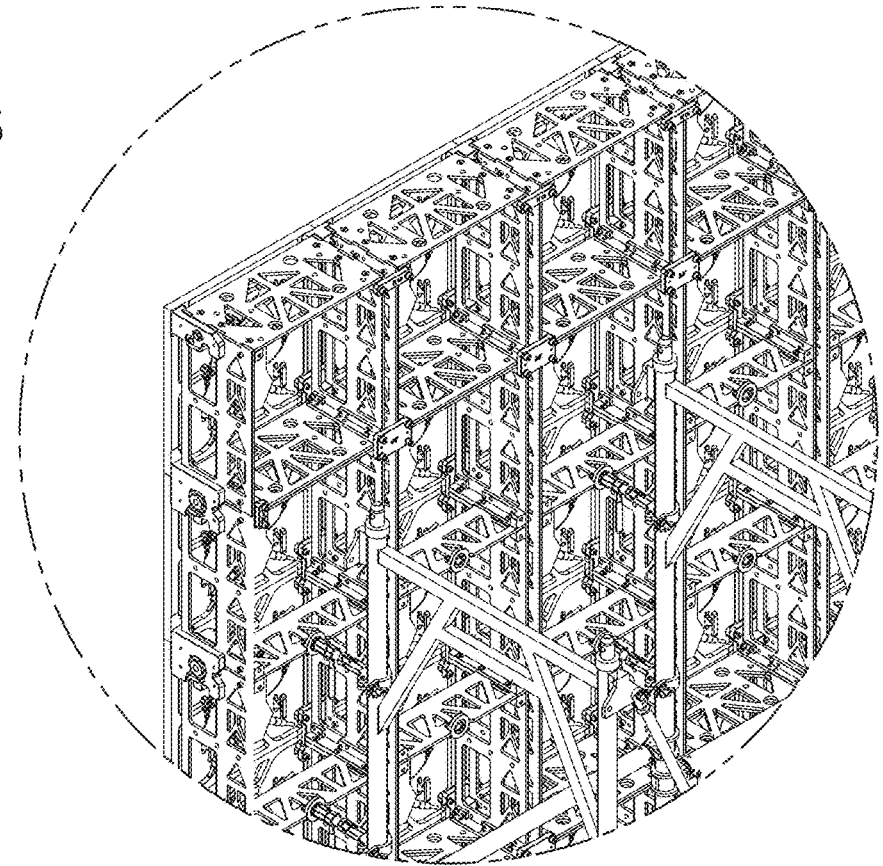
FIG. 5 is an enlarged view of a portion of FIG. 2.

The display produced by the array of LED panels 1100 may be generated by a game engine (e.g., Unreal game engine, Unity game engine, Godot game engine, etc.), or other software capable of mapping a 3D virtual environment to an arrangement of 2D display screens (e.g., CAD software, Blender, etc.). To this end, information defining the arrangement of wall modules 1000, including alignment/ leveling information that may be collected as described herein, may be provided to the game engine or other software in the form of software packets (e.g., TCP packages, UDP packets, JSON files, XML files, etc.), allowing for real-time data for visualization of the arrangement in the engine/software. In view of the fact that each wall module 1000 may need to be accounted for on an individual basis, it is contemplated that each wall module 1000 may format its own sensor data to produce the software packets to be transmitted. Contemplated position data included in the sensor data collected by sensors 1300 may be asset management/tracking data (e.g., RFID used to track the wall module 1000 within a building) as well as more precise position/leveling/curvature data (e.g., LIDAR scanning data, vSLAM data, etc.), both relative to other wall modules 1000 and relative to an absolute location (e.g., a location in a building). The game engine or other software may be capable of rendering each LED panel of the array 1100 individually based on the precise position of the wall module 1000. In a case where the sensor data indicates that there is a visible gap or seam between two wall modules 1000 (or between a wall module 1000 and a stationary ceiling, floor, or wall), it is contemplated that the game engine or other software may deemphasize or eliminate such visible gaps in rendering. Additional sensor data that may be provided from the wall modules 1000 to the game engine or other software may include tracking data of people (e.g., actors) or objects within the studio volume being used. For example, tracking solutions such as sensors 1110 (see FIG. 4) may be embedded within the arrays of LED panels 1100 themselves, e.g., IR lamps or LEDs within the structure of RGB lamps or LEDs of an LED panel of the array 1100, which may be phased differently so that sync coming from timing systems is offset to ensure captured video via a camera disposed within the filming volume formed by the LED walls does not generate moiré patterns or generate noticeable rendering scan lines in the final captured images.

Figure 14:
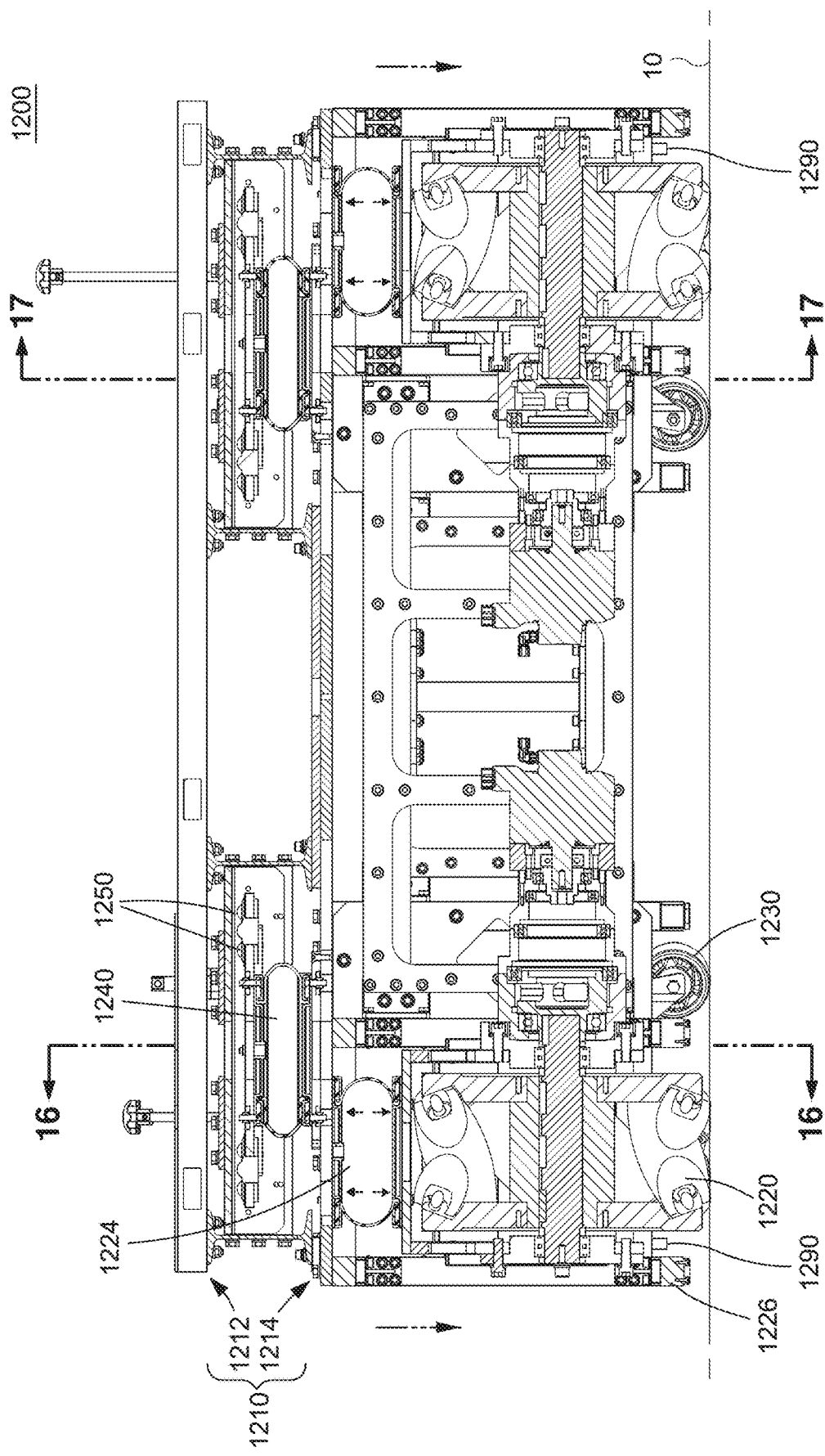
FIG. 14 is a cross-sectional view taken along the line 14-14 in FIG. 13.
Figure 15:
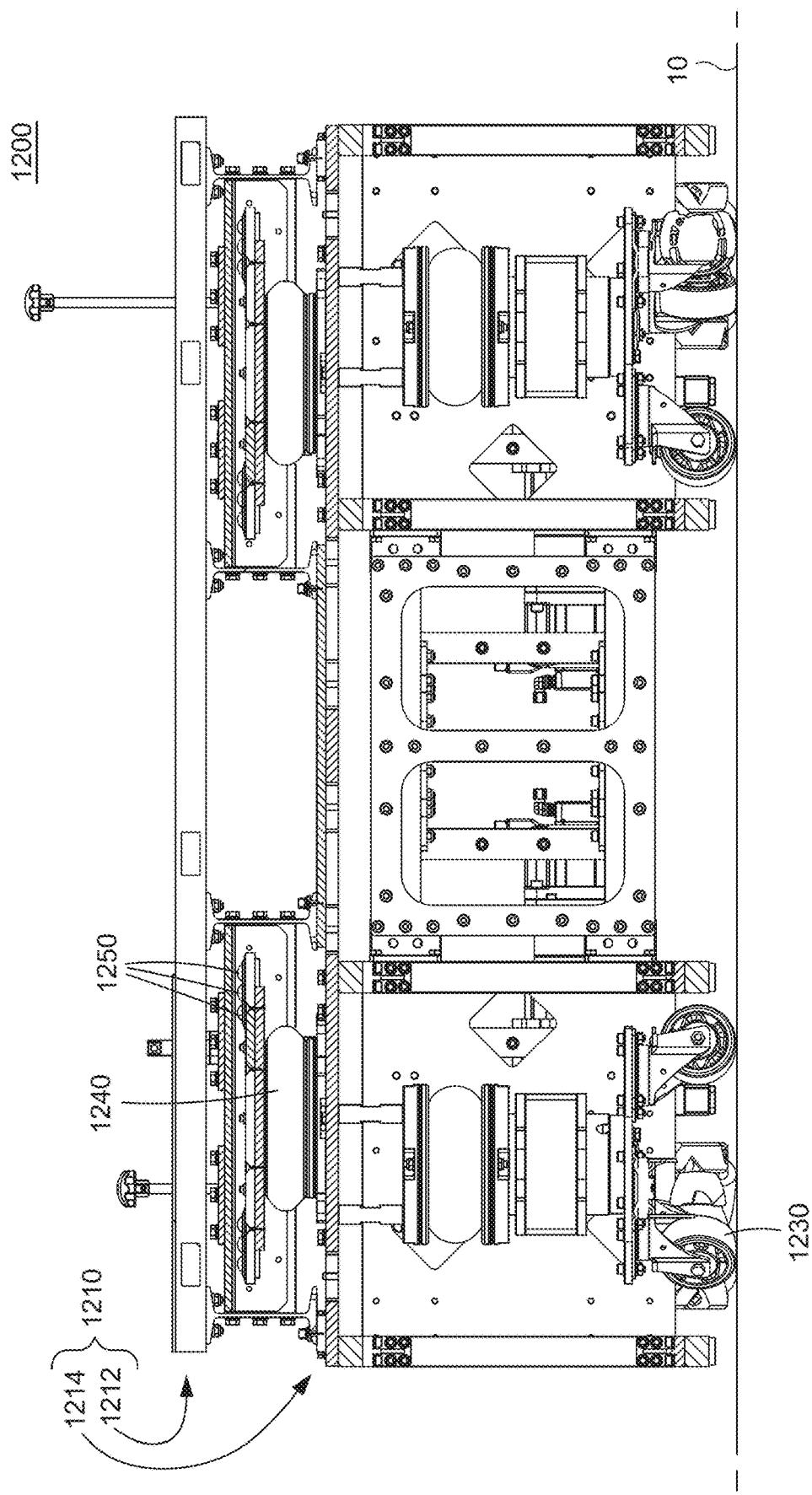
FIG. 15 is a cross-sectional view taken along the line 15-15 in FIG. 13.
Figure 19:
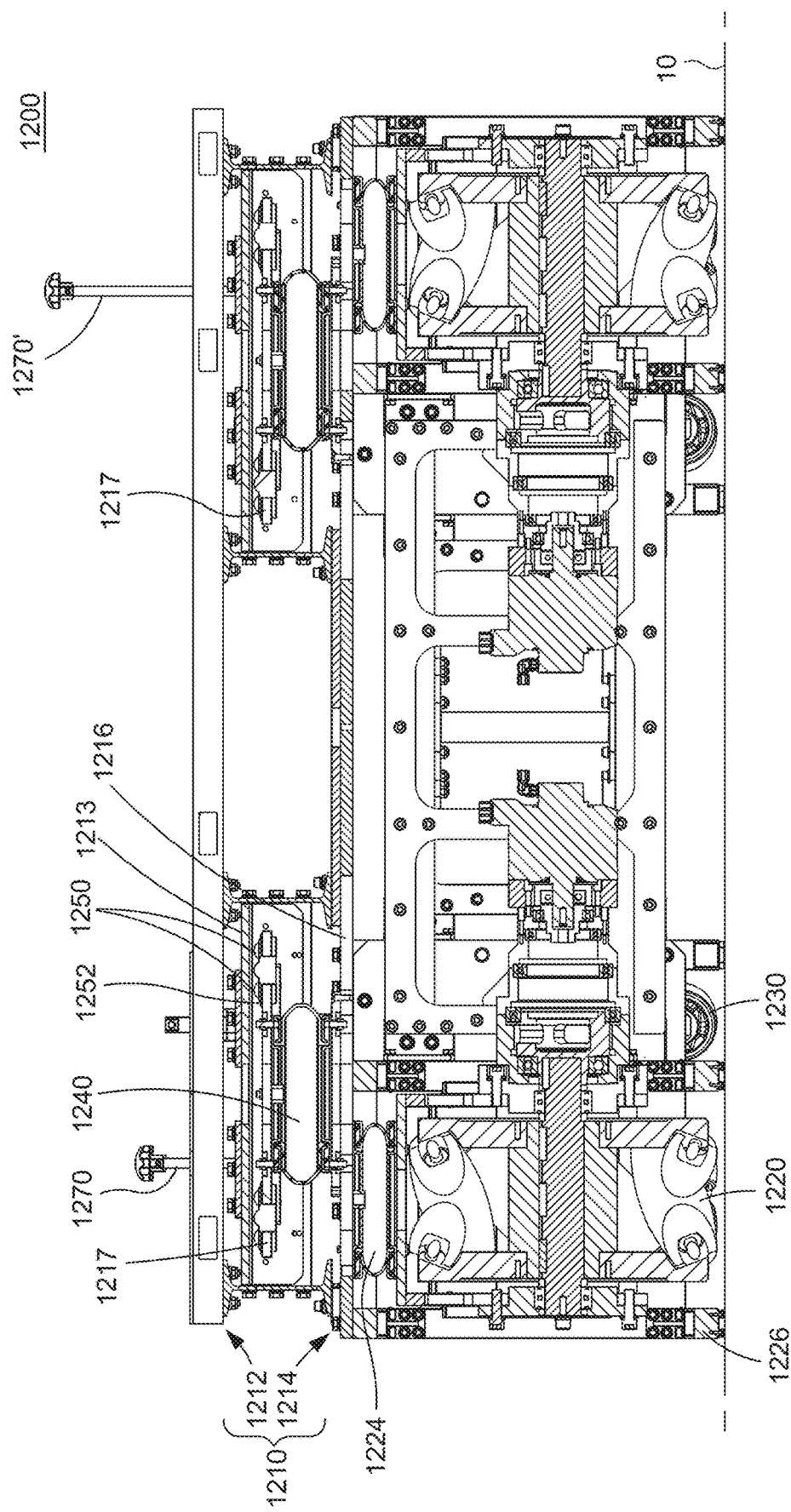
FIG. 19 is another cross-sectional view taken along the line 14-14 in FIG. 13 showing the truck in another state.

An exemplary procedure for connecting two wall modules 1000 may begin with moving a first of the two wall modules 1000 into a desired position. For example, as shown in FIG. 14, the bladders 1224 of the first wall module 1000 may be pressurized (or, more generally, the second actuators 1224 may be actuated) to put pressure on the omnidirectional wheels 1220 and lift the feet 1226 off the stage surface 10. In this state, the wall module 1000 may roll on the omnidirectional wheels 1220 and any passive wheels 1230 that are provided. The omnidirectional wheels 1220 may be controlled to move the wall module 1000 into the desired position, after which the pressure in the bladders 1224 may be released (or the second actuators 1224 actuated) so that the wall module 1000 stands on the stage surface 10 on feet 1226 as shown in FIG. 19, preventing further movement. It is contemplated that the desired position may be projected on the floor for ease of positioning by a human operator. Alternatively, the movement of the wall module 1000 may be performed automatically so as to operate as a programmable robot. Preset wall configurations (e.g., JSON files, etc.) may be loaded in software, and the wall modules 1000 may automatically move into relative and/or absolute position according to the preset configurations using feedback from position sensors 1300 as described herein.

Figure 20:
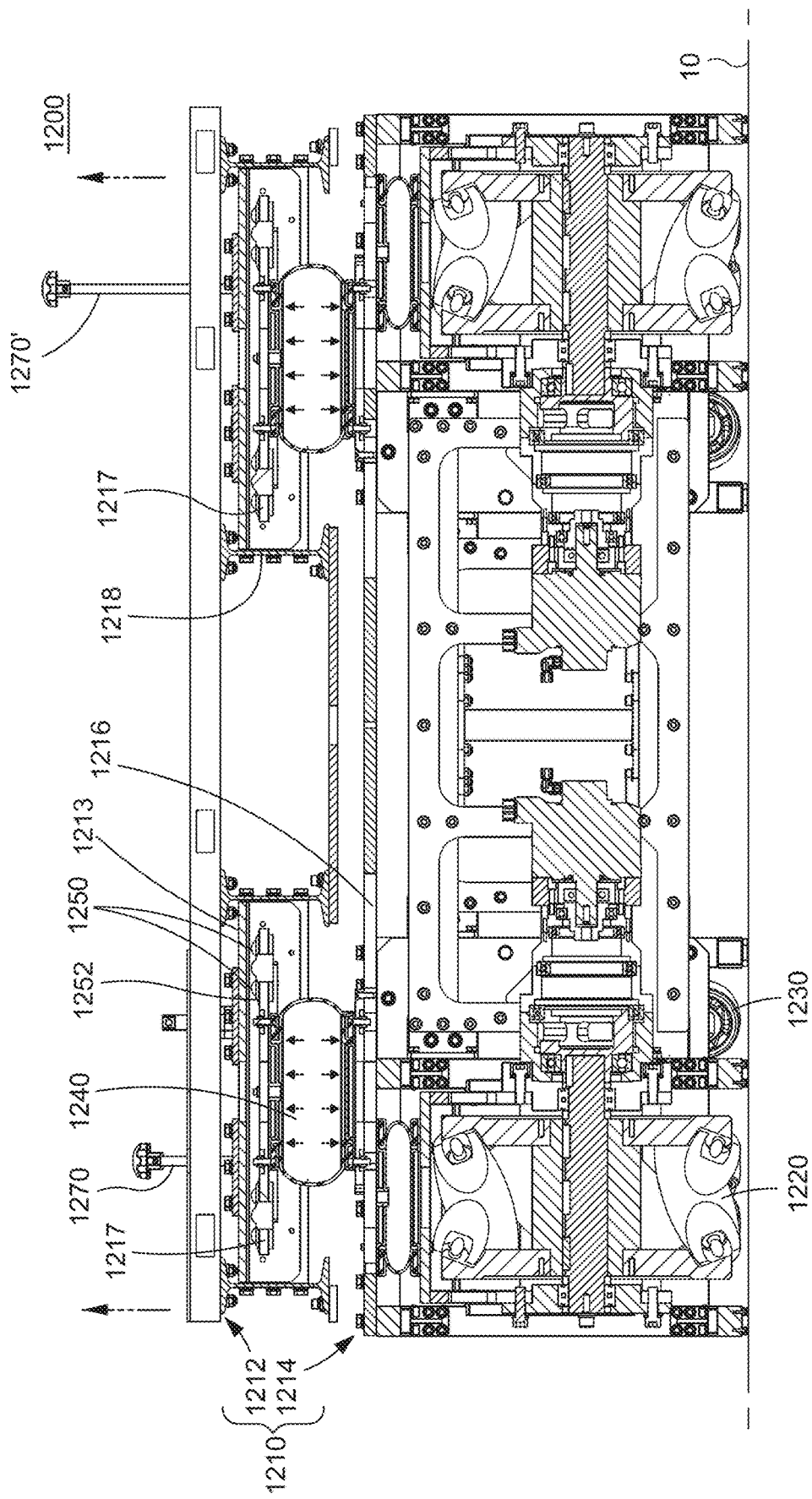
FIG. 20 is another cross-sectional view taken along the line 14-14 in FIG. 13 showing the truck in another state.

The vertical position of the array of LED panels 1100 may then be leveled to account for any unevenness of the stage surface 10 or otherwise adjusted using the first actuators 1240. For example, as shown in FIG. 20, first actuators 1240 at different horizontal positions on the truck 1240 (e.g., at each of four corners of the truck 1240 or at six positions as illustrated) may be actuated by inflating bladders 1240 by different amounts in order to adjust y-axis, pan, and/or tilt. In particular, as each bladder 1240 is inflated, a corresponding sub-assembly 1217 defining sockets 1252 for the ball bearings 1250 is raised, lifting the entire first support base 1212 relative to the main body 1216 of the second support base 1214. By inflating the bladders 1240 (or otherwise actuating the first actuators 1240) by different amounts, a precise leveling of the first support base 1212 may be achieved as desired. The array or LEDs 1100, which may be fixed to the first support base 1212, may be leveled accordingly. Various software and/or hardware leveling solutions are contemplated to assist or improve upon manual leveling that may be performed by the eye of the user. Examples may include the use of laser levels, mirrors, and gyroscopes, as well as LIDAR scanning point cloud management (e.g., finding a delta of a known point cloud using RMS). In some cases, leveling may be performed using pose estimation techniques as described in co-owned U.S. Pat. No. 11,924,561, issued Mar. 5, 2024 and entitled "DETERMINING A CAMERA CONTROL POINT FO VIRTUAL PRODUCTION" and co-owned U.S. Patent Application Pub. No. 2024/0020851, filed Jul. 10, 2023 and entitled "VIRTUAL PRODUCTION BASED ON DISPLAY ASSEMBLY POSE AND POSE ERROR CORRECTION," the entire contents of each of which is incorporated by reference herein.

It is contemplated that the leveling of the first support base 1212 to account for unevenness in the stage surface 10 may proceed even though the second support base 1214 isn't level relative to the stage surface 10. Alternatively, the second support base 1214 may include sensors 1290 (e.g., laser measuring devices on four corners of the truck 1240, LIDAR, RFID, etc., see FIG. 14) that determine the degree of leveling offset between the main body 1216 of the second support base 1214 and the stage surface 10. The attitude of the first support base 1212 may then be adjusted based on the determined offset between the main body 1216 of the second support base 1214 and the stage surface 10, without there necessarily being a need to level the first support base 1212 relative to the stage surface 10.

Figure 16:
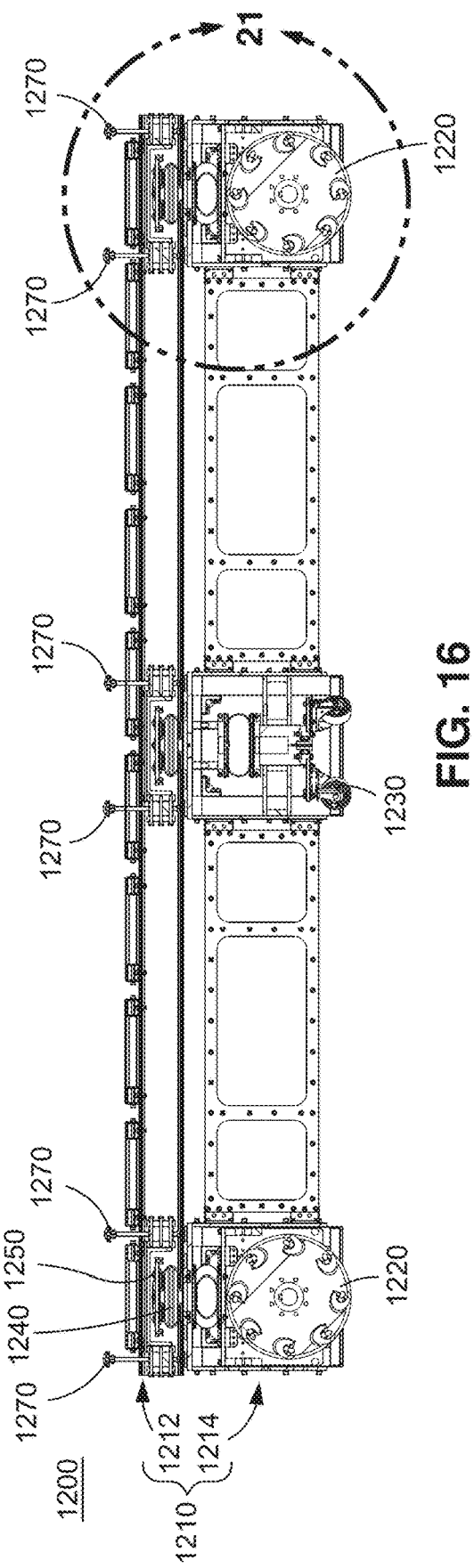
FIG. 16 is a cross-sectional view taken along the line 16-16 in FIG. 14.
Figure 17:
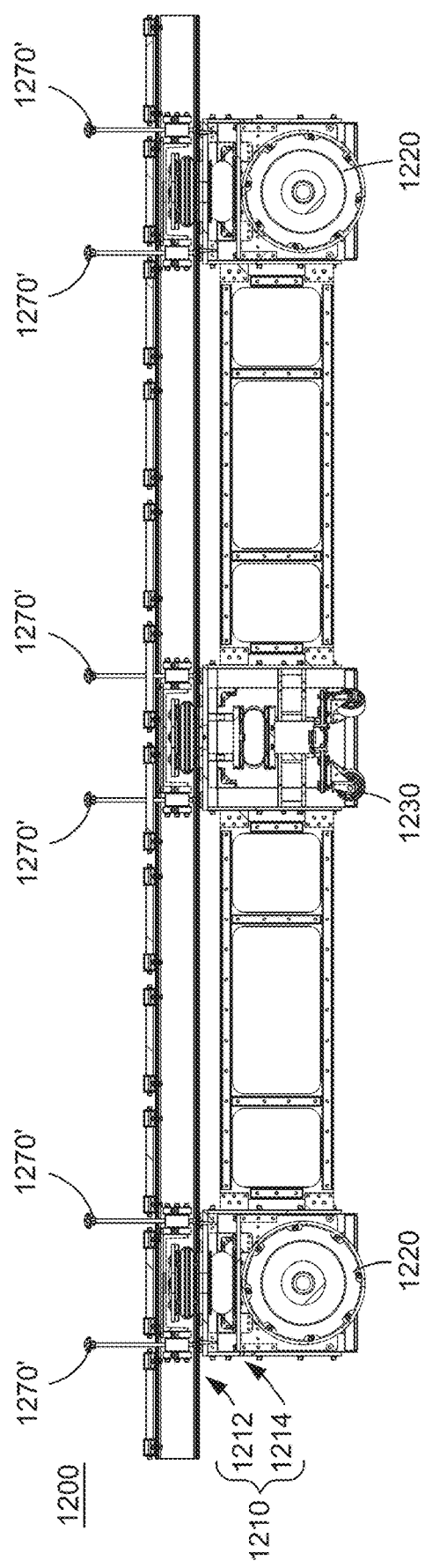
FIG. 17 is a cross-sectional view taken along the line 17-17 in FIG. 14.
Figure 18:
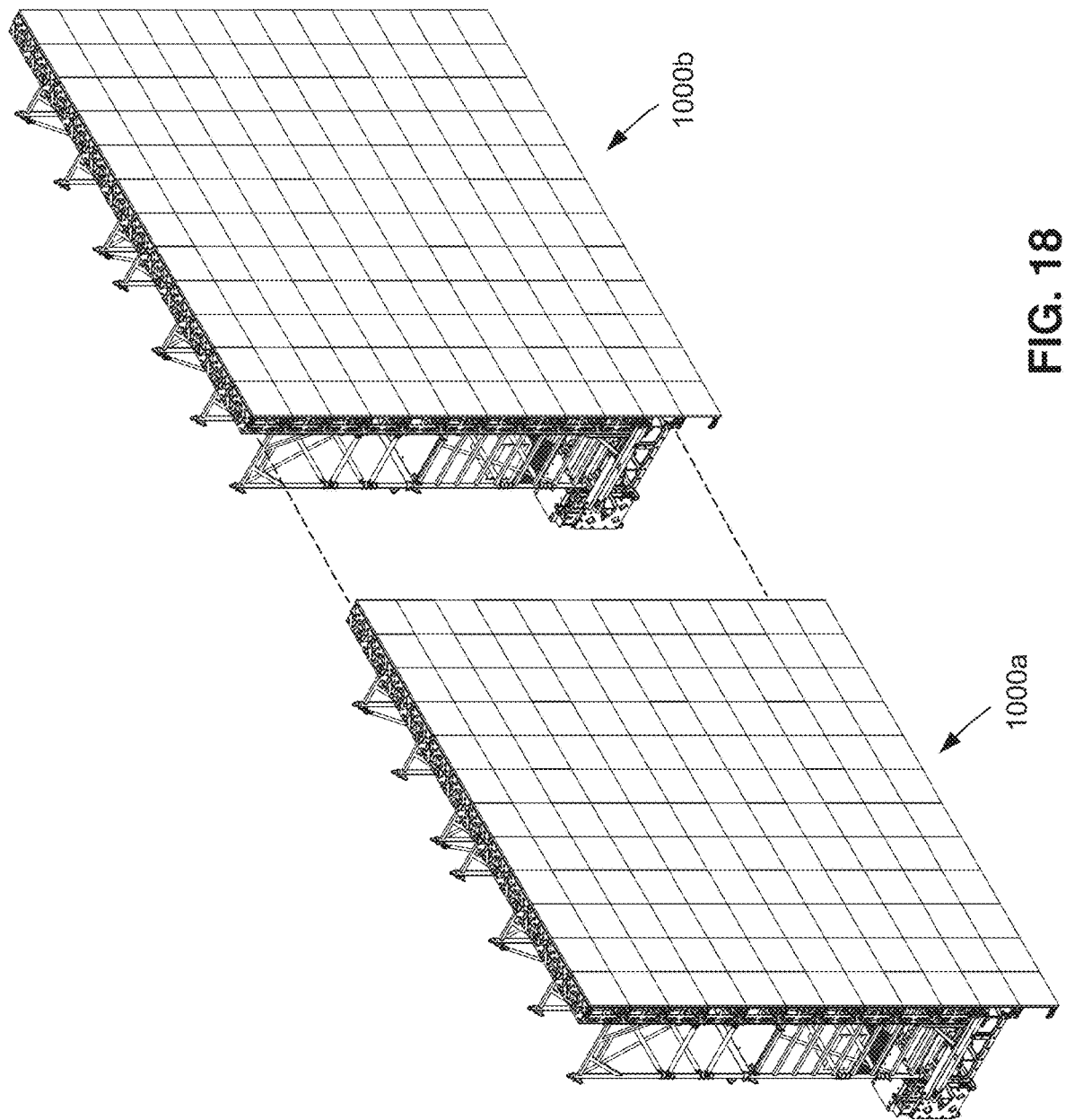
FIG. 18 is a front perspective view of two of the wall modules prior to being connected together.
Figure 21:
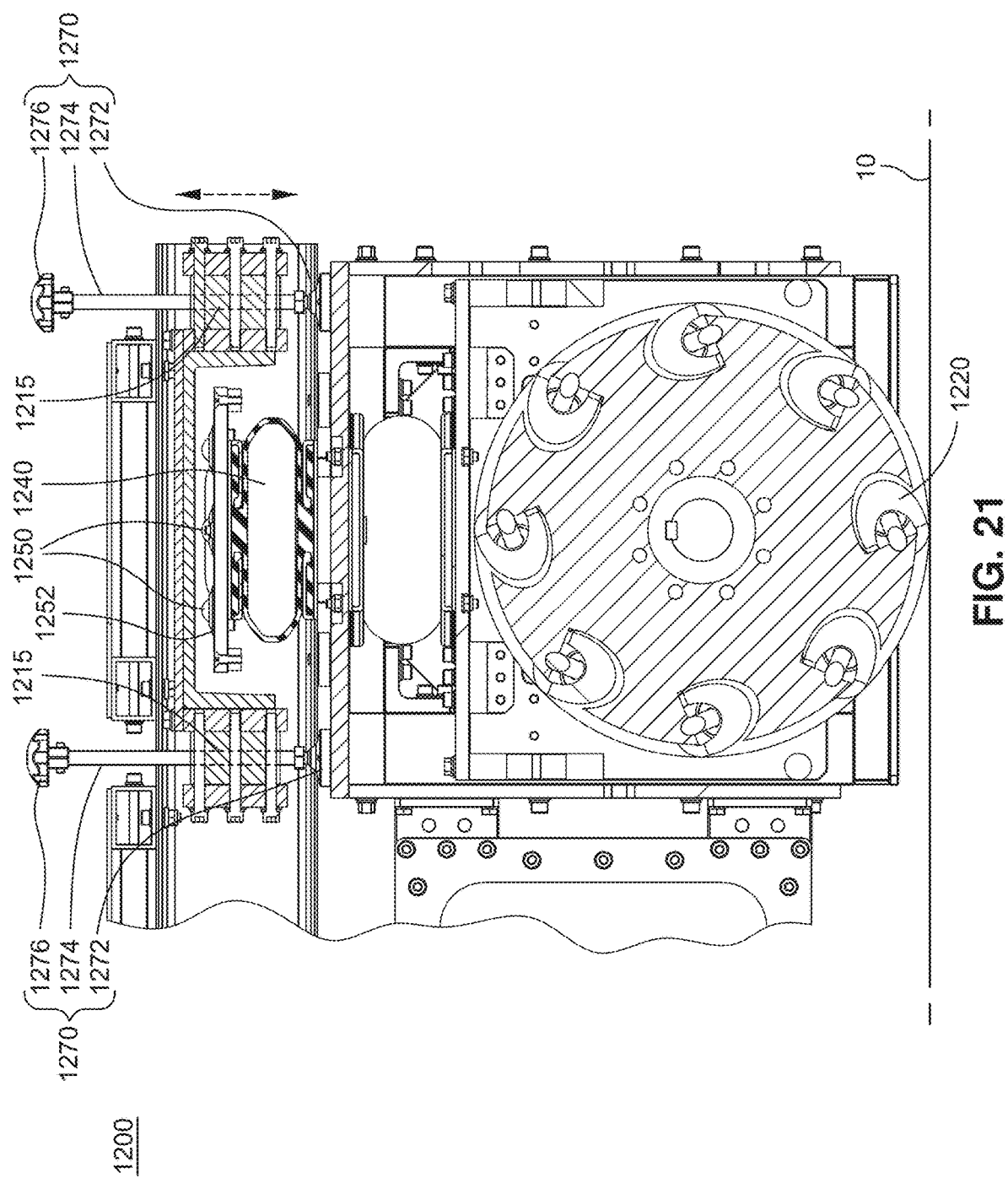
FIG. 21 is an enlarged view of a portion of FIG. 16.
Figure 22:
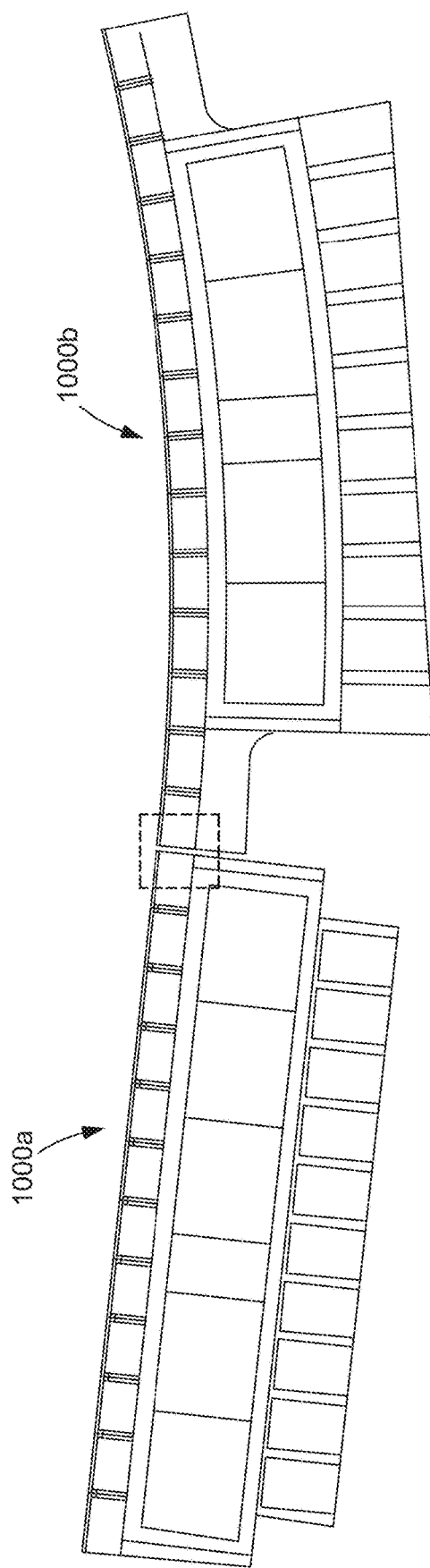
FIG. 22 is a top view of two of the wall modules prior to being connected together.

Once the leveling or other vertical adjustments are complete, the position of the first support base 1212 relative to the main body 1216 of the second support base 1214 may be locked (e.g., mechanically and/or magnetically) so that the bladders 1240 may be deflated (or first actuators 1240 otherwise disengaged). In this regard, one or more adjustable feet 1270, 1270' may be provided. For example, there may be one or more adjustable feet 1270, 1270' corresponding to the one or more first actuators 1240, with each adjustable foot 1270, 1270' being in proximity to a corresponding first actuator 1240 or otherwise arranged to lock the state of the first support base 1212 and main body 1216 that results from the actuation of the corresponding first actuator 1240. There may be six adjustable feet 1270 and six adjustable feet 1270', totaling twelve adjustable feet 1270, 1270' corresponding to the illustrated six first actuators 1240 (i.e., two adjustable feet 1270 or two adjustable feet 1270' per first actuator 1240), for example. As best shown in FIGS. 16, 17, and 21, each of the adjustable feet 1270, 1270' may be provided extending between the first support base 1212 and the main body 1216 of the second support base 1214. The adjustable feet 1270, 1270' may be adjustable to maintain the distance between the first support base 1212 and the main body 1216 of the second support base 1214 upon deflation of the corresponding bladder 1240 (or disengagement of the corresponding first actuator 1240).

Figure 6:
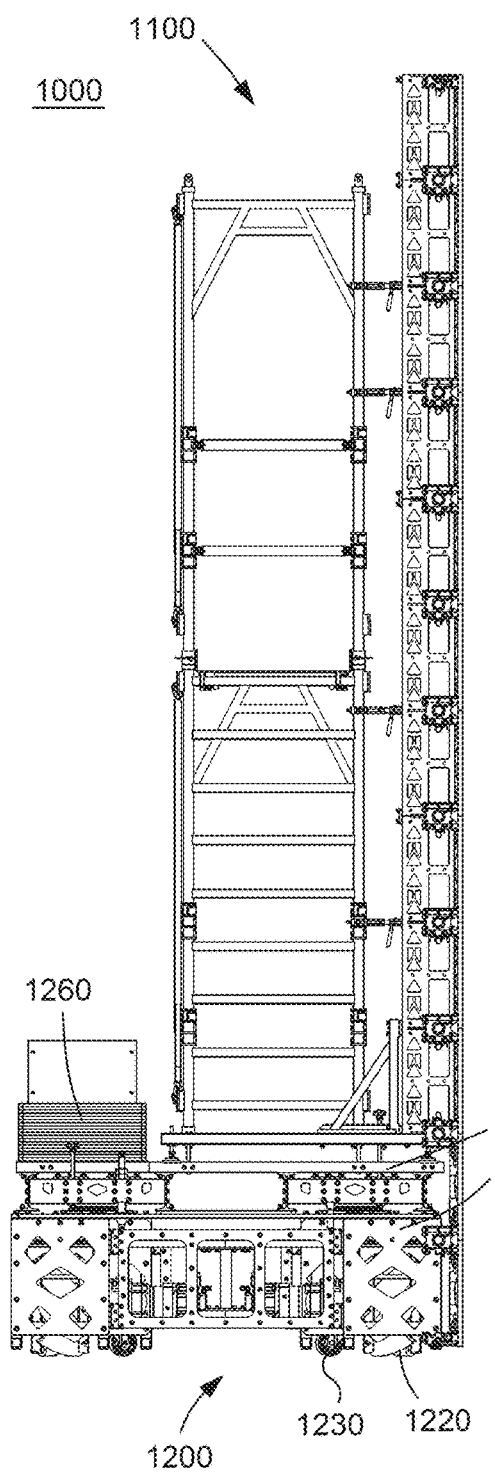
FIG. 6 is a right side view of the wall module.
Figure 7:
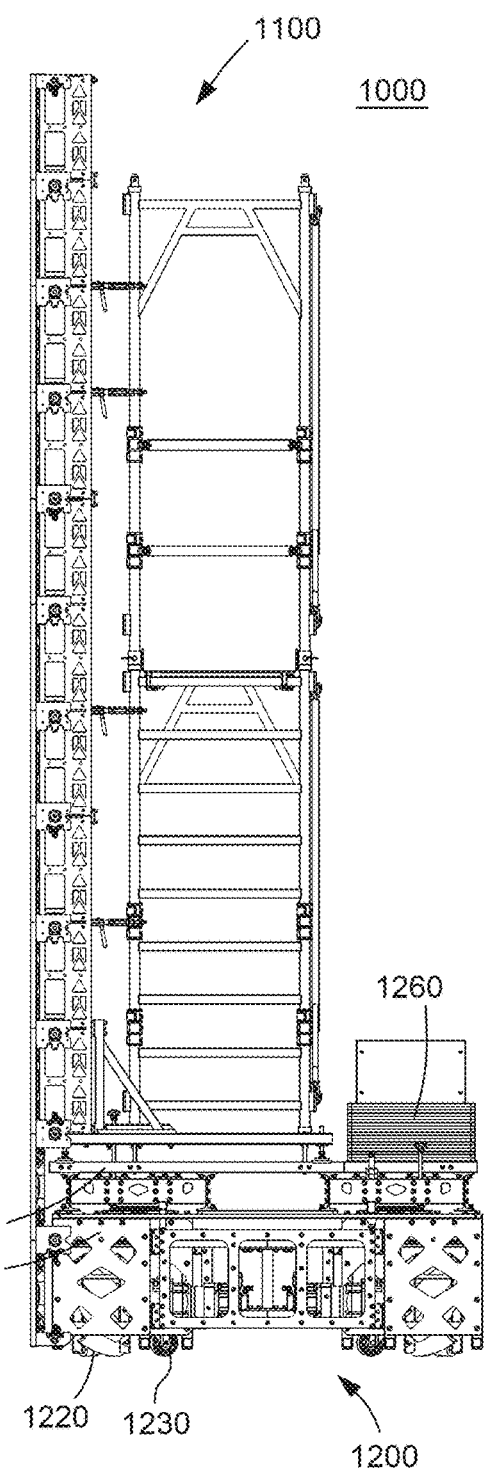
FIG. 7 is a left side view of the wall module.
Figure 8:
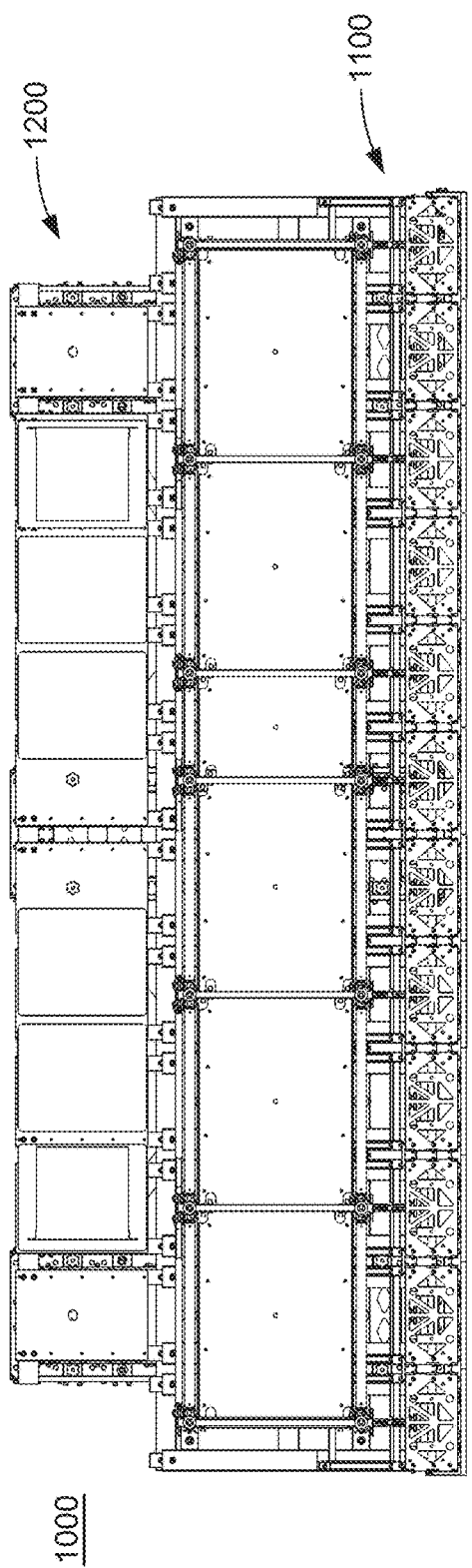
FIG. 8 is a top view of the wall module.
Figure 12:
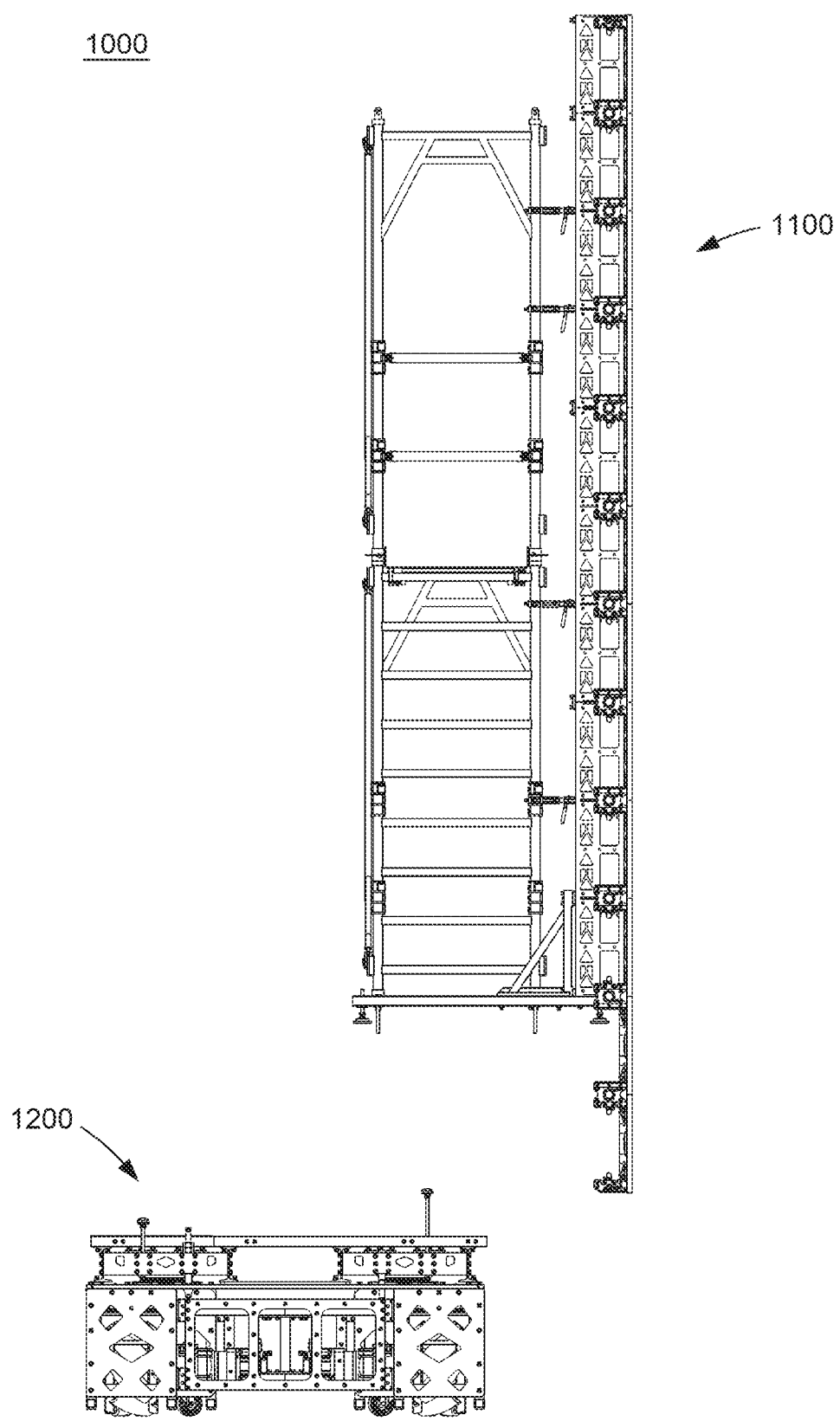
FIG. 12 is an exploded right side view of the wall module.
Figure 13:
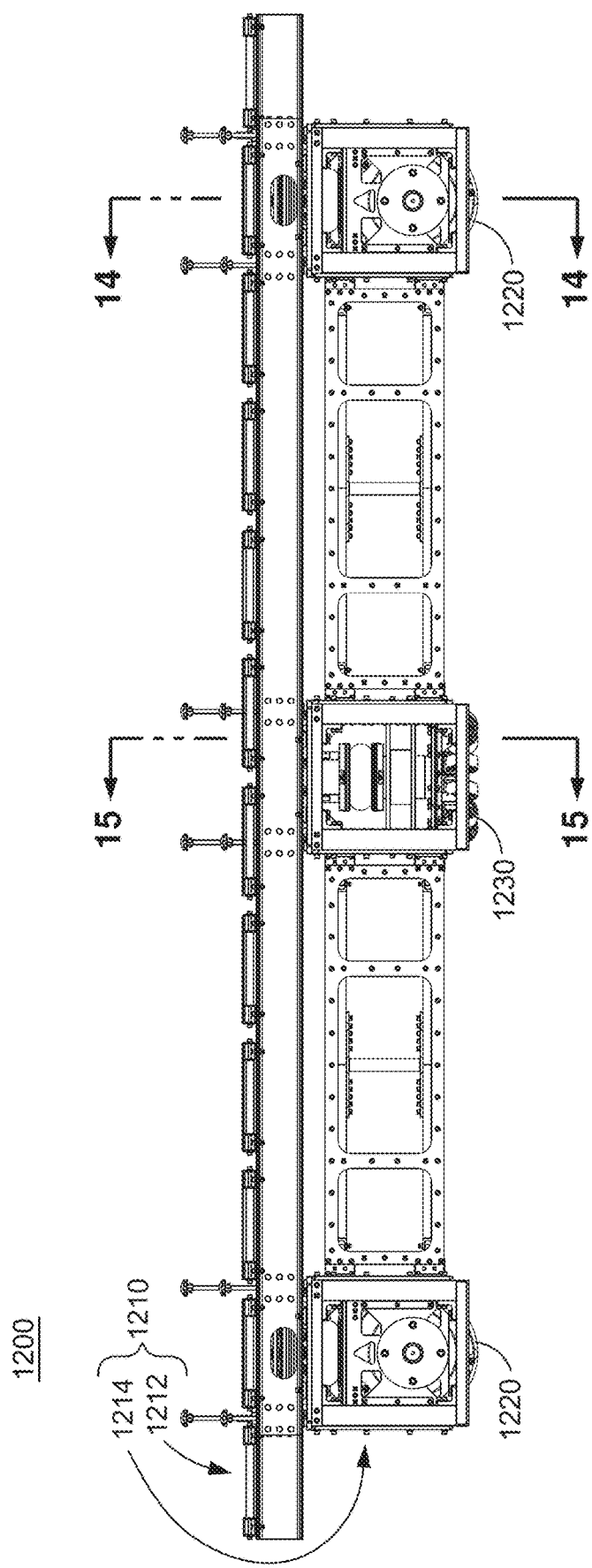
FIG. 13 is a front view of the truck of the wall module.

As most clearly illustrated in FIG. 21, each adjustable foot 1270 (and likewise each adjustable foot 1270') may comprise a foot body 1272 having a surface configured to abut the main body 1216 of the second support base 1214. The surface of the foot body 1272 may be flat, for example, and may be made of a material (e.g., rubber) and/or textured to increase friction with the main body 1216 of the second support base 1214. The foot body 1272 may be provided on the end of a rod 1274 that extends through a threaded bore 1215 of the first support base 1212. Corresponding threads on the rod 1274 may allow the rod 1274 to be advanced through the threaded bore 1215 to raise or lower the foot body 1272. The rod 1274 may terminate in a knob 1276 for manual turning of the rod 1274. When the position of the first support base 1212 has been satisfactorily adjusted relative to the main body 1216 of the second support base 1214 using the bladders 1240, a person may advance the rod 1274 of each adjustable foot 1270, 1270' through its corresponding threaded bore 1215 by turning the knob 1276 until the foot body 1272 comes into contact with the main body 1216 of the second support base 1214. The bladders 1240 can then be deflated (or other type of actuators otherwise disengaged). In addition to maintaining the distance between the first support base 1212 and the main body 1216 of the second support base 1214 (and thus maintain the orientation of the entire first support base 1212 and array of LED panels 1100), the adjustable feet 1270, 1270' may inhibit the relative movement of the first and second support bases 1212, 1214 on the ball bearings 1250 (e.g., due to friction between the foot bodies 1272 and the main body 1216 of the second support base 1214), thus preventing further horizontal movement of the array of LED panels 1100. It is noted that the adjustable feet 1270' (provided toward the front of the wall module 1000) may be the same as the adjustable feet 1270 (provided toward the rear of the wall module 1000) except that they may be longer in order to be readily accessible despite the intervening scaffolding or other structural elements supporting the array of LED panels 1100 as shown in FIGS. 6, 7, and 12.

Figure 23:
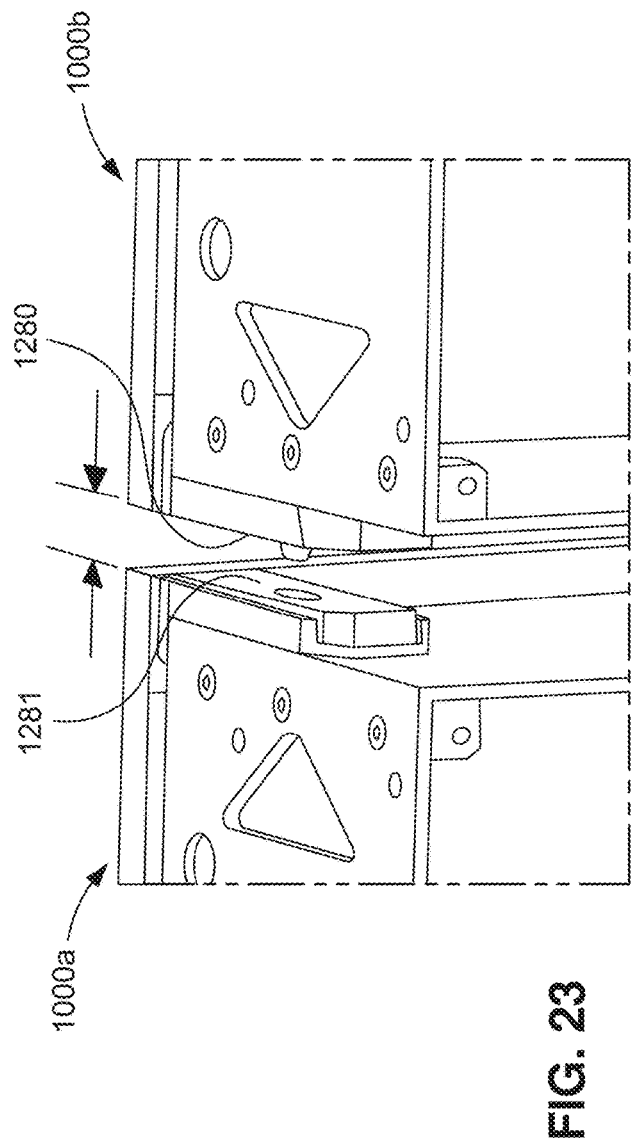
FIG. 23 is an enlarged perspective view corresponding to a portion of FIG. 22.
Figure 24:
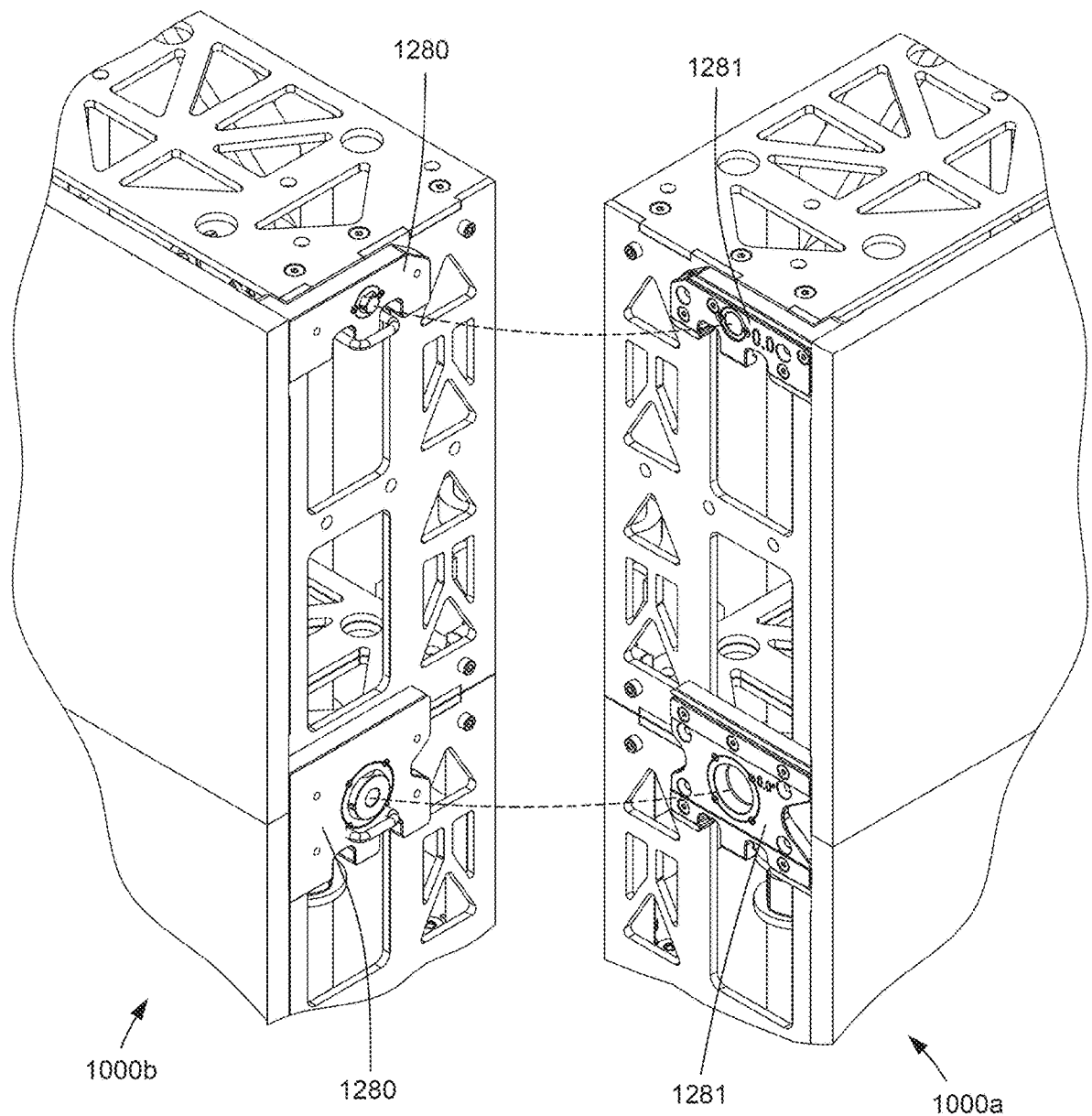
FIG. 24 is an exploded rear perspective view showing a portion of the two wall modules.
Figure 25:
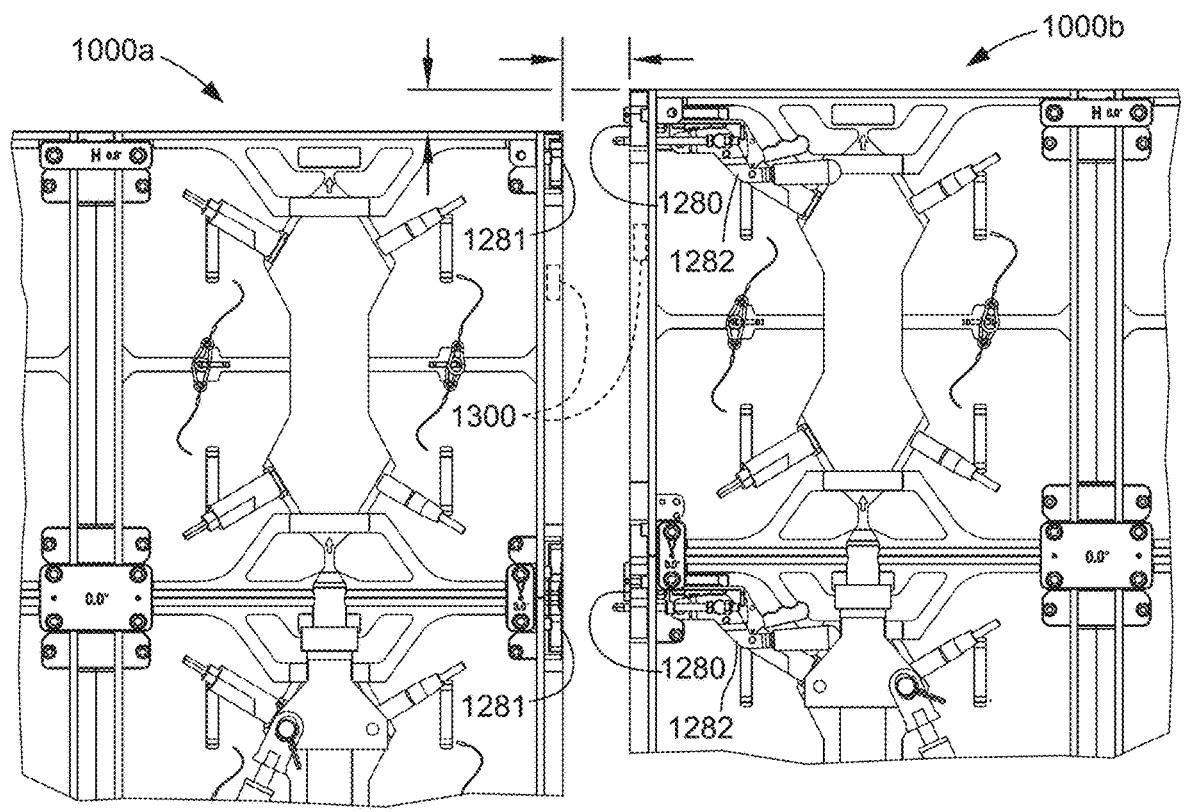
Figure 26:
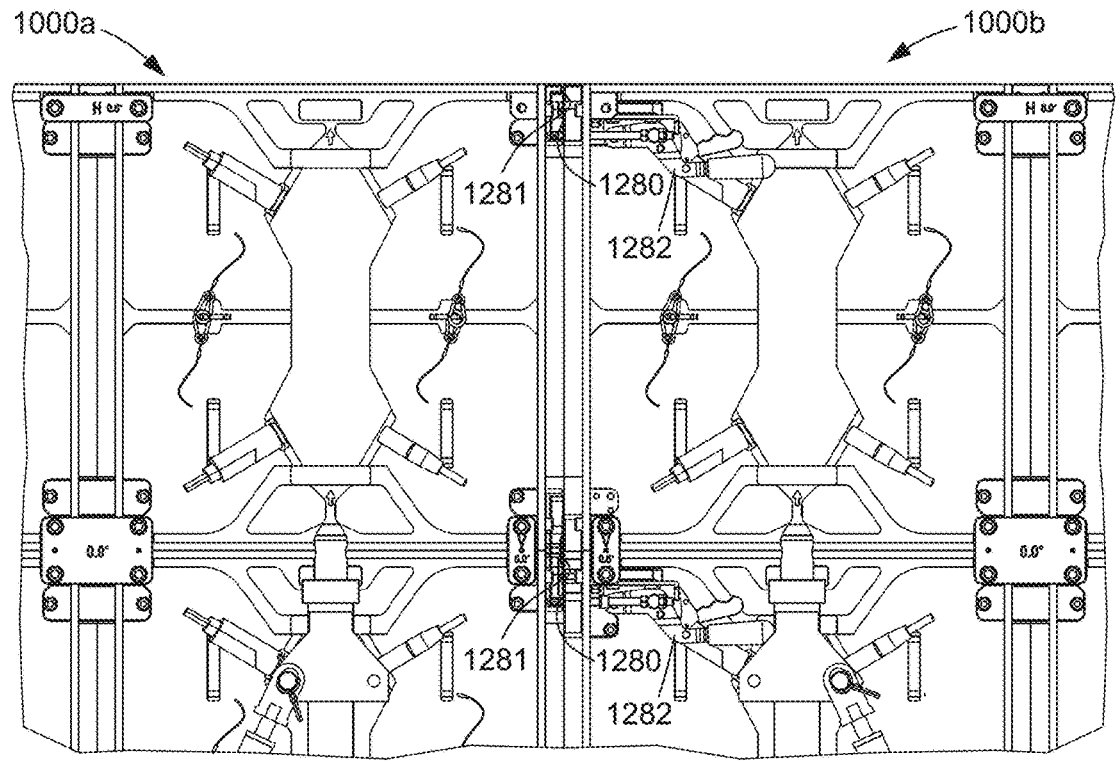
FIG. 26 is another enlarged side view thereof showing the two wall modules connected together.

With the first wall module 1000 in position and vertically adjusted as desired, the second wall module 1000 may then be moved into position next to the first wall module 1000 (e.g., using omnidirectional wheels and second actuators 1224 as discussed above in relation to moving the first wall module 1000). It is contemplated that the second wall module 1000 may be oriented relative to the first wall module 1000 using pose estimation techniques as referenced above. The first and second wall modules 1000 may be brought close to each other but not touching, such as to approximately two inches apart, so as to avoid damaging the arrays of LED panels 1100 by moving them too close together and causing them to collide during the subsequent vertical adjustment. The wall modules 1000 may be equipped with sensors 1300 (e.g., mechanical, optical, magnetic, RF, etc.) arranged to detect an impending collision (based on proximity and/or movement, for example) and thus help to prevent collisions, as well as sensors for other needs such as detecting tipping of the wall modules 1000, variations in the stage surface 10 such as steps, holes, etc., and other obstructions including but not limited to cables. Once the first and second wall modules 1000 are close together, the second wall module 100 may undergo vertical adjustment in the same way as the first wall module 1000 did, with the aim being to achieve roughly the same height as the first wall module 1000 and to ensure that the array of LED panels 1100 of the second wall module 1000 is level. However, the adjustable feet 1270, 1270' of the second wall module 1000 may be left disengaged at this time, allowing the first support base 1212 to remain freely rollable horizontally relative to the second support base 1214 on the intervening ball bearings 1250. With the two arrays of LED panels 1100 now roughly at the same height and orientation, the omnidirectional wheels 1220 may again be used (e.g., by engaging the second actuators 1224) to now move the wall modules 1000 closer together. The final distance during this course horizontal adjustment provided by the omnidirectional wheels 1220 may be around one-half inch, for example, to avoid a potentially damaging collision. The second actuators 1224 of the second wall module 1000 may then be disengaged so that the feet 1226 rest on the stage surface 10 preventing further movement of the entire truck 1200. As illustrated in FIGS. 23 and 25, there may at this point still be some vertical distance between the wall modules 1000, in addition to the horizontal distance of around one-half inch.

Any final vertical distance can be closed at this point by further operation of the first actuators 1240 of the second wall module 1000 as described above (e.g., using pose estimation techniques as referenced above). When the two wall modules 1000 are aligned in this way, the ball bearings 1250 of the second wall module 1000 may be used to close the final horizontal distance. In particular, as explained above, the entire first support base 1212 of the second wall module 1000 may reside on ball bearings 1250 that are provided in sockets 1252 on the sub-assemblies 1217 of the second support base 1214. It is contemplated that the ball bearings 1250 may allow the first support base 1212 to move horizontally relative to the second support base 1214 by some small amount such as one inch. Further horizontal movement may be prevented by an I-beam 1218 (see FIG. 20) or other structure of the first support base 1212 coming into contact with the sub-assemblies 1217 of the second support base 1214, for example. By allowing the first support base 1212 to freely move on the ball bearings 1250 in this way, the remaining horizontal distance between the first and second wall modules 1000 may be eliminated by action of the clamps 1282 (e.g., over-center clamps) shown in FIGS. 25 and 26. For example, with the alignment surfaces 1280, 1281 in a more or less aligned state, a person may simply clamp the alignment surfaces 1280, 1281 together using the clamps 1282, causing the second wall modules 1000 to roll the remaining small amount (e.g., less than one inch) toward the first wall module 1000 as mating surface features (e.g., protrusions, grooves, etc.) on the alignment surfaces 1280, 1281 are brought together bringing the two wall modules 1000 in perfect contact with each other.

As noted above, various sensors 1300 may be used to avoid collision when bringing the wall modules 1000 together. An exemplary set of sensors 1300 might include a combination of types of sensors used at different stages such as at different distances between the wall modules 1000. One sensor might detect proximity mechanically (e.g., piezoelectric sensor, springs, etc.) when the wall modules 1000 are a first distance apart such as 5 mm apart or less. Another type of sensor such as an optical sensor might be used for alignment of relative location of the arrays of LED panels 1100, both in vertical and horizontal directions. A third type of sensor such as a magnetic or capacitive sensor might be used to detect proximity during final alignment when the wall modules 1000 are extremely close, such as 0.5 mm or less. In this way, docking error resulting in damage to the wall modules 1000 due to their significant torque during movement may be avoided. Other examples of sensors may include sensors for scanning the floor or surroundings of the wall modules 1000 during movement in order to avoid obstructions and other hazards as well as sensors associated with locking mechanisms (such as the adjustable feet 1270, 1270') to ensure that the locking mechanism is correctly engaged. It is also contemplated that the docking procedure of the two wall modules 1000 may be done automatically based on feedback from the sensors, with software rather than a human controlling the clamps 1282. In some cases, the software may not directly control the clamps 1282 but may provide guidance based on the sensor feedback, such as audio or visual warnings, with a human then manually operating the clamps 1282 based on the guidance.

Due to variations in the stage surface 10, it may sometimes be the case that a second wall module 1000 does not have the freedom of vertical movement to achieve the same leveling relative to a first wall module 1000 that is already vertically adjusted by an extreme amount. The problem of leveling two or more wall modules 1000 in aggregate may become more complex as the number of wall modules 1000 increases. One contemplated system for addressing this challenge is to designate a "master" wall from among the wall modules 1000, with each wall module deriving its position and orientation from the master wall. The designation of a master wall may be determined according to the planned arrangement of wall modules 1000 and the geometry of the particular stage surface 10 (which may be point cloud scanned for variation in height ahead of time, for example). It is contemplated that the whole wall modules 1000 may communicate with each other and determine single unit and multiple unit leveling and make appropriate adjustments autonomously. Alternatively, the stage surface 10 can function as a "smart floor" that can be instrumented so it can be queried about the best position to place the wall modules 1000. Such a smart floor may be built into a turn table, for example, and may be capable of adjusting its own level in some cases. Alternatively, or additionally, a smart floor may have RFID tags or QR codes on the surface thereof or are embedded therein that are configured to communicate local information to the wall modules 1000, such as local position, height, and/or how level the floor is at that particular position. Smart floors may even be capable of wireless power transfer from the floor to the wall modules 1000 possibly via induction.

It is contemplated that each LED panel of the array 1100 may consume about 75 watts and have about a 250 BTU thermal rating. Various systems may be implemented to cool the array of panels 1100 in order to regulate operating temperature to maintain color consistency and/or avoid unwanted thermal expansion or overheating. For example, A/C or HVAC units (e.g., ducts, compressor, fans, etc.) may be included with each wall module 1000, such as built onto the scaffolding or other structural elements that supports the array of LED panels 1100 in order to heat up or cool down the LED panels. Such A/C or HVAC units may also serve as weights 1260 as described above. The individual LED panels of the array 1100 may have embedded temperature sensors 1120 (see FIG. 4) that are operable to detect when the LED panel is overheating or will soon overheat. The A/C or HVAC units may operate automatically in response to readings of the temperature sensors 1120. Other forms of cooling are contemplated including water cooling, thermal cooling, or other types of cooling.

Additional equipment may be included in a wall module 1000 to support immersive elements of a scene during filming or live performance. For example, fans, foggers, water nozzles, dry ice machines, snow machines, heaters, etc. may be installed on the wall module 1000 and directed to the actor(s) or otherwise into the volume where the scene is occurring. Such immersive elements may be "content-aware" in the sense that they may be controlled by the same game engine or other software that controls the arrays of LED panels 1100. In a scene that takes place in a hot desert, for example, hot air may be directed at the actors causing them to perspire for increased realism of their performance. Heating, cooling, and blowing effects may make use of the same A/C or HVAC systems that control the temperature of the LED panels.

Contemplated modular LED walls (see, e.g., FIGS. 27-33F) may include one or more types of wall modules, including the wall module 1000, wall module 2000, wall module 3000, and/or wall module 4000 (see FIGS. 34-42 showing variant wall modules 2000, 3000, 4000). Different wall modules 1000, 2000, 3000, 4000 may have different heights, widths, and/or curvatures as illustrated by way of example (there may be eight or more different types of wall modules including a variety of n×m numbers of LED panels and curvature configurations), allowing for the creation of various LED volumes to accommodate creatives to desired use cases rather than forcing creatives to fit static volumes. In some cases, one or more types of wall modules 1000, 2000, 3000, 4000 may be constructed with flexible LED panels or LED panels that may be skewed (e.g., into the shape of a rhombus or diamond) by manual and/or automatic control. Flexible LED panels may allow the same wall module 1000, 2000, 3000, 4000 to be used in a variety of configurations, for example, through the use of flex screws that adjust the curvature of the LED panels 1100. Once the LED wall is fully assembled, pose estimation techniques as referenced above may be used to calibrate the volume or measure the volume size, panel locations, etc. relative to camera positions. The connected wall modules 1000, 2000, 3000, 4000 may be moved as one LED wall using the omnidirectional wheels 1220, allowing the entire LED wall to rotate and move as needed, even while filming. By moving the LED wall during filming/production, a relatively small number of modular walls (such as two modular walls connected in an L-shaped configuration) may be used to simulate a complete circular LED wall as the connected modular walls are moved together along with the camera. The capability of flexibly moving groups of connected wall modules 1000, 2000, 3000, 4000 as a unit in this way while filming may allow for greater freedom in film and video production. For example, rather than having an actor walk or run on a treadmill within a fixed volume, the actor may actually walk or run while the entire set of wall modules move with the actor on their omnidirectional wheels. Additionally, in some embodiments the modular walls comprise configurable LED panel scaffolding that permits customizing the shape of the wall by adjusting the scaffolding to accommodate positioning the LED panels as desired. Such an approach is considered advantageous because is provides for transporting the walls to different filming locations moving the wall in pieces rather than as a unitary wall.

Given safety concerns surrounding the free movement of heavy wall modules 1000, 2000, 3000, 4000 on the stage surface 10, it is also contemplated that wall modules 1000, 2000, 3000, 4000 (or the arrays of LED panels 1100 thereof) may be dolly mounted to move on a dolly track (e.g., to follow an actor and simulate walking down a street while the actor is actually walking around in circles in a studio). Dolly mounting may allow for faster movement of the wall modules 1000, 2000, 3000, 4000 during production, with real-time calibration and adjustment via the game engine or other software that produces the display.

Contemplated ways of storing the wall modules 1000, 2000, 3000, 4000 may include nesting arrangements that allow the occupied space of each wall module 1000, 2000, 3000, 4000 to partially overlap that of one or more other wall modules 1000, 2000, 3000, 4000 so as to reduce their footprints. For example, the truck 1200, 2200, 3200, 4200 may be shaped in a way that readily interlocks with one or more other trucks 1200, 2200, 3200, 4200, such as in the example of the truck 3200 (see FIG. 41), which defines a gap between two extending wheel portions, in which wheel portions of two other trucks 3200 may be fit, for example. Vertical nesting arrangements are also contemplated, in which the L-shaped profile of the wall module 1000, 2000, 3000, 4000 (see FIGS. 6 and 7) may allow vertical stacking of similarly L-shaped wall modules 1000, 2000, 3000, 4000 with a vertical offset to account for the height of the truck 1200, 2200, 3200, 4200 (e.g., in a stepped storage area). In the case of outdoor storage, it is contemplated that the arrays of LED panels 1100, 2100, 3100, 4100 of two wall modules 1000, 2000, 3000, 4000 may be arranged to face each other to help prevent the possibility of damage to the screens. In all such contemplated storage arrangements, the stored wall modules 1000, 2000, 3000, 4000 may be connected together (by the truck or the LED panels) for added stability.

For outdoor use such as at concerts, appropriate weatherproofing measures may be taken for the LED panels and other electronic components to be outdoor rated, e.g., waterproof, water resistant, brightness adjusted, etc. It is contemplated that stationary components, such as computer equipment in support of the game engine or other software that produces the display, may be provided within a container-based computer room that may be partly or completely enclosed to protect the equipment from rain and other weather conditions. Such a container may be transported on the back of a truck, for example, and then opened on one or more sides for access to the equipment during setup and use of the wall modules 1000, 2000, 3000, 4000.

The various functionality and processes described in relation to each of the LED wall module, 1000, 2000, 3000, 4000, assembled modular wall, and related smart weight and smart floor systems may, in whole or in part, be embodied in a computer program product that may reside within or otherwise communicate with wall module, wall, or other system. The computer program product may comprise one or more non-transitory tangible program storage media (e.g., hard drive, FPGA, PLA, solid state drive, RAM, flash, ROM, etc.), that store computer programs or other instructions executable by one or more processors (e.g., a CPU or GPU) or programmable circuits to perform operations in accordance with the various embodiments of the present disclosure. The one or more non-transitory program storage media may in some cases reside external to the described structures or systems such as in a cloud infrastructure (e.g., Amazon Web Services, Azure by Microsoft, Google Cloud, etc.) and/or a server system accessible via a network such as the Internet, with the computer programs or other instructions being provided to the relevant structure or system over the network. Examples of program instructions stored on a computer-readable medium may include, in addition to code executable by a processor, state information for execution by programmable circuitry such as a field-programmable gate arrays (FPGA) or programmable logic array (PLA).

Figure 43:
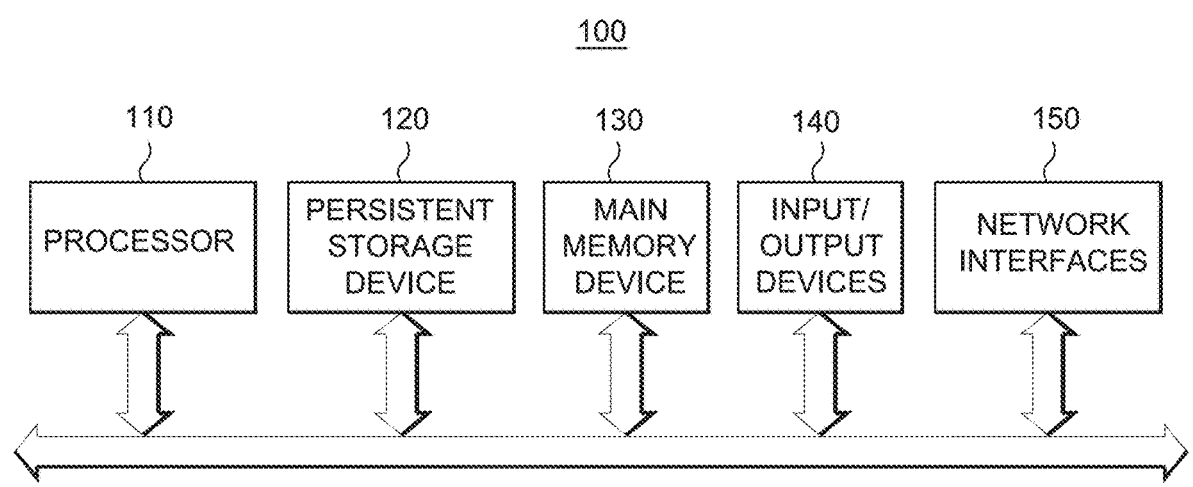
FIG. 43 is a high-level block diagram of an exemplary apparatus that may be used to implement systems and methods described herein.
Figure 44:
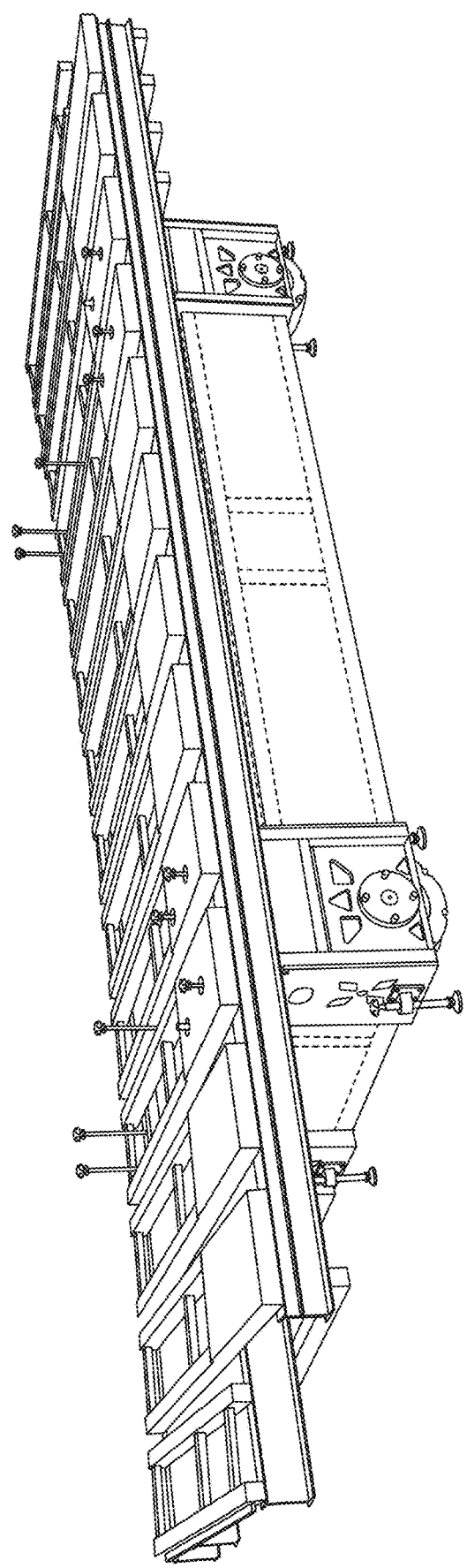
FIG. 44 is a perspective view of a truck of another wall module according to an embodiment of the present disclosure.
Figure 44A:
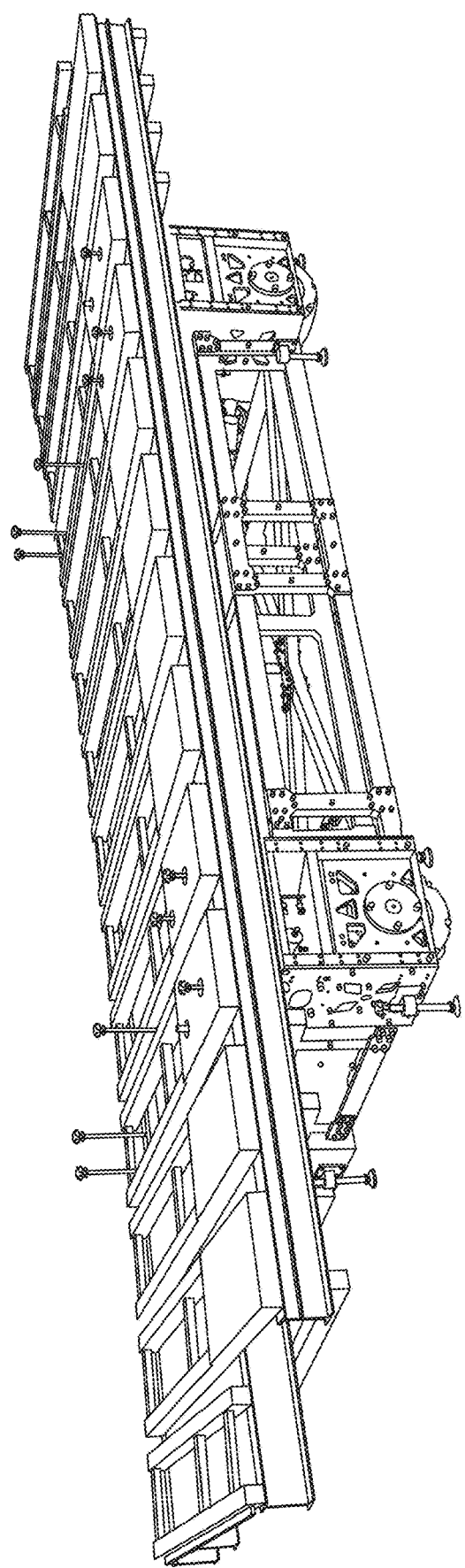
FIG. 44A is another perspective view of the truck of FIG. 44.
Figure 45:
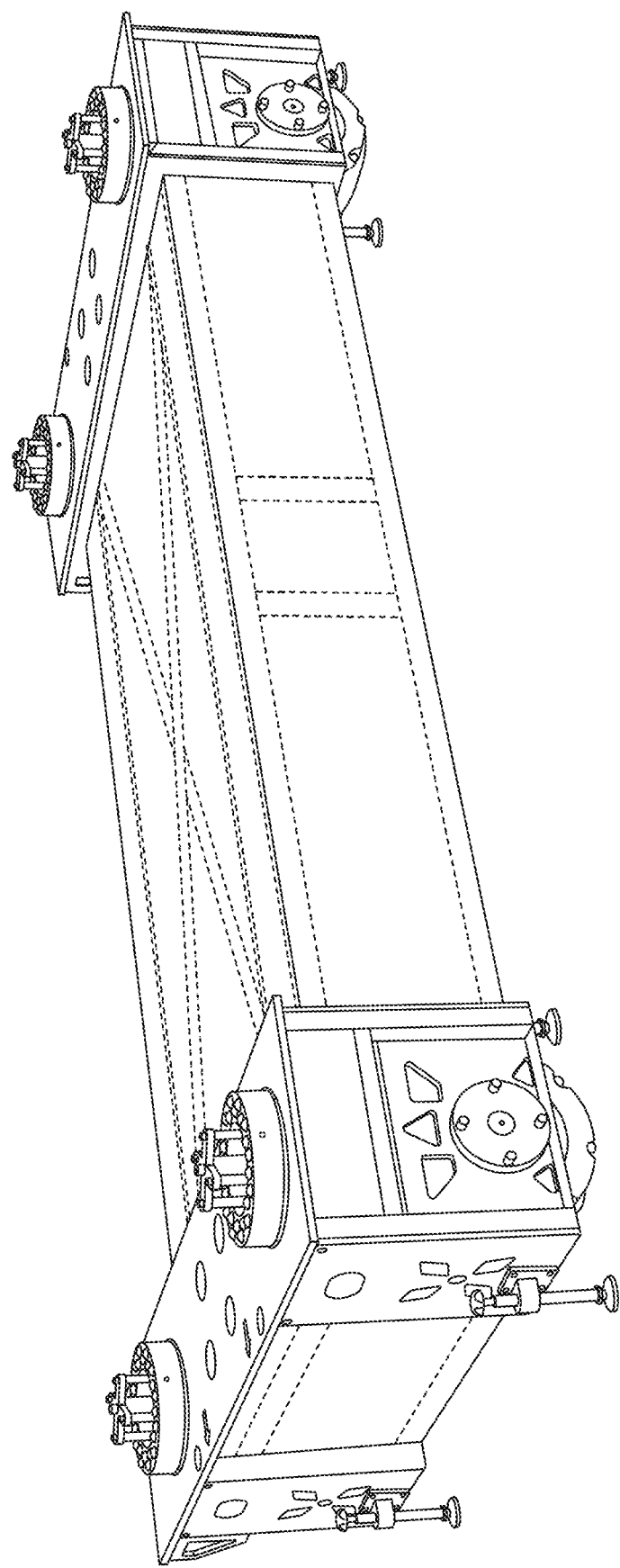
FIG. 45 is a perspective view of a lower support base of the truck.
Figure 45A:
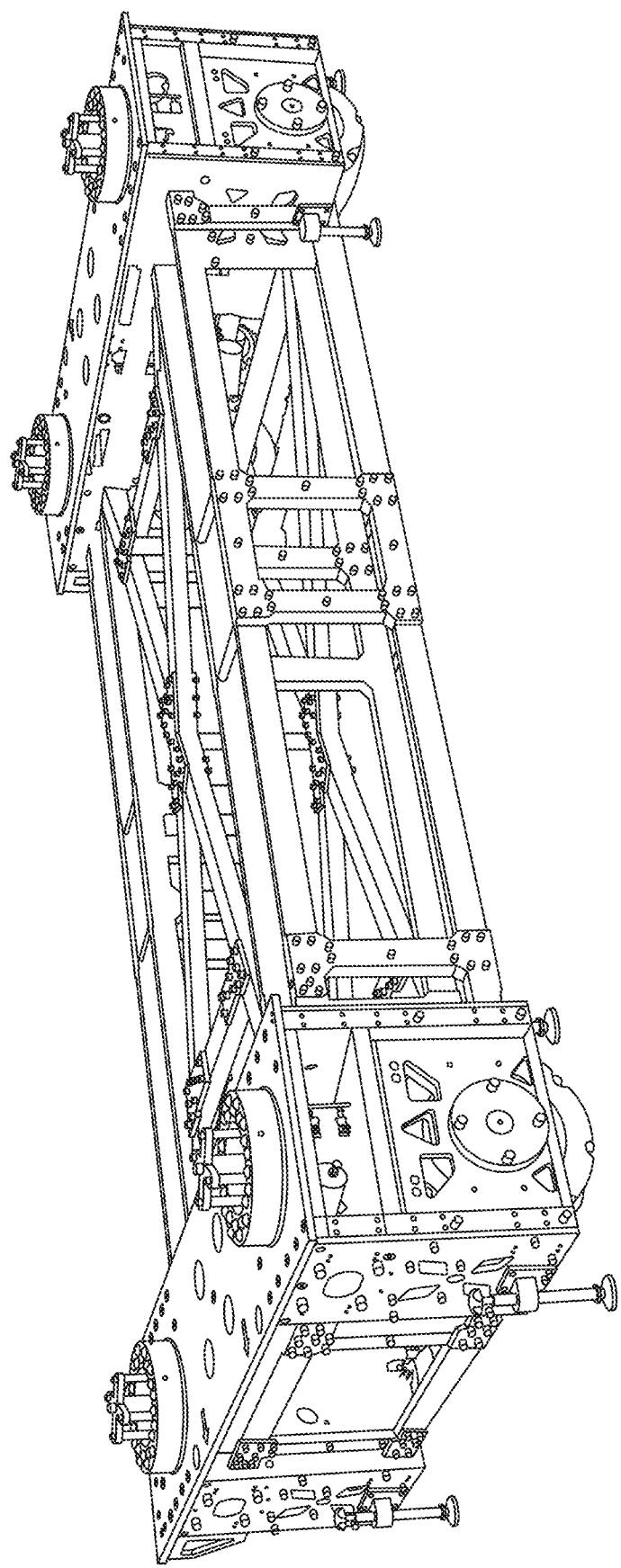
FIG. 45A is another perspective view of the lower support base of the truck of FIG. 45.
Figure 46:
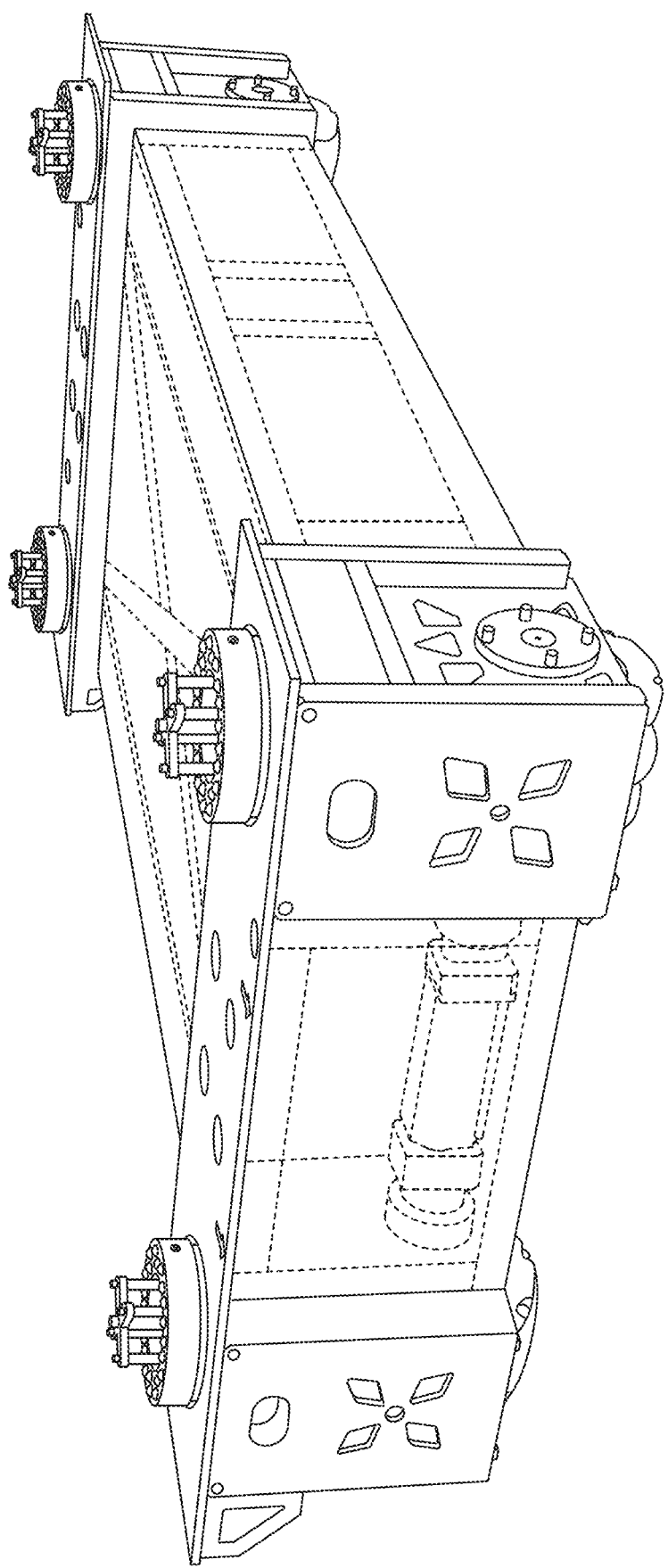
FIG. 46 is a side perspective view thereof.
Figure 46A:
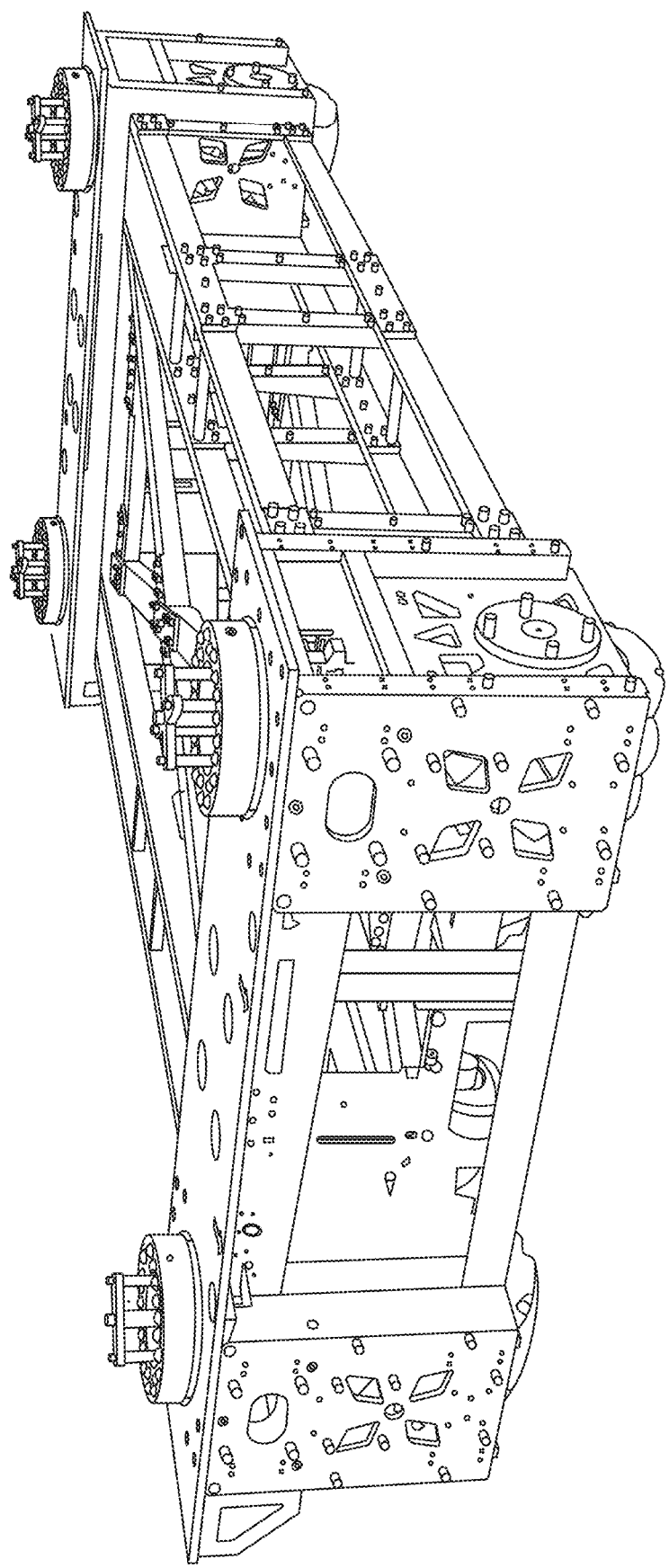
FIG. 46A is another side perspective view of the lower support base of the truck of FIG. 46.
Figure 48:
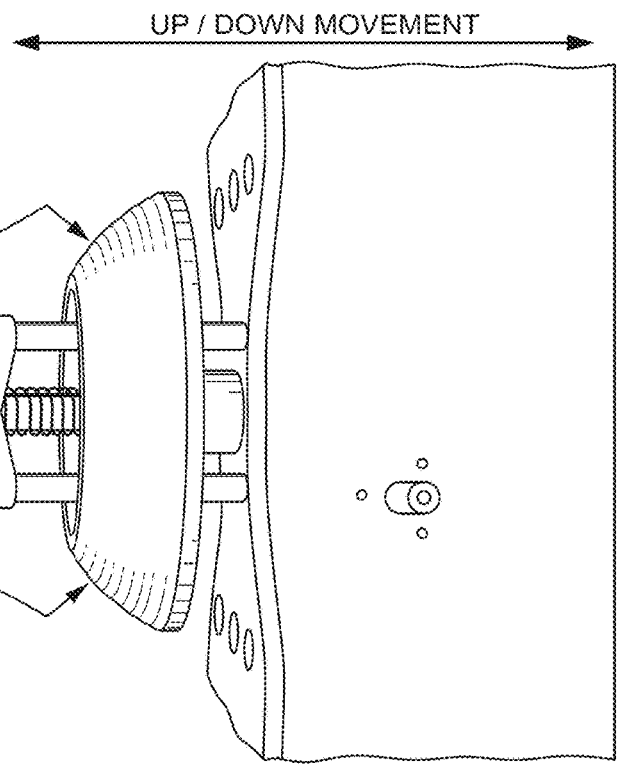
FIG. 48 is a perspective view of another portion of the lower support base of the truck.
Figure 47:
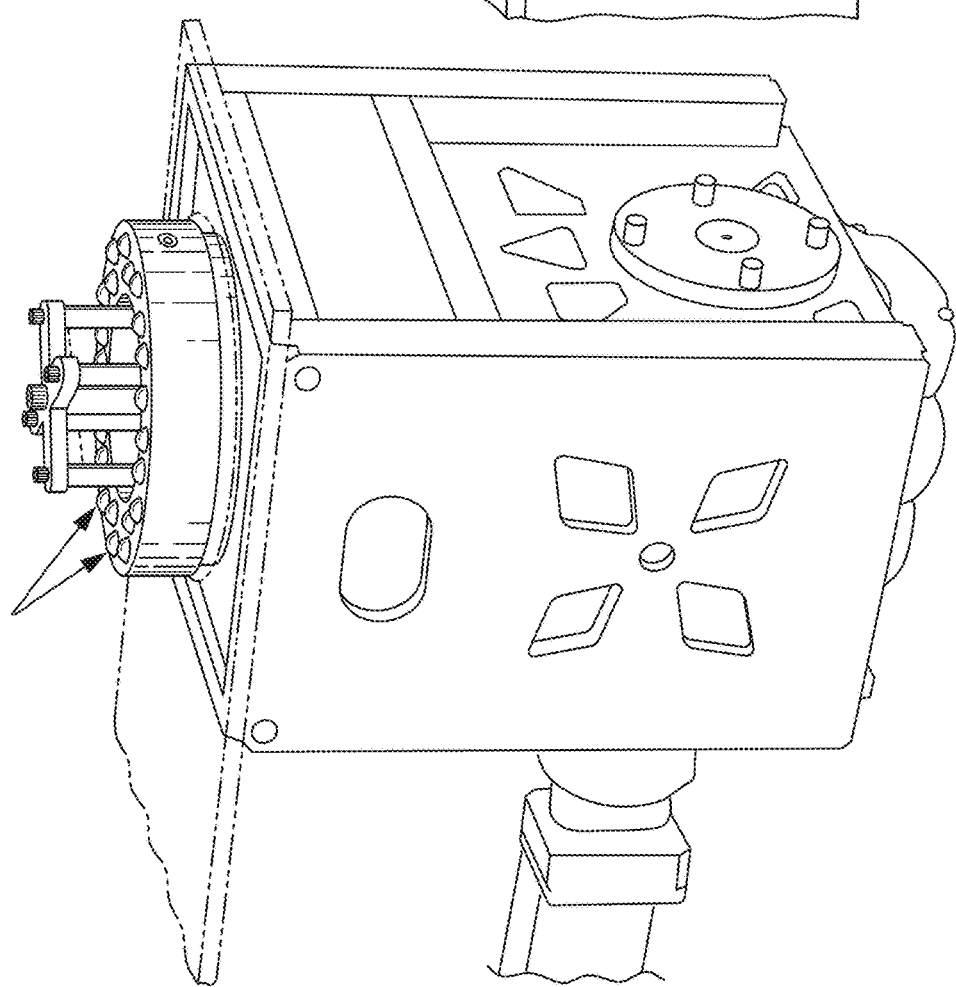
FIG. 47 is a perspective view of a portion of the lower support base of the truck.

By way of example, FIG. 43 is a high-level block diagram of an exemplary apparatus 100 that may be used to implement systems and methods described herein. The apparatus 100 may comprise a processor 110 operatively coupled to a persistent storage device 120 and a main memory device 130. The processor 110 may control the overall operation of apparatus 100 by executing computer program instructions that define such operations. The computer program instructions may be stored in persistent storage device 120, or other computer-readable medium, and loaded into main memory device 130 when execution of the computer program instructions is desired. For example, the wall module 1000, 2000, 3000, 4000 and/or smart floor, smart weight, etc. may comprise one or more components of the apparatus 100. Thus, the operations described throughout the disclosure can be defined at least in part by the computer program instructions stored in main memory device 130 and/or persistent storage device 120 and controlled by processor 110 executing the computer program instructions. For example, the computer program instructions can be implemented as computer executable code programmed by one skilled in the art to execute an implementation of an algorithm defined by the operations described herein. Accordingly, by executing the computer program instructions, the processor 110 may execute an algorithm defined by the described operations. The apparatus 120 may also include one or more network interfaces 150 for communicating with other devices via a network. The apparatus 100 may also include one or more input/output devices 140 that enable user interaction with the apparatus 100 (e.g., display, keyboard, mouse, speakers, buttons, etc.).

Processor 110 may include both general and special purpose microprocessors, and may be the sole processor or one of multiple processors of apparatus 100. Processor 110 may comprise one or more central processing units (CPUs), for example. Processor 110, persistent storage device 120, and/or main memory device 130 may include, be supplemented by, or incorporated in, one or more application-specific integrated circuits (ASICs) and/or one or more field programmable gate arrays (FPGAs).

Persistent storage device 120 and main memory device 130 each comprise a tangible non-transitory computer readable storage medium. Persistent storage device 120, and main memory device 130, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 140 may include peripherals, such as a printer, scanner, display screen, etc. For example, input/output devices 140 may include a display device such as a cathode ray tube (CRT), plasma or liquid crystal display (LCD) monitor for displaying information (e.g., an image recognition search result) to a user, a keyboard, and a pointing device such as a mouse or a trackball by which the user can provide input to apparatus 100.

One skilled in the art will recognize that an implementation of an actual computer or computer system may have other structures and may contain other components as well, and that FIG. 43 is a high level representation of some of the components of such a computer for illustrative purposes.

It should be noted that any computer described herein may include any suitable combination of computing devices, including servers, interfaces, systems, databases, agents, peers, engines, controllers, modules, or other types of computing devices operating individually or collectively. One should appreciate that any such computing device may comprise a processor configured to execute software instructions stored on a tangible, non-transitory computer readable storage medium such as those described above, and that the software instructions may configure the computing device to provide the roles, responsibilities, or other functionality as discussed above with respect to the disclosed subject matter. A system controller may comprise at least a computer-readable non-transient memory, a processor, and computer code saved on the memory with instructions that, when executed by the processor, perform functions. Any suitable computer-readable non-transient memory that allows software instructions to be saved or allows firmware to be flashed could be used, for example a hard disk, a solid state drive, ROM, a programmable EEPROM chip. In some embodiments, the various servers, systems, databases, or interfaces may exchange data using standardized protocols or algorithms, possibly based on HTTP, HTTPS, AES, public-private key exchanges, web service APIs, known financial transaction protocols, or other electronic information exchanging methods. Data exchanges may be conducted over a packet-switched network, the Internet, LAN, WAN, VPN, or other type of packet switched network a circuit switched network, cell switched network, or other type of network. As used herein, when a system, engine, server, device, module, or other computing element is described as configured to perform or execute functions on data in a memory, the meaning of "configured to" or "programmed to" may refer to one or more processors or cores of the computing element being programmed by a set of software instructions stored in the memory of the computing element to execute the set of functions on target data or data objects stored in the memory.

As used herein, and unless the context dictates otherwise, the term "coupled to" is intended to include both direct coupling (in which two elements that are coupled to each other contact each other or communicate directly with each other) and indirect coupling (in which at least one additional element is located between the two elements). Therefore, the terms "coupled to" and "coupled with" are used synonymously. Within the context of this document "coupled with" and "coupled to" are also considered to mean "communicatively coupled with" over a network, possibly through one or more intermediary devices.

The subject matter described herein is considered to include all possible combinations of the disclosed elements. Thus, if one disclosed example comprises elements A, B, and C, and a second example comprises elements B and D, then the subject matter described herein is also considered to include other remaining combinations of A, B, C, or D, even if not explicitly disclosed. As used in the description herein and throughout the claims that follow, the meaning of "a," "an," and "the" includes plural reference unless the context clearly dictates otherwise. All methods, processes, and operational flows described herein can be performed in any suitable order unless otherwise indicated herein or otherwise clearly contradicted by context. The use of any and all examples, or exemplary language (e.g., "such as") provided with respect to certain embodiments herein is intended merely to better illuminate the subject matter described herein and does not pose a limitation on the scope of the subject matter described herein unless claimed otherwise. No language in the specification should be construed as indicating any non-claimed element essential to the practice of the subject matter described herein. Groupings of alternative elements or embodiments of the subject matter described herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the concepts described herein. The disclosed subject matter, therefore, is not to be restricted except in the scope of the appended claims. Moreover, in interpreting both the specification and the claims, all terms should be interpreted in the broadest possible manner consistent with the context. In particular, the terms "comprise," "comprises," and "comprising," as well as the terms "include," "includes," and "including," should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A wall module of a modular LED wall, the wall module comprising:
    an array of LED panels; and
    a truck for supporting the array of LED panels and providing mobility to the array of LED panels relative to a stage surface, the truck comprising:
        a support assembly including a first support base fixed to the array of LED panels, a second support base engageable with the first support base, and a plurality of ball bearings arranged between the first and second support bases to allow relative movement of the first and second support bases in a plane parallel to the stage surface;
        a plurality of omnidirectional wheels arranged to enable omnidirectional movement of the second support base along the stage surface; and
        one or more first actuators operable to adjust a height of the first support base at a plurality of horizontal positions to enable leveling of the first support base relative to the stage surface.

2. The wall module of claim 1, wherein the one or more first actuators comprises a plurality of first actuators respectively disposed at the plurality of horizontal positions on the support assembly.

3. The wall module of claim 2, wherein each of the first actuators comprises a bladder configured to lift the first support base upon expanding.

4. The wall module of claim 3, wherein the second support base includes a main body and one or more sub-assemblies on which the plurality of ball bearings are provided, the bladder of each of the first actuators being positioned between the main body and a respective sub-assembly from among the one or more sub-assemblies so as to increase a distance between the main body and the sub-assembly upon expanding.

5. The wall module of claim 4, further comprising a plurality of adjustable feet corresponding to the bladders, each of the adjustable feet extending between the first support base and the main body of the second support base and being adjustable to maintain the distance between the first support base and the main body of the second support base upon deflation of the corresponding bladder.

6. The wall module of claim 5, wherein the plurality of adjustable feet is configured to inhibit the relative movement of the first and second support bases on the plurality of ball bearings.

7. The wall module of claim 1, further comprising a plurality of second actuators, each of the second actuators being operable to adjust a distance between a respective one of the plurality of omnidirectional wheels and the second support base in a direction normal to the stage surface.

8. The wall module of claim 7, wherein each of the second actuators comprises a bladder configured to increase the distance between the respective one of the plurality of omnidirectional wheels and the second support base upon expanding.

9. The wall module of claim 1, wherein the one or more first actuators is controllable with a precision that enables leveling of the support assembly relative to the stage surface by a distance of a single pixel of the LED panels.

10. A truck for supporting an array of LED panels and providing mobility to the array of LED panels relative to a stage surface, the truck comprising:
 a support assembly including a first support base fixable to an array of LED panels, a second support base engageable with the first support base, and a plurality of ball bearings arranged between the first and second support bases to allow relative movement of the first and second support bases in a plane parallel to the stage surface;
 a plurality of omnidirectional wheels arranged to enable omnidirectional movement of the second support base along the stage surface; and
 one or more first actuators operable to adjust a height of the first support base at a plurality of horizontal positions to enable leveling of the first support base relative to the stage surface.

11. A modular LED wall comprising:
 a first wall module;
 a second wall module connectable to the first wall module, each of the first and second wall modules including an array of LED panels and a truck for supporting the array of LED panels and providing mobility to and enabling leveling of the array of LED panels relative to a stage surface;
 wherein each of the first and second wall modules further includes a plurality of alignment surfaces, the plurality of alignment surfaces of the first wall module being configured to mate with the plurality of alignment surfaces of the second wall module when the respective arrays of LED panels are aligned;
 wherein the first wall module further includes a plurality of clamps operable to connect the first wall module to the second wall module when the respective arrays of LED panels are aligned; and
 wherein, for each of the first and second wall modules, the truck comprises:
  a support assembly including a first support base fixed to the array of LED panels, a second support base engageable with the first support base, and a plurality of ball bearings arranged between the first and second support bases to allow relative movement of the first and second support bases in a plane parallel to the stage surface;
  a plurality of omnidirectional wheels arranged to enable omnidirectional movement of the second support base along the stage surface; and
  one or more first actuators operable to adjust a height of the first support base at a plurality of horizontal positions to enable leveling of the first support base relative to the stage surface.

12. The modular LED wall of claim 11, wherein the ball bearings allow the relative movement of the first and second support bases during operation of the plurality of clamps to connect the first wall module to the second wall module.

\* \* \* \* \*